United States Patent
Aramoto et al.

(10) Patent No.: US 12,022,547 B2
(45) Date of Patent: Jun. 25, 2024

(54) USER EQUIPMENT

(71) Applicants: SHARP KABUSHIKI KAISHA, Sakai (JP); FG Innovation Company Limited, Tuen Mun (HK)

(72) Inventors: Masafumi Aramoto, Sakai (JP); Tsuyoshi Takakura, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 545 days.

(21) Appl. No.: 17/282,168

(22) PCT Filed: Oct. 3, 2019

(86) PCT No.: PCT/JP2019/039184
§ 371 (c)(1),
(2) Date: Jun. 3, 2021

(87) PCT Pub. No.: WO2020/071502
PCT Pub. Date: Apr. 9, 2020

(65) Prior Publication Data
US 2022/0015174 A1    Jan. 13, 2022

(30) Foreign Application Priority Data
Oct. 5, 2018 (JP) ................................. 2018-189949

(51) Int. Cl.
*H04W 76/18* (2018.01)
*H04W 76/15* (2018.01)

(52) U.S. Cl.
CPC ........... *H04W 76/18* (2018.02); *H04W 76/15* (2018.02)

(58) Field of Classification Search
CPC .............................. H04W 76/18; H04W 76/15
See application file for complete search history.

(56) References Cited

U.S. PATENT DOCUMENTS 11,350,482 B2 * 5/2022 Kim ................... H04W 76/25
2016/0338027 A1 11/2016 Sun
(Continued)

FOREIGN PATENT DOCUMENTS

| CN | 102595556 A | 7/2012 |
| RU | 2621072 C2 | 5/2017 |

(Continued)

OTHER PUBLICATIONS

3rd Generation Partnership Project; Technical Specification Group Core Network and Terminals; Non-Access-Stratum (NAS) protocol for 5G System (5GS); Stage 3 (Release 15), 3GPP TS 24.501 [online], V15.1.0 (Sep. 2018), [retrieved on Oct. 17, 2019].
(Continued)

*Primary Examiner* — Michael J Moore, Jr.
(74) *Attorney, Agent, or Firm* — ScienBiziP, P.C.

(57) ABSTRACT

The present invention provides communication control methods relating to control signal management, a user equipment (UE), and a network node. The method includes transmitting a first initial Protocol Data Unit (PDU) session establishment request message containing a request type field to the network node to establish a first PDU session with a Data Network Name (DNN) and a Single Network Slice Selection Assistance Information (S-NSSAI); receiving a PDU session establishment reject message; setting a request type field contained within a second initial PDU session establishment request message to initial request to establish a second PDU session based on a cause value of the PDU session establishment reject message indicating the first PDU session does not exist; and transmitting the second initial PDU session establishment request message to the network node to establish the second PDU session.

18 Claims, 10 Drawing Sheets

(56) References Cited

U.S. PATENT DOCUMENTS

| | | | |
|---|---|---|---|
| 2018/0227873 A1 | 8/2018 | Vrzic et al. | |
| 2018/0352483 A1* | 12/2018 | Youn | H04W 36/00 |
| 2019/0253917 A1* | 8/2019 | Dao | H04M 15/00 |
| 2019/0254118 A1* | 8/2019 | Dao | H04L 67/141 |
| 2020/0084663 A1* | 3/2020 | Park | H04W 80/10 |
| 2020/0107213 A1* | 4/2020 | Park | H04L 61/5007 |
| 2020/0336937 A1* | 10/2020 | Youn | H04W 48/16 |
| 2021/0029628 A1* | 1/2021 | Kim | H04W 48/18 |
| 2021/0037585 A1* | 2/2021 | Youn | H04W 76/30 |
| 2022/0015174 A1* | 1/2022 | Aramoto | H04W 76/18 |

FOREIGN PATENT DOCUMENTS

| | | |
|---|---|---|
| RU | 2667379 C2 | 9/2018 |
| WO | 2013004151 A1 | 1/2013 |
| WO | 2018/131970 A1 | 7/2018 |
| WO | 2018164498 A1 | 9/2018 |

OTHER PUBLICATIONS

3rd Generation Partnership Project; Technical Specification Group Core Network and Terminals; 5G System—Phase 1; CT WGI Aspects (Release 15), 3GPP TR 24. 890 [online], V15 1. 0 (Mar. 2018), [retrieved on Oct. 17, 2019].

Huawei, Hisilicon, Abnormal cases for PDU session establishment procedure, 3GPP TSG-CT WG1 Meeting #110 Kunming (P.R. of China), Apr. 16-20, 2018, C1-182815, section2, p. 7, line 24-line 27.

3GPP TS 24.501 V15.0.0, "3rd Generation Partnership Project; Technical Specification Group Core Network and Terminals; Non-Access-Stratum (NAS) protocol for 5G System (5GS); Stage 3", Jun. 2018, 6.4.

3GPP TS 23.501, "3rd Generation Partnership Project; Technical Specification Group Services and System Aspects; System Architecture for the 5G System; Stage 2 (Release 15)" Technical Specification, V15.0.0 (Dec. 2017).

3GPP TS 23.502, "3rd Generation Partnership Project; Technical Specification Group Services and System Aspects; Procedures for the 5G System; Stage 2 (Release 15)", Technical Specification, V15.0.0 (Dec. 2017).

* cited by examiner

USER EQUIPMENT

CROSS-REFERENCE TO RELATED APPLICATION

The present application claims priority based on Japanese Patent Application No. 2018-189949 filed on Oct. 5, 2018, the content of which is incorporated herein by reference.

FIELD

The present invention relates to a user equipment (UE).

BACKGROUND

The 3GPP (3rd Generation Partnership Project), undertaking activities for standardizing recent mobile communication systems has studied a system architecture for LTE (Long Term Evolution), i.e. SAE (System Architecture Evolution). The 3GPP has been standardizing an EPS (Evolved Packet System) as a communication system for implementing all IP (Internet Protocol). In addition, a core network constituting an EPS is referred to as an EPC (Evolved Packet Core).

In addition, the 3GPP recently has been studying a next-generation communication technology and a system architecture for 5G (5th Generation) mobile communication systems, i.e., next-generation mobile communication systems, and especially, the 3GPP has been standardizing a 5GS (5G System) as a system for implementing 5G mobile communication systems (see NPL 1 and NPL 2). In the 5GS, technical problems attributable to connection of various terminals to a cellular network are extracted to standardize solutions.

Requirements for the solutions include, for example, optimization and diversification of communication procedures for supporting continuous mobile communication services depending on a terminal that supports various and diverse access networks, optimization of a system architecture according to the optimization and diversification of the communication procedures, and the like.

PRIOR ART LITERATURE

Non-Patent Literature

Non-Patent Document 1: 3GPP TS 23.501 v15.0.0; 3rd Generation Partnership Project; Technical Specification Group Services and System Aspects; System Architecture for the 5G System; Stage 2 (Release 15)

Non-Patent Document 2: 3GPP TS 23.502 v15.0.0; 3rd Generation Partnership Project; Technical Specification Group Services and System Aspects; Procedures for the 5G System; Stage 2 (Release 15)

SUMMARY

Technical Problem

In the 5GS, in addition to a configuration that provides a function equivalent to a congestion management, a control signal management based on causes other than the congestion management is being studied (see NPL 1 and NPL 2).

However, operation processes related to the session management of a terminal receiving a cause, which is notified by the network to the terminal in order to apply a control signal management based on the cause other than a congestion management, is not clarified. In addition, like the congestion management, a back-off timer management process in the case that a back-off timer is notified to the terminal is not clarified.

One aspect of the present invention can be achieved in view of the foregoing circumstances, and an objective of the present invention is to provide a configuration and a communication control method for implementing a control signal management process based on a cause other than a congestion management.

Solution to Problem

A user equipment of the present invention comprises a transmission unit, wherein when a received 5GSM cause value indicates that a PDU session does not exist, the transmission unit transmits an initial PDU session establishment request message.

A user equipment of the present invention comprises a reception unit and a control unit, wherein when the reception unit receives a 5GSM cause value, which indicates that a request is rejected or unspecified, and a timer, the control unit activates a back-off timer for a combination of PLMN, DNN and S-NSSAI based on the 5GSM cause value in a case that the 5GSM cause value indicates a cause value other than another cause value related to congestion management.

A user equipment of the present invention comprises a reception unit and a control unit, wherein when the reception unit receives a 5GSM cause value and a timer, the control unit activates a back-off timer for a combination of PLMN, DNN and S-NSSAI based on the 5GSM cause value in a case that the 5GSM cause value indicates a cause value other than another cause value related to congestion management.

A user equipment of the present invention comprises a control unit, wherein when a received 5GSM cause value indicates a cause value other than congestion management, the control unit ignores a received back-off timer.

Invention Effect

According to the above-described configuration, a terminal apparatus constituting a 5GS and an apparatus within a core network can perform management processes such as congestion managements initiated by the terminal apparatus and by a network for each network slice and/or a DNN or an APN.

DETAILED DESCRIPTION OF THE PREFERRED EMBODIMENTS

Hereinafter, the best mode for carrying out the present invention will be described with reference to the accompanying drawings. In the present embodiment, one embodiment of a mobile communication system to which the present invention is applied will be described as an example.

[1. System Overview]

Figure 1:
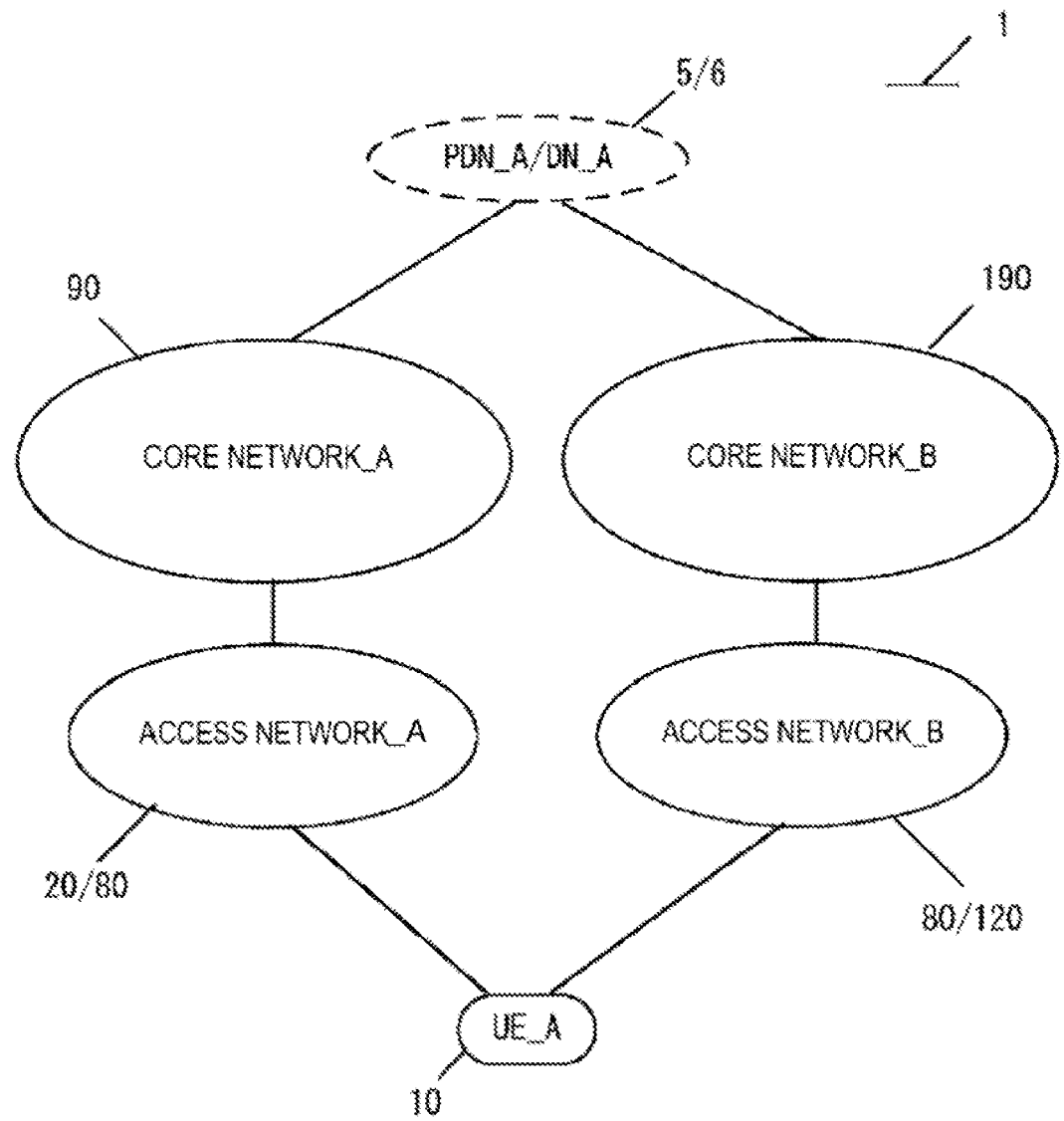
FIG. 1 is a diagram illustrating a schematic diagram of a mobile communication system.
Figure 2:
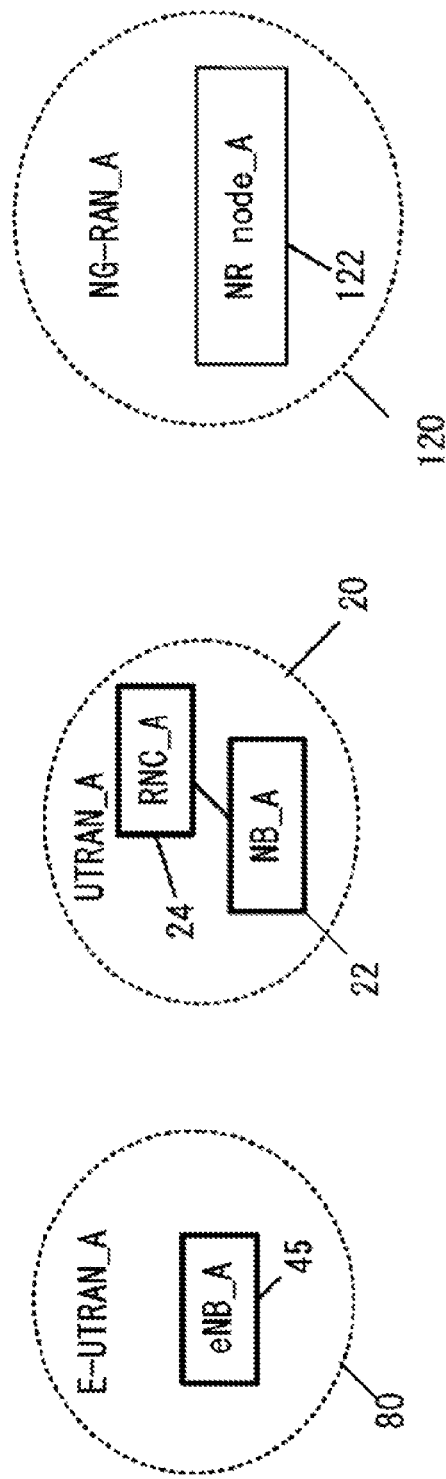
FIG. 2 is a diagram illustrating an example of a configuration of an access network in a mobile communication system.
Figure 3:
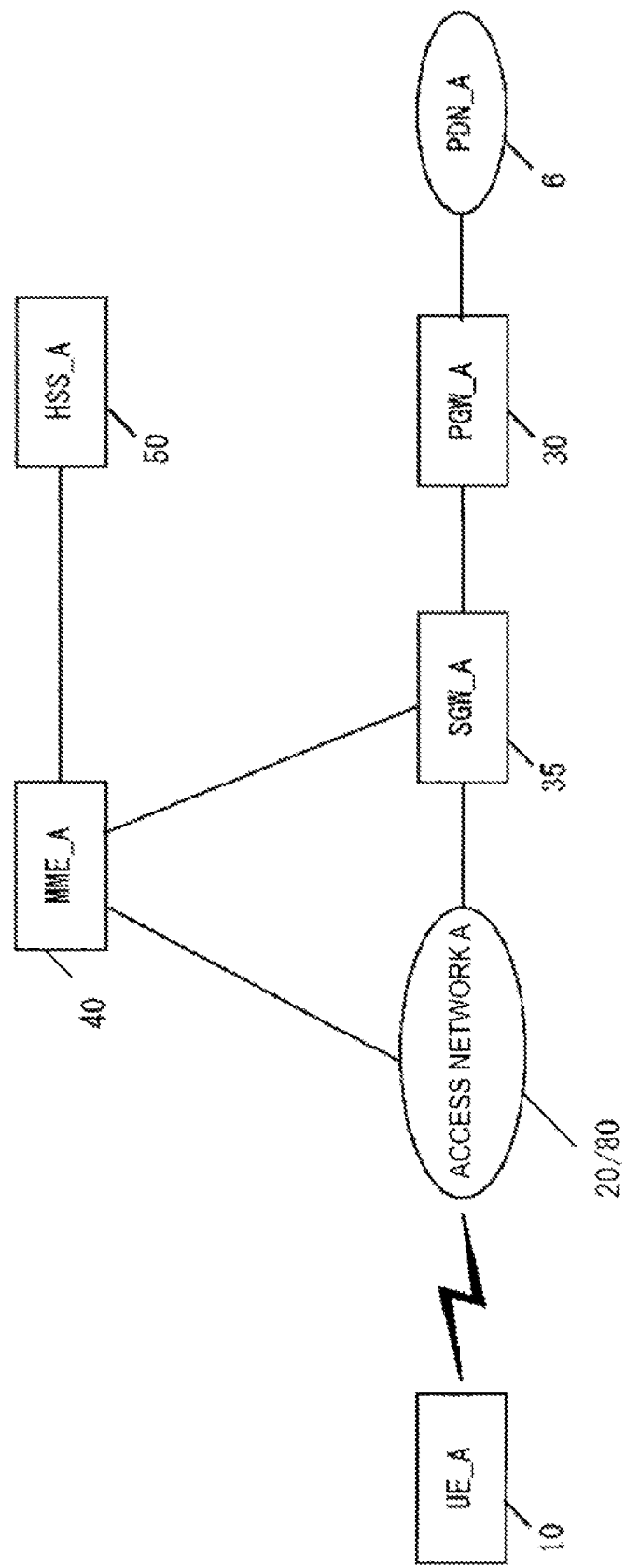
FIG. 3 is a diagram illustrating an example of a configuration and the like of a core network_A in a mobile communication system.
Figure 4:
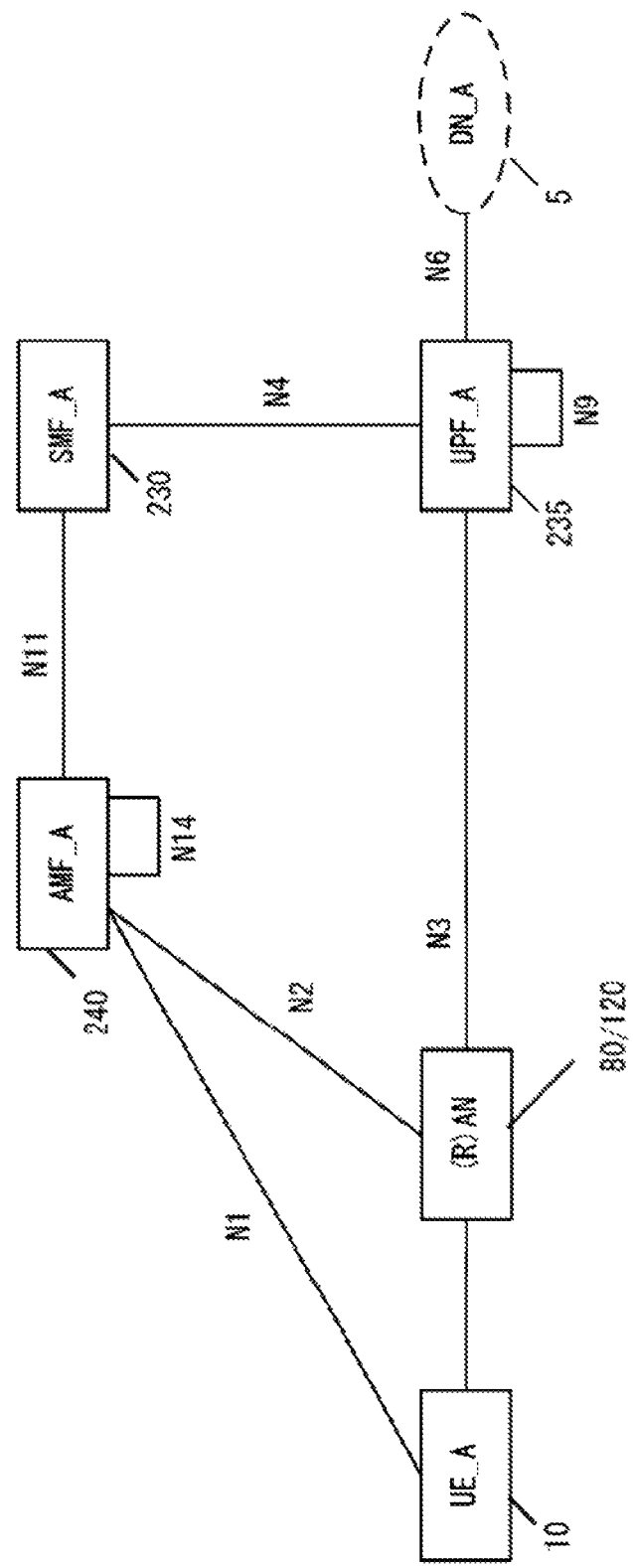
FIG. 4 is a diagram illustrating an example of a configuration of a core network in a mobile communication system.

An outline of a mobile communication system according to the present embodiment will be described with reference to FIG. 1, FIG. 2, FIG. 3 and FIG. 4. FIG. 2 is a diagram illustrating details of an access network in the mobile communication system shown in FIG. 1. FIG. 3 is a diagram mainly illustrating details of a core network_A90 in the mobile communication system shown in FIG. 1. FIG. 4 is a diagram mainly illustrating details of a core network_B190 in the mobile communication system shown in FIG. 1. As shown in FIG. 1, the mobile communication system 1 according to the present embodiment includes a terminal apparatus (also referred to as a user equipment or a mobile terminal apparatus) UE_A10, an access network (AN)_A, an access network_B, a core network (CN)_A90, a core network_B190, a packet data network (PDN)_A6, and a data network (DN)_A5. It should be noted that a combination of the access network_A and the core network_A90 may be referred to as an EPS (Evolved Packet System; 4G mobile communication system), and a combination of the access network_B, the core network_B190, and the UE_A10 may be referred to as a 5GS (5G System; 5G mobile communication system). The configurations of the 5GS and the EPS may not be limited to these. For simplicity, the core network_A90, the core network_B, or a combination thereof may be referred to as a core network; the access network_A, the access network_B, or a combination thereof may be referred to as an access network or a radio access network; and the DN_A5, the PDN_A6, or a combination thereof may be referred to as a DN.

Here, the UE_A10 may be an apparatus capable of connecting to a network service via a 3GPP access (also referred to as a 3GPP access network) and/or a non-3GPP access (also referred to as a non-3GPP access network). The UE may also be provided with a UICC (Universal Integrated Circuit Card) or an eUICC (Embedded UICC). The UE_A10 may be a terminal apparatus capable of performing a wireless connection, and may be an ME (Mobile Equipment), an MS (Mobile Station), a CIoT (Cellular Internet of Things) terminal (CIoT UE), or the like.

Besides, the UE_A10 can connect to an access network and/or a core network. In addition, the UE_A10 can connect to the DN_A and/or the PDN_A via the access network and/or the core network. The UE_A10 transmits and/or receives (communicates) user data to and/or from (with) the DNA and/or the PDN_A by using a PDU (Protocol Data Unit or Packet Data Unit) session and/or a PDN (Packet Data Network) connection (also referred to as a PDN connection). Furthermore, the communication of the user data is not limited to IP (Internet Protocol) communication (IPv4 or IPv6), and may be, for example, non-IP communication in the EPS, or Ethernet communication (registered trademark) or Unstructured communication in the 5GS.

Here, the IP communication refers to data communication using an IP, and is data communication implemented by transmitting and/or receiving an IP packet with an IP header given. A payload portion included in the IP packet may include user data transmitted and/or received by the UE_A10. In addition, the non-IP communication refers to data communication without using an IP, and is data communication implemented by transmitting and/or receiving data with no IP header given. For example, the non-IP communication may also be data communication implemented by transmitting and/or receiving application data with no IP address given, or may be transmission and/or reception of user data transmitted and/or received by the UE_A10 with another header such as a MAC header, an Ethernet (registered trademark) frame header, or the like given.

In addition, the PDU session refers to connectivity established between the UE_A10 and the DN_A5 to provide a PDU connection service. More specifically, the PDU session may also be connectivity established between the UE_A10 and an external gateway. Here, the external gateway may be a UPF, a PGW (Packet Data Network Gateway), or the like. In addition, the PDU session may be a communication path established for transmitting and receiving user data between UE_A10 and the core network and/or the DN, or may be a communication path for transmitting and receiving a PDU. Further, the PDU session may be a session established between the UE_A10 and the core network and/or the DN, or may be a logical communication path including a transmission path of one or more bearers and the like between apparatuses in the mobile communication system 1. More specifically, a PDU session may be a connection established by the UE_A10 with respect to the core network_B190 and/or an external gateway, or may be a connection established between the UE_A10 and a UPF. In addition, a PDU session may be connectivity and/or a connection between the UE_A10 and a UPF_A235 via an NR node_A122. Furthermore, a PDU session may be identified by a PDU session ID and/or an EPS bearer ID.

Moreover, the UE_A10 can transmit and/or receive the user data to and/or from an apparatus, such as an application server deployed in the DN_A5, by using a PDU session. In other words, the PDU session can transfer the user data transmitted and/or received between the UE_A10 and an apparatus such as an application server deployed in the DN_A5. Furthermore, each apparatus (the UE_A10, an apparatus in the access network, and/or an apparatus in the core network, and/or an apparatus in a data network) may manage one or more pieces of identification information associated with a PDU session. It should be noted that these pieces of identification information may include at least one of an APN (Access Point Name), a TFT (Traffic Flow Template), a session type, application identification information, DN_A5 identification information, NSI (Network Slice Instance) identification information, DCN (Dedicated Core Network) identification information, and access network identification information, and may further include other information. Furthermore, in a case that a plurality of PDU sessions are established, the respective pieces of identification information associated with the PDU sessions may have the same content or different contents. Further, the NSI identification information is information for identifying an NSI, and hereinafter may be an NSI ID or a Slice Instance ID.

In addition, as illustrated in FIG. 2, the access network_A and/or the access network B may be any of a UTRAN (Universal Terrestrial Radio Access Network)_A20, an E-UTRAN (Evolved Universal Terrestrial Radio Access Network)_A80, and an NG-RAN (5G-RAN)_A120. Hereinafter, the UTRAN_A20 and/or the E-UTRAN_A80 and/or the NG-RAN_A120 may be referred to as 3GPP access or a 3GPP access network, and a wireless LAN access network or a non-3GPP AN may be referred to as a non-3GPP access or a non-3GPP access network. Each radio access network includes an apparatus to which the UE_A10 is actually connected (e.g., a base station apparatus or an access point), and the like.

For example, the E-UTRAN_A80 is an LTE access network and is configured to include one or more eNBs_A45. The eNB_A45 is a radio base station to which the UE_A10 is connected through an E-UTRA (Evolved Universal terrestrial Radio Access). In addition, in a case that a plurality of eNBs are present in the E-UTRAN_A80, the eNBs may be connected to each other.

In addition, the NG-RAN_A120 is a 5G access network, or may be the (R)AN illustrated in FIG. 4, and is configured to include one or more NR nodes (New Radio Access Technology nodes)_A122 and/or an ng-eNB. Furthermore, the NR node_A122 is a radio base station to which the UE_A10 is connected through a 5G radio access and may also be referred to as gNB. Moreover, the ng-eNB may be an eNB (E-UTRA) constituting the 5G access network, may be connected to the core network_B190 via the NR node_A, or may be directly connected to the core network_B190. In addition, in a case that there are a plurality of NR nodes_A122 and/or ng-eNBs in the NG-RAN_A120, the NR nodes_A122 and/or ng-eNBs may be connected to each other.

Further, the NG-RAN_A120 may be an access network configured by the E-UTRA and/or the 5G Radio Access. In other words, the NG-RAN_A120 may include an eNB_A45, or an NR node_A122, or both. In this case, the eNB_A45 and the NR node_A122 may be similar apparatuses. Therefore, the NR node_A122 can be substituted with the eNB_A45.

The UTRAN_A20 is an access network of a 3G mobile communication system, and is configured to include an RNC (Radio Network Controller)_A24 and an NB (Node B)_A22. The NB_A22 is a radio base station to which the UE_A10 is connected through a UTRA (Universal Terrestrial Radio Access), and the UTRAN_A20 may include one or more radio base stations. Furthermore, an RNC_A24 is a controller for connecting the core network_A90 to the NB_A22, and the UTRAN_A20 may be configured to include one or more RNCs. In addition, the RNC_A24 may be connected to one or more NBs_A22.

It should be noted that, in the present specification, the expression that the UE_A10 is connected to each radio access network means that the UE_A10 is connected to a base station apparatus, an access point, or the like included in each radio access network, and that data, signals, and the like are also transmitted and/or received via the base station apparatus and the access point. In addition, control messages transmitted and/or received between the UE_A10 and the core network_B190 may be the same control message regardless of the type of access network. Therefore, the expression that the UE_A10 and the core network_B190 transmit and/or receive a message to and/or from each other via the NR node_A122 may be equivalent to the expression that the UE_A10 and the core network_B190 transmit a message to each other via the eNB_A45.

Further, the access network is a radio network connected to the UE_A10 and/or the core network. The access network may be a 3GPP access network or a non-3GPP access network. Furthermore, the 3GPP access network may be the UTRAN_A20, the E-UTRAN_A80, and the NG-RAN (Radio Access Network)_A120, and the non-3GPP access network may be a wireless LAN access point (WLAN AN). In addition, the UE_A10 may be connected to the access network in order to connect to the core network, or may be connected to the core network via the access network.

In addition, the DN_A5 and the PDN_A6 are data networks that provide communication services to the UE_A10, may be configured as packet data service networks, or may be configured for each service. Also, the DN_A5 may include a connected communication terminal. Therefore, the connection to the DN_A5 may refer to the connection to a communication terminal or a server apparatus deployed in the DN_A5. Furthermore, transmission and/or reception of user data to and/or from the DN_A5 may refer to transmission and/or reception of user data to and/or from a communication terminal or a server apparatus deployed in the DN_A5. In addition, although the DN_A5 is outside the core network in FIG. 1, it may be located within the core network.

In addition, the core network_A90 and/or the core network_B190 may be configured as an apparatus within one or more core networks. Here, an apparatus within the core network may be an apparatus that performs part or all of processing or functions of apparatuses included in the core network_A90 and/or the core network_B190. It should be noted that the apparatus within the core network may be referred to as a core network apparatus.

Furthermore, the core network is an IP mobile communication network operated by a mobile network operator (MNO) and connected to an access network and/or a DN. The core network may be a core network for a mobile communication operator to operate and manage the mobile communication system 1, or may be a core network for a virtual mobile communication operator or a virtual mobile communication service provider such as an MVNO (Mobile Virtual Network Operator) or an MVNE (Mobile Virtual Network Enabler). The core network_A90 may be an EPC (Evolved Packet Core) constituting an EPS (Evolved Packet System), and the core network_B190 may be a 5GC (5G core network) constituting a 5GS. Further, the core network_B190 may be a core network for a system that provides 5G communication services. Conversely, the EPC may be the core network_A90, and the 5GC may be the core network_B190. It should be noted that the core network_A90 and/or the core network_B190 may not be limited to the above, and may be a network for providing mobile communication services.

Next, the core network_A90 will be described. The core network_A90 may include at least one of an HSS (Home Subscriber Server)_A 50, an AAA (Authentication Authorization Accounting), a PCRF (Policy and Charging Rules Function), a PGW_A30, an ePDG, an SGW_A35, an MME (Mobility Management Entity)_A40, an SGSN (Serving GPRS Support Node), and an SCEF. In addition, these may be configured as NFs (Network Functions). The NF may be a processing function included in a network. In addition, the core network_A90 can be connected to a plurality of radio access networks (e.g., the UTRAN_A20 and the E-UTRAN_A80).

Although only the HSS (HSS_A50), the PGW (PGW_A30), the SGW (SGW_A35), and the MME (MME_A40) among the network functions are described in FIG. 3 for simplicity, it does not mean that no other apparatuses and/or NFs are included therein. For simplicity, the UE_A10 is also referred to as a UE, the HSS_A50 is also referred to as an HSS, the PGW_A30 is also referred to as a PGW, the SGW_A35 is also referred to as an SGW, the MME_A40 is also referred to as an MME, and the DN_A5 and/or the PDN_A6 is also referred to as a DN or a PDN.

Each apparatus included in the core network_A90 will be briefly described below.

The PGW_A30 is a relay apparatus that is connected to the DN, the SGW_A35, the ePDG, the WLAN ANa70, the PCRF, and the AAA, and transfers user data as a gateway between the DN (the DN_A5 and/or the PDN_A6) and the core network_A90. In addition, the PGW_A30 may serve as a gateway for IP communication and/or non-IP communication. Furthermore, the PGW_A30 may have a function of transferring the IP communication, or may have a function of performing conversion between the non-IP communication and the IP communication. Moreover, a plurality of such gateways may be deployed in the core network_A90. Also, the plurality of gateways deployed may serve as gateways for connecting the core network_A90 to a single DN.

It should be noted that a user plane (U-Plane; UP) may be a communication path for transmitting and/or receiving user data, and may include a plurality of bearers. Further, a control plane (C-Plane; CP) may be a communication path for transmitting and/or receiving a control message, and may include a plurality of bearers.

Furthermore, the PGW_A30 may be connected to the SGW, the DN, a UPF (User Plane Function) and/or a SMF (Session Management Function), and may be connected to the UE_A10 via the U-Plane. Moreover, the PGW_A30 may be configured integrally with the UPF_A235 and/or the SMF_A230.

The SGW_A35 is a relay apparatus that is connected to the PGW_A30, the MME_A40, the E-UTRAN_A80, the SGSN, and the UTRAN_A20, and transfers user data as a gateway between the core network_A90 and the 3GPP access network (the UTRAN_A20, a GERAN, or the E-UTRAN_A80).

The MME_A40 is a control apparatus that is connected to the SGW_A35, the access network, the HSS_A50, and the SCEF and performs location information management, including mobility management of the UE_A10 via the access network, and access control. Further, the MME_A40 may include a function as a session management apparatus that manages a session established by the UE_A10. In addition, a plurality of such control apparatuses may be deployed in the core network_A90, and, for example, a location management apparatus different from the MME_A40 may also be configured. Similar to the MME_A40, a location management apparatus different from the MME_A40 may be connected to the SGW_A35, the access network, the SCEF, and the HSS_A50. Furthermore, the MME_A40 may be connected to an AMF (Access and Mobility Management).

In addition, when a plurality of MMEs are included in the core network_A90, the MMEs may be connected to each other. As a result, a context of the UE_A10 may be transmitted and/or received between the MMEs. In this way, the MME_A40 is a management apparatus that transmits and/or receives control information related to mobility management and session management to and/or from the UE_A10. In other words, the MME_A40 may be a control apparatus for a control plane (C-Plane; CP).

Further, although the example in which the MME_A40 is configured to be included in the core network_A90 has been described, the MME_A40 may be a management apparatus configured in one or more core networks, DCNs, or NSIs, or may be a management apparatus connected to one or more core networks, DCNs, or NSIs. Here, a plurality of DCNs or NSIs may be operated by a single network operator or by different network operators respectively.

In addition, the MME_A40 may be a relay apparatus that transfers user data as a gateway between the core network_A90 and the access network. Besides, the user data transmitted and/or received by the MME_A40 serving as a gateway may be small data.

Further, the MME_A40 may be an NF that functions for mobility management of the UE_A10 or the like, or an NF that manages one or more NSIs. In addition, the MME_A40 may be an NF that functions for one or more of the above functions. Besides, the NF may be one or more apparatuses deployed in the core network_A90, may be a CP function (hereinafter, also referred to as a Control Plane Function (CPF) or a Control Plane Network Function) for control information and/or control messages, or may be a common CP function shared between a plurality of network slices.

Here, the NF refers to a processing function configured in a network. In other words, the NF may be a function apparatus such as an MME, an SGW, a PGW, a CPF, an AMF, an SMF, or a UPF, or may be a function such as MM (Mobility Management) or SM (Session Management), or capability information. In addition, the NF may be a function apparatus for implementing a single function, or may be a function apparatus for implementing a plurality of functions. For example, an NF for implementing the MM function and an NF for implementing the SM function may be separately present, or an NF for implementing both the MM function and the SM function may be present.

The HSS_A50 is a management node that is connected to the MME_A40, the AAA, and the SCEF, and manages subscriber information. The subscriber information of the HSS_A50 is referred to, for example, at the time of access control of the MME_A40. Further, the HSS_A50 may be connected to a location management apparatus different from the MME_A40. For example, the HSS_A50 may be connected to CPF_A140.

Furthermore, the HSS_A50 and UDM (Unified Data Management)_A245 may be configured as different apparatuses and/or NFs, or may be configured as the same apparatus and/or NF.

The AAA is connected to the PGW30, the HSS_A50, the PCRF, and the WLAN ANa70, and performs access control with respect to the UE_A10 connected via the WLAN ANa70.

The PCRF is connected to the PGW_A30, the WLAN ANa75, the AAA, the DN_A5 and/or the PDN_A6, and performs QoS management for data delivery. For example, the PCRF performs QoS management for a communication path between the UE_A10 and the DN_A5, and/or the PDN_A6. Further, the PCRF may be an apparatus that generates and/or manages a PCC (Policy and Charging Control) rule and/or a routing rule used by each apparatus to transmit and/or receive user data.

In addition, the PCRF may be a PCF that generates and/or manages a policy. More specifically, the PCRF may be connected to the UPF_A235.

The ePDG is connected to the PGW30 and the WLAN ANb75 and delivers user data as a gateway between the core network_A90 and the WLAN ANb75.

The SGSN is a control apparatus that is connected to the UTRAN_A20, the GERAN, and the SGW_A35 and performs location management between a 3G/2G access network (UTRAN/GERAN) and an LTE (4G) access network (E-UTRAN). In addition, the SGSN has functions of selecting the PGW and the SGW, managing a time zone of the UE_A10, and selecting the MME_A40 at the time of a handover to the E-UTRAN.

The SCEF is a relay apparatus that is connected to the DN_A5 and/or the PDN_A6, the MME_A40, and the HSS_A50 and transfers the user data as a gateway connecting the DN_A5 and/or the PDN_A6 to the core network_A90. Besides, the SCEF may serve as a gateway for non-IP communication. Further, the SCEF may include a function of performing conversion between non-IP communication and IP communication. In addition, a plurality of such gateways may be deployed in the core network_A90. Furthermore, a plurality of gateways connecting the core network_A90 to a single DN_A5 and/or PDN_A6 and/or DN may also be deployed. Besides, the SCEF may be configured outside or inside the core network.

Next, the core network_B190 will be described. The core network_B190 may include at least one of an AUSF (Authentication Server Function), an AMF (Access and Mobility Management Function)_A240, a UDSF (Unstructured Data Storage Network Function), an NEF (Network Exposure Function), an NRF (Network Repository Function), a PCF (Policy Control Function), an SMF (Session Management Function)_A230, a UDM (Unified Data Management), a UPF (User Plane Function)_A235, an AF (Application Function), and an N3IWF (Non-3GPP InterWorking Function). In addition, these may be configured as NFs (Network Functions). The NF may refer to a processing function configured in a network.

For simplicity, FIG. 4 only shows an AMF (AMF_A240), an SMF (SMF_A230), and a UPF (UPF_A235) among the above elements, but it does not mean that elements (apparatuses and/or NFs (Network Functions)) other than the above are not included therein. It should be noted that, for simplicity, the UE_A10 is also referred to as a UE, the AMF_A240 is also referred to as an AMF, the SMF_A230 is also referred to as an SMF, the UPF_A235 is also referred to as a UPF, and the DN_A5 is also referred to as a DN.

In addition, FIG. 4 shows an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between the (R)AN (access network) and the AMF, and the N3 interface is an interface between the (R)AN (access network) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R)AN will also be referred to as an NG RAN.

Each apparatus included in the core network_B190 will be briefly described below.

First, the AMF_A240 is connected to another AMF, the SMF (SMF_A230), the access network (i.e., the UTRAN_A20, the E-UTRAN_A80, or an NG-RAN_A120), a UDM, an AUSF, and a PCF. The AMF_A240 may function for registration management, connection management, reachability management, mobility management of the UE_A10 or the like, transmission of a session management (SM) message between the UE and the SMF, access authentication (or access authorization), a security anchor function (SEA), security context management (SCM), support for the N2 interface for the N3IWF, support for transmission and/or reception of NAS signals to and/or from the UE via the N3IWF, authentication of the UE connected via the N3IWF, management of registration management (RM) states, management of connection management (CM) states, and the like. In addition, one or more AMFs_A240 may be deployed within the core network_B190. In addition, the AMF_A240 may be an NF that manages one or more NSIs (Network Slice Instances). In addition, the AMF_A240 may also be a common control plane network function (CCNF; Common CPNF) shared by a plurality of NSIs.

In addition, the RM state includes a deregistered state (RM-DEREGISTERED state) and a registered state (RM-REGISTERED state). In the RM-DEREGISTERED state, the UE is not registered in the network, so that the UE context in the AMF does not have valid location information or routing information for the UE, so the AMF is unable to reach the UE. In the RM-REGISTERED state, the UE is registered with the network, so that the UE can receive services that require registration with the network.

In addition, the CM state includes a non-connected state (CM-IDLE state) and a connected state (CM-CONNECTED state). In the CM-IDLE state, the UE stays in the RM-REGISTERED state, but does not have a NAS signaling connection established with the AMF via the N1 interface. In addition, in the CM-IDLE state, the UE does not have an N2 interface connection (N2 connection) or an N3 interface connection (N3 connection). On the other hand, in the CM-CONNECTED state, the UE has an NAS signaling connection established with the AMF via the N1 interface. In addition, in the CM-CONNECTED state, the UE may have an N2 interface connection (N2 connection) and/or an N3 interface connection (N3 connection).

In addition, the SMF_A230 may have following functions: a session management (SM) function for PDU sessions or the like, an IP address allocation for UE and management function, a UPF selection and control function, a UPF configuration function for routing traffic to an appropriate destination, a function for reporting arrival of downlink data (Downlink Data Notification), a function for providing SM information unique to an AN (each AN) to be transmitted to the AN over the N2 interface via the AMF, a function for determining an SSC mode (Session and Service Continuity mode) for a session, a roaming function, and the like. In addition, the SMF_A230 may be connected to the AMF_A240, the UPF_A235, the UDM, and the PCF.

In addition, the UPF_A235 is connected to the DN_A5, the SMF_A230, another UPF, and the access network (i.e., the UTRAN_A20, the E-UTRAN_A80, or the NG-RAN_A120). The UPF_A235 may have the following functions: an anchor for intra-RAT mobility or inter-RAT mobility, packet routing & forwarding, a UL CL (Uplink Classifier) function for supporting routing of a plurality of traffic flows for one DN, a branching point function for supporting a multi-homed PDU session, QoS processing for a user plane, verification of uplink traffic, buffering of downlink packets, a function for triggering downlink data notification, and the like. In addition, the UPF_A235 may be a relay apparatus that transfers the user data as a gateway between the DN_A5 and the core network_B190. Further, the UPF_A235 may serve as a gateway for IP communication and/or non-IP communication. Furthermore, the UPF_A235 may have a function of transferring the IP communication, or may have a function of performing conversion between the non-IP communication and the IP communication. Moreover, a plurality of deployed gateways may serve as gateways for connecting the core network_B190 to a single DN. Besides, the UPF_A235 may have connectivity with other NFs, or may be connected to each apparatus via other NFs.

It should be noted that a UPF_C239 (also referred to as a branching point or an uplink classifier), which is a UPF different from the UPF_A235, may be present as an apparatus or an NF between the UPF_A235 and the access network. When the UPF_C239 is present, a PDU session between the UE_A10 and the DN_A5 is established via the access network, the UPF_C239, and the UPF_A235.

In addition, the AUSF is connected to the UDM and the AMF_A240. The AUSF functions as an authentication server.

The UDSF provides a function for all NFs to store or retrieve information as unstructured data.

The NEF provides means for safely providing services and capabilities provided through the 3GPP network. Information received from another NF is stored as structured data.

When the NRF receive an NF Discovery Request from an NF instance, the NRF provides the NF with information of discovered NF instances or holds information of available NF instances or services supported by the instances.

The PCF is connected to the SMF (SMF_A230), the AF, and the AMF_A240. The PCF provides a policy rule and the like.

The UDM is connected to the AMF_A240, the SMF (SMF_A230), the AUSF, and the PCF. The UDM includes a UDM FE (application front end) and a UDR (User Data Repository).

The UDM FE performs processing of authentication information (credentials), location management, subscriber management (subscription management), and the like. The UDR stores data required to be provided by the UDM FE and policy profiles required by the PCF.

The AF is connected to the PCF. The AF affects traffic routing or is involved in policy control.

The N3IWF provides the functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying a user plane packet between the UE and the UPF, selecting the AMF, and the like.

In addition, an S1 mode is a UE mode in which messages can be transmitted and received by using an S1 interface. Further, the S1 interface may include an S1-MME interface, an S1-U interface and an X2 interface that connects radio base stations.

The UE in the S1 mode can perform, for example, an access to the EPC via an eNB that provides an E-UTRA function or to the EPC via an en-gNB that provides an NR function.

Although the access to the EPC via the eNB that provides the E-UTRA function and the access to the EPC via the en-gNB that provides the NR function are set to the S1 mode, they may be set to different modes, respectively.

In addition, an N1 mode is a UE mode in which the UE can access a 5GC via a 5G access network. In addition, an N1 mode may also be a UE mode in which messages can be transmitted and received by using an N1 interface. Further, the N1 interface may include an N1 interface and an Xn interface that connects radio base stations.

The UE in the N1 mode can perform, for example, an access to a 5GC via an ng-eNB that provides an E-UTRA function or to a 5GC via a gNB that provides an NR function.

Furthermore, the access to the 5GC via the ng-eNB that provides the E-UTRA function and the access to the 5GC via the gNB that provides the NR function are set to the N1 mode, but they may be set to different modes, respectively.

[1.2. Configuration of Each Apparatus]

Hereinafter, a configuration of each apparatus will be described. It should be noted that some or all functions of each apparatus and each unit of an apparatus described below may operate on physical hardware or may operate on logical hardware that is virtually configured on a general-purpose hardware.

[1.2.1. Configuration of UE]

Figure 5:
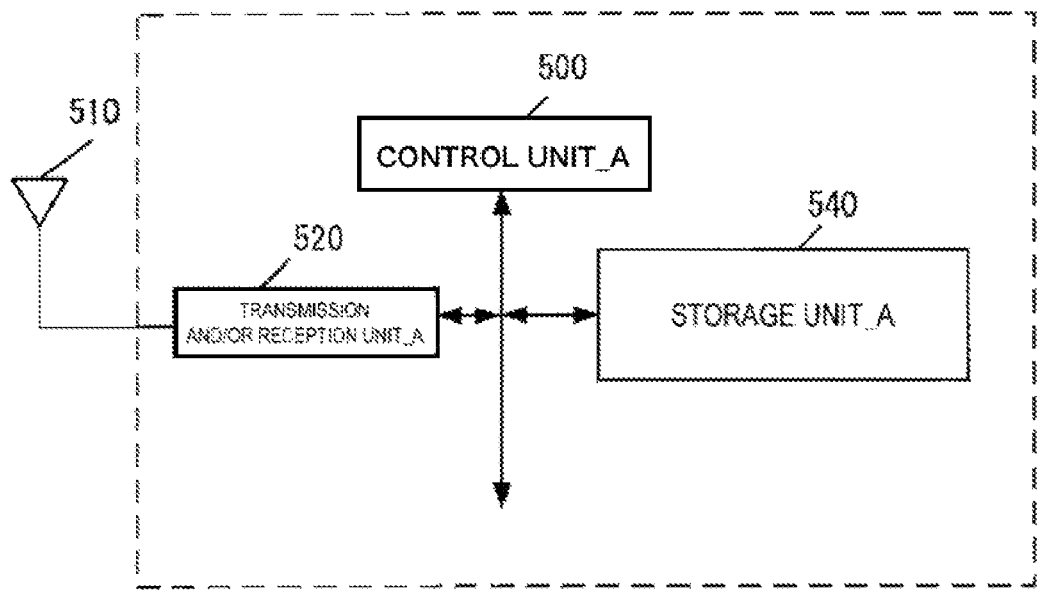
FIG. 5 is a diagram illustrating an apparatus configuration of a UE.

First, an example of an apparatus configuration of the UE_A10 is illustrated in FIG. 5. As illustrated in FIG. 5, the UE_A10 includes a control unit_A500, a transmission and/or reception unit_A520, and a storage unit_A540. The transmission and/or reception unit_A520 and the storage unit_A540 are connected to the control unit_A500 via a bus. In addition, an external antenna 410 is connected to the transmission and/or reception unit_A520.

The control unit_A500 is a functional unit for controlling the entire UE_A10, and implements various processing of the entire UE_A10 by reading out and executing various types of information and programs stored in the storage unit_A540.

The transmission and/or reception unit_A520 is a functional unit for the UE_A10 to connect to the base station (the UTRAN_A20, the E-UTRAN_A80, or the NG-RAN_A120) and/or the wireless LAN access point (WLAN AN) in the access network, and to connect to the access network. In other words, the UE_A10 can connect to the base station and/or the access point in the access network via the external antenna 410 connected to the transmission and/or reception unit_A520. Specifically, the UE_A10 can transmit and/or receive user data and/or control information to and/or from the base station and/or the access point in the access network via the external antenna 410 connected to the transmission and/or reception unit_A520.

The storage unit_A540 is a functional unit that stores programs, data, and the like required for each operation of the UE_A10, and includes, for example, a semiconductor memory, an HDD (Hard Disk Drive), an SSD (Solid State Drive), and the like. The storage unit_A540 stores identification information, control information, a flag, a parameter, a rule, a policy, and the like included in a control message which is transmitted and/or received in a communication procedure described below.

[1.2.2. eNB/NR Node]

Figure 6:
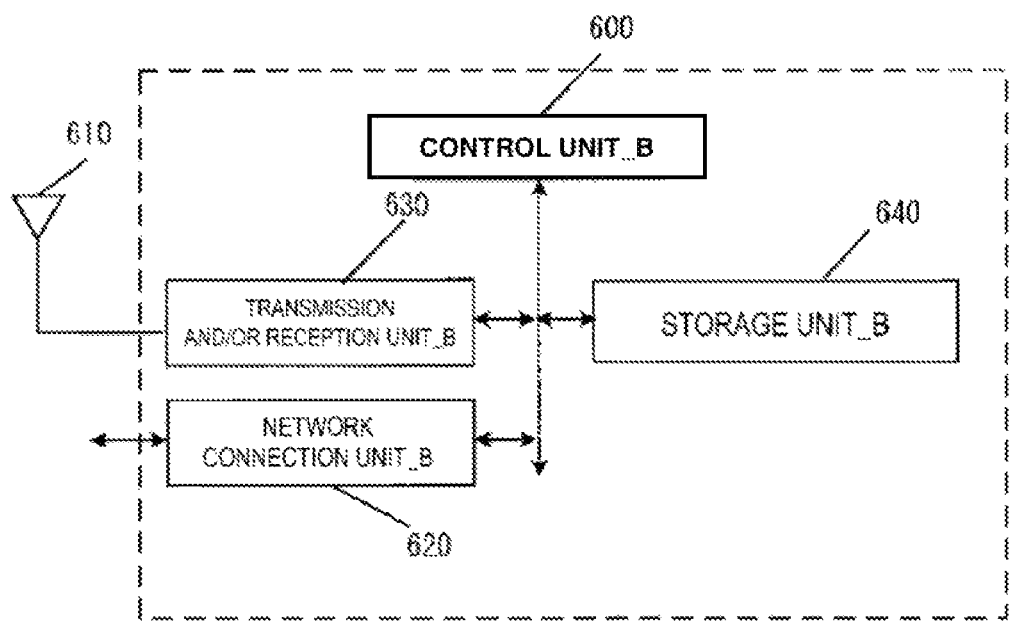
FIG. 6 is a diagram illustrating an apparatus configuration of an eNB/NR node.

Next, FIG. 6 illustrates an example of an apparatus configuration of the eNB_A45 and the NR node_A122. As illustrated in FIG. 6, the eNB_A45 and the NR node_A122 include a control unit_B600, a network connection unit_B620, a transmission and/or reception unit_B630, and a storage unit_B640. The network connection unit_B620, the transmission and/or reception unit_B630, and the storage unit_B640 are connected to the control unit_B600 via a bus. In addition, an external antenna 510 is connected to the transmission and/or reception unit_B630.

The control unit_B600 is a functional unit for controlling the entire eNB_A45 and NR node_A122, and implements various processing of the entire eNB_A45 and NR node_A122 by reading out and executing various types of information and programs stored in the storage unit_B640.

The network connection unit_B620 is a functional unit for the eNB_A45 and the NR node_A122 to connect to the AMF_A240 and the UPF_A235 within the core network. In other words, the eNB_A45 and the NR node_A122 can be connected to the AMF_A240 and the UPF_A235 within the core network via the network connection unit_B620. Specifically, the eNB_A45 and the NR node_A122 can transmit and/or receive user data and/or control information to and/or from the AMF_A240 and/or the UPF_A235 via the network connection unit_B620.

The transmission and/or reception unit_B630 is a functional unit for the eNB_A45 and the NR node_A122 to connect to the UE_A10. In other words, the eNB_A45 and the NR node_A122 can transmit and/or receive user data and/or control information to and/or from the UE_A10 via the transmission and/or reception unit_B630.

The storage unit_B640 is a functional unit for storing programs, data, and the like required for each operation of the eNB_A45 and the NR node_A122. The storage unit_B640 includes, for example, a semiconductor memory, an HDD, an SSD, and the like. The storage unit_B640 stores identification information, control information, a flag, a parameter, and the like included in a control message which is transmitted and/or received in a communication procedure described below. The storage unit_B640 can store the information as context for each UE_A10.

[1.2.3. Configuration of MME/AMF]

Figure 7:
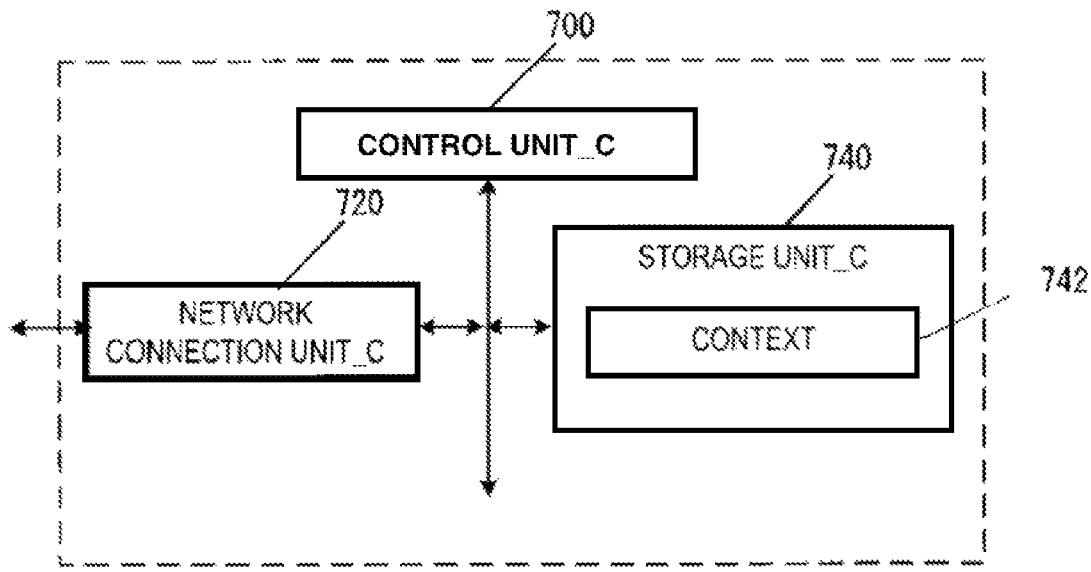
FIG. 7 is a diagram illustrating an apparatus configuration of an MME/AMF.

Next, FIG. 7 illustrates an example of an apparatus configuration of the MME_A40 and/or the AMF_A240. As illustrated in FIG. 7, the MME_A40 and/or the AMF_A240 include a control unit_C700, a network connection unit_C720, and a storage unit_C740. The network connection unit_C720 and the storage unit_C740 are connected to the control unit_C700 via a bus. In addition, the storage unit_C740 stores a context 642.

The control unit_C700 is a functional unit for controlling the entire MME_A40 or AMF_A240, and implements various processing of the entire AMF_A240 by reading out and executing various types of information and programs stored in the storage unit_C740.

The network connection unit_C720 is a functional unit for the MME_A40 and/or the AMF_A240 to connect to another MME_A40, AMF 240, SMF_A230, a base station (the UTRAN_A20, the E-UTRAN_A80 or the NG-RAN_A120) within the access network and/or a wireless LAN access point (WLAN AN), the UDM, the AUSF, and the PCF. In other words, the MME_A40 or the AMF_A240 can transmit and/or receive via the network connection unit_C720 user data and/or control information to and/or from the base station and/or an access point within the access network, the UDM, the AUSF, and the PCF.

The storage unit_C740 is a functional unit for storing programs, data, and the like required for each operation of the MME_A40 or the AMF_A240. The storage unit_C740 includes, for example, a semiconductor memory, an HDD, an SSD, and the like. The storage unit_C740 stores identification information, control information, a flag, a parameter, and the like included in a control message which is transmitted and/or received in a communication procedure described below. The context 642 stored in the storage unit_C740 may include a context stored for each UE, a context stored for each PDU session, and a context stored for each bearer. The context stored for each UE may include an IMSI, an MSISDN, an MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. In addition, the context stored for each PDU session may include an APN in Use, an Assigned Session Type, IP address(es), a PGW F-TEID, an SCEF ID, and a Default Bearer. In addition, the context stored for each bearer may include an EPS Bearer ID, a TI, a TFT, an SGW F-TEID, a PGW F-TEID, an MME F-TEID, an eNB address, an NR node address, a WAG address, an eNB ID, an NR node ID, and a WAG ID.

[1.2.4. Configuration of SMF]

Figure 8:
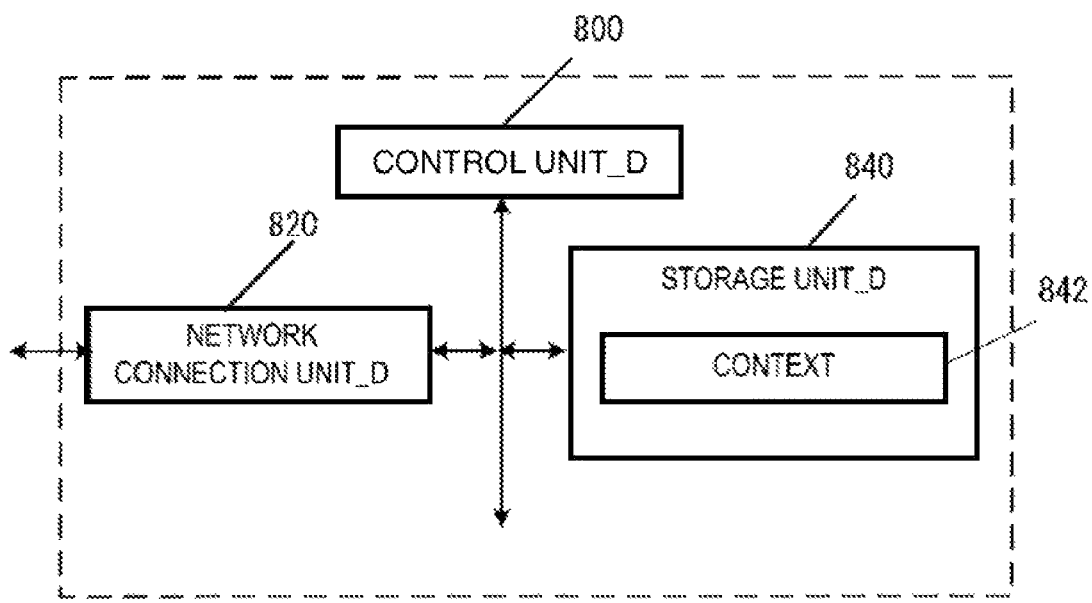
FIG. 8 is a diagram illustrating an apparatus configuration of an SMF/PGW/UPF.

Next, FIG. 8 illustrates an example of an apparatus configuration of the SMF_A230. As illustrated in FIG. 8, the SMF_A230 includes a control unit_D800, a network connection unit_D820, and a storage unit_D840. The network connection unit_D820 and the storage unit_D840 are connected to the control unit_D800 via a bus. In addition, the storage unit_D840 stores a context 742.

The control unit_D800 of the SMF_A230 is a functional unit for controlling the entire SMF_A230, and implements various processing of the entire SMF_A230 by reading out and executing various types of information and programs stored in the storage unit_D840.

In addition, the network connection unit_D820 of the SMF_A230 is a functional unit for the SMF_A230 to connect to the AMF_A240, the UPF_A235, the UDM, and the PCF. In other words, the SMF_A230 can transmit and/or receive via the network connection unit_D820 user data and/or control information to and/or from the AMF_A240, the UPF_A235, the UDM, and the PCF.

In addition, the storage unit_D840 of the SMF_A230 is a functional unit for storing programs, data, and the like required for each operation of the SMF_A230. The storage unit_D840 of the SMF_A230 includes, for example, a semiconductor memory, an HDD, an SSD, or the like. The storage unit_D840 of the SMF_A230 stores identification information, control information, a flag, a parameter, and the like included in a control message which is transmitted and/or received in the communication procedure described below. In addition, the context 742 stored in the storage unit_D840 of the SMF_A230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in Use. It should be noted that the context stored for each APN may be stored for each Data Network Identifier. The context stored for each PDU session may include an Assigned Session Type, IP address(es), an SGW F-TEID, a PGW F-TEID, and a Default Bearer. The context stored for each bearer may include an EPS Bearer ID, a TFT, an SGW F-TEID, and a PGW F-TEID.

[1.2.5. Configuration of PGW/UPF]

Next, FIG. 8 illustrates an example of an apparatus configuration of the PGW_A30 and/or the UPF_A235. As illustrated in FIG. 8, each of the PGW_A30 and/or the UPF_A235 includes a control unit_D800, a network connection unit_D820, and a storage unit_D840. The network connection unit_D820 and the storage unit_D840 are connected to the control unit_D800 via a bus. In addition, the storage unit_D840 stores a context 742.

The control unit_D800 of the PGW_A30 or the UPF_A235 is a functional unit for controlling the entire PGW_A30 or UPF_A235, and implements various processing of the entire PGW_A30 or the UPF_A235 by reading out and executing various types of information and programs stored in the storage unit_D840.

In addition, the network connection unit_D820 of the PGW_A30 or the UPF_A235 is a functional unit for the PGW_A30 or the UPF_A235 to connect to the DN (that is, the DN_A5), the SMF_A230, another UPF_A235, and the access network (i.e., the UTRAN_A20, the E-UTRAN_A80, and the NG-RAN_A120). In other words, the UPF_A235 can transmit and/or receive via the network connection unit_D820 user data and/or control information to and from the DN (i.e., the DN_A5), the SMF_A230, another UPF_A235, and the access network (i.e., the UTRAN_A20, the E-UTRAN_A80, or the NG-RAN_A120).

In addition, the storage unit_D840 of the UPF_A235 is a functional unit for storing programs, data, and the like required for each operation by the UPF_A235. The storage unit_D840 of the UPF_A235 includes, for example, a semiconductor memory, an HDD, an SSD, or the like. The storage unit_D840 of the UPF_A235 stores identification information, control information, a flag, a parameter, and the like included in a control message which is transmitted and/or received in the communication procedure described below. In addition, the context 742 stored in the storage unit_D840 of the UPF_A235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in Use. It should be noted that the context stored for each APN may be stored for each Data Network Identifier. The context stored for each PDU session may include an Assigned Session Type, IP address(es), an SGW F-TEID, a PGW F-TEID, and a Default Bearer. The context stored for each bearer may include an EPS Bearer ID, a TFT, an SGW F-TEID, and a PGW F-TEID.

[1.2.6. Information Stored in Storage Unit of Each Above-Described Apparatus]

Next, each piece of information stored in the storage unit of each of the above-described apparatuses will be described.

The IMSI (International Mobile Subscriber Identity) is permanent identification information of a subscriber (user), and is identification information assigned to a user using the UE. The IMSI stored by the UE_A10, the MME_A40/CPF_A140/AMF_A2400, and the SGW_A35 may be the same as the IMSI stored by an HSS_A50.

The EMM state/MM state indicates a mobility management state of the UE_A10 or the MME_A40/CPF_A140/AMF_A240. For example, the EMM state/MM state may be an EMM-REGISTERED state (registered state) in which the UE_A10 is registered in a network, and/or an EMM-DEREGISTERD state (non-registered state) in which the UE_A10 is not registered in a network. In addition, the EMM state/MM state may be an ECM-CONNECTED state in which a connection is maintained between the UE_A10 and the core network, and/or an ECM-IDLE state in which the connection is released. It should be noted that the EMM state/MM state may be information for distinguishing a state in which the UE_A10 is registered in an EPC from a state in which the UE_A10 is registered in an NGC or 5GC.

The GUTI (Globally Unique Temporary Identity) is temporary identification information of the UE_A10. The GUTI includes identification information (Globally Unique MME Identifier (GUMMEI)) of the MME_A40/CPF_A140/AMF_A240 and identification information (M-Temporary Mobile Subscriber Identity (M-TMSI)) of the UE_A10 in a specific MME_A40/CPF_A140/AMF_A240. The ME identity is an ID of the UE_A10 or the ME, and may be, for example, an IMEI (International Mobile Equipment Identity) or an IMEISV (IMEI Software Version). The MSISDN represents a basic telephone number of the UE_A10. The MSISDN stored by the MME_A40/CPF_A140/AMF_A240 may be information indicated by the storage unit of the HSS_A50. In addition, the GUTI may include information for identifying the CPF_140.

The MME F-TEID is information for identifying the MME_A40/CPF_A140/AMF_A240. The MME F-TEID may include an IP address of the MME_A40/CPF_A140/AMF_A240, a TEID (Tunnel Endpoint Identifier) of the MME_A40/CPF_A140/AMF_A240, or both of them. In addition, the IP address of the MME_A40/CPF_A140/AMF_A240 and the TEID of the MME_A40/CPF_A140/AMF_A240 may be stored independently. In addition, the MME F-TEID may be identification information for user data, or identification information for control information.

The SGW F-TEID is information for identifying the SGW_A35. The SGW F-TEID may include an IP address of the SGW_A35, a TEID of the SGW_A35, or both of them. In addition, the IP address of the SGW_A35 and the TEID of the SGW_A35 may be stored independently. In addition, the SGW F-TEID may be identification information for user data, or identification information for control information.

The PGW F-TEID is information for identifying the PGW_A30/UPGW_A130/SMF_A230/UPF_A235. The PGW F-TEID may include an IP address of the PGW_A30/UPGW_A130/SMF_A230/UPF_A235, a TEID of the PGW_A30/UPGW_A130/SMF_A230/UPF_A235, or both of them. In addition, the IP address of the PGW_A30/UPGW_A130/SMF_A230/UPF_A235 and the TEID of the PGW_A30/UPGW_A130/SMF_A230/UPF_A235 may be stored independently. In addition, the PGW F-TEID may be identification information for user data, or identification information for control information.

The eNB F-TEID is information for identifying the eNB_A45. The eNB F-TEID may include an IP address of the eNB_A45, a TEID of the eNB_A45, or both of them. In addition, the IP address of the eNB_A45 and the TEID of the SGW_A35 may be stored independently. In addition, the eNB F-TEID may be identification information for user data, or identification information for control information.

In addition, the APN may be identification information for identifying the core network and an external network such as the DN. Further, the APN can also be used as information for selecting a gateway such as the PGW_A30/UPGW_A130/UPF_A235 for connecting the core network A_90. It should be noted that the APN may be a DNN (Data Network Name). Therefore, the APN may be represented by a DNN, or the DNN may be represented by the APN.

In addition, the APN may be identification information for identifying such a gateway, or identification information for identifying an external network such as the DN. Further, when a plurality of gateways connecting the core network and the DN are deployed, there may be a plurality of gateways that can be selected according to the APN. Furthermore, one gateway may be selected among such a plurality of gateways in another method that uses identification information other than the APN.

The UE radio access capability is identification information indicating a radio access capability of the UE_A10. The UE network capability includes a security algorithm and a key derivation function supported by the UE_A10. The MS network capability is information including, for the UE_A10 having GERAN_A25 and/or UTRAN_A20 function(s), one or more pieces of information required for an SGSN_A42. The access restriction is registration information for access restriction. The eNB address is an IP address of the eNB_A45. The MME UE S1AP ID is information for identifying the UE_A10 within the MME_A40/CPF_A140/

AMF_A240. The eNB UE S1AP ID is information for identifying the UE_A10 within the eNB_A45.

The APN in Use is an APN recently used. The APN in Use may be a data network identifier. The APN may include identification information of a network and identification information of a default operator. Further, the APN in Use may be information for identifying a DN with which a PDU session is established.

The Assigned Session Type is information indicating a PDU session type. The Assigned Session Type may be Assigned PDN Type. The PDU session type may be IP or non-IP. Furthermore, when the PDU session type is IP, information indicating a PDN type allocated by the network may be further included. It should be noted that the Assigned Session Type may be IPv4, IPv6, or IPv4v6.

In addition, if it is not specifically specified, the IP address refers to an IP address allocated to the UE. The IP address may be an IPv4 address, an IPv6 address, an IPv6 prefix, or an interface ID. It should be noted that when the Assigned Session Type indicates non-IP, an IP address element may not be included.

A DN ID is identification information for identifying the core network_B190 and an external network such as the DN. Further, the DN ID can also be used as information for selecting a gateway such as the UPGW_A130 or the PF_A235 connecting the core network_B190.

In addition, the DN ID may be identification information for identifying such a gateway, or identification information for identifying an external network such as the DN. Further, when a plurality of gateways connecting the core network_B190 and the DN are deployed, there may be a plurality of gateways that can be selected according to the DN ID. Furthermore, one gateway may be selected among such a plurality of gateways in another method that uses identification information other than the DN ID.

Moreover, the DN ID may be information equivalent to the APN or different from the APN. If the DN ID is information different from the APN, each apparatus may manage information indicating a corresponding relationship between the DN ID and the APN, perform a procedure to inquire the APN by using the DN ID, or perform a procedure to inquire the DN ID by using the APN.

The SCEF ID is an IP address of an SCEF_A46 used in a PDU session. The Default Bearer is information acquired and/or generated at the time when a PDU session is established and is EPS bearer identification information for identifying a default bearer associated with the PDU session.

The EPS Bearer ID is identification information of an EPS bearer. In addition, the EPS Bearer ID may be identification information for identifying an SRB (Signalling Radio Bearer) and/or a CRB (Control-plane Radio bearer), or identification information for identifying a DRB (Data Radio Bearer). A TI (Transaction Identifier) is identification information for identifying a bidirectional message flow (Transaction). It should be noted that the EPS Bearer ID may be EPS bearer identification information for identifying a dedicated bearer. Therefore, the EPS bearer ID may be identification information for identifying an EPS bearer different from a default bearer. The TFT indicates all packet filters associated with the EPS bearer. The TFT is information for identifying a part of user data to be transmitted and/or received, and the UE_A10 uses the EPS bearer associated with the TFT to transmit and/or receive the user data identified by the TFT. In other words, the UE_A10 uses an RB (Radio Bearer) associated with the TFT to transmit and/or receive the user data identified by the TFT. In addition, the TFT may associate the user data such as application data to be transmitted and/or received with an appropriate transfer path, and may be identification information for identifying application data. In addition, the UE_A10 may use the default bearer to transmit and/or receive user data which cannot be identified by the TFT. In addition, the UE_A10 may store in advance the TFT associated with the default bearer.

The Default Bearer is EPS bearer identification information for identifying a default bearer associated with a PDU session. It should be noted that the EPS bearer may be a logical communication path established between the UE_A10 and the PGW_A30/UPGW_A130/UPF_A235, or a communication path constituting a PDN connection/PDU session. Further, the EPS bearer may be a default bearer or a dedicated bearer. Furthermore, the EPS bearer may include an RB established between the UE_A10 and the base station and/or the access point within the access network. Moreover, the RB and the EPS bearer may be associated with each other on a one-to-one basis. Therefore, identification information of the RB and identification information of the EPS bearer may be associated with each other on a one-to-one basis, or may be the same identification information. It should be noted that the RB may be an SRB and/or a CRB, or a DRB. Furthermore, the Default Bearer may be information that the UE_A10 and/or the SGW_A35 and/or the PGW_A30/UPGW_A130/SMF_A230/UPF_A235 acquire from the core network at the time when a PDU session is established. It should be noted that the default bearer is an EPS bearer initially established in a PDN connection/PDU session, and is an EPS bearer that can be established only once in one PDN connection/PDU session. The default bearer may also be an EPS bearer that can be used for communication of user data that is not associated with the TFT. In addition, the dedicated bearer is an EPS bearer established after a default bearer is established in a PDN connection/PDU session, and is an EPS bearer that can be established multiple times during one PDN connection/PDU session. The dedicated bearer is an EPS bearer that can be used for communication of user data associated with the TFT.

A User Identity is information for identifying a subscriber. The User Identity may be an IMSI or an MSISDN. Further, the User Identity may also be identification information other than the IMSI or the MSISDN. Serving Node Information is information for identifying the MME_A40/CPF_A140/AMF_A240 used in a PDU session, and may be an IP address of the MME_A40/CPF_A140/AMF_A240.

The eNB address is an IP address of the eNB_A45. The eNB ID is information for identifying the UE in the eNB_A45. An MME address is an IP address of the MME_A40/CPF_A140/AMF_A240. An MME ID is information for identifying the MME_A40/CPF_A140/AMF_A240. The NR node address is an IP address of the NR node_A122. The NR node ID is information for identifying the NR node_A122. The WAG address is an IP address of a WAG. The WAG ID is information for identifying a WAG.

The anchor or anchor point is a UFP that functions as a gateway for DN and PDU sessions. The UPF serving as an anchor point may also be a PDU session anchor or an anchor.

The SSC mode indicates a mode of Session and Service Continuity supported by the system and/or each apparatus in the 5GC. More specifically, the SSC mode may be a mode indicating a type of Session and Service Continuity supported by a PDU session established between the UE_A10 and the anchor point. Here, the anchor point may be either the UPGW or the UPF_A235. Besides, the SSC mode may be a mode indicating a type of Session and Service Continuity configured for each PDU session. Further, the SSC mode may include three modes, i.e., an SSC mode 1, an SSC mode 2, and an SSC mode 3. The SSC mode is associated with the anchor point and cannot be changed while the PDU session is established.

In addition, the SSC mode 1 of the present embodiment is a mode of Session and Service Continuity in which, when the UE_A10 connects to a network, the same UPF is continuously maintained as an anchor point regardless of access technologies, such as the RAT (Radio Access Technology) and the cell, used. More specifically, the SSC mode 1 may be a mode that achieves the Session and Service Continuity without changing the anchor point used by the established PDU session even in a case that the mobility of the UE_A10 occurs.

Further, the SSC mode 2 of the present embodiment is a mode of Session and Service Continuity in which, when an anchor point associated with one SSC mode 2 is included in the PDU session, the PDU session is first released and then another PDU session is established. More specifically, the SSC mode 2 is a mode in which, when relocation of the anchor point occurs, the PDU session is deleted once and then a new PDU session is established.

Furthermore, the SSC mode 2 is a mode of Session and Service Continuity in which the same UPF is continuously maintained as the anchor point only within a serving area of the UPF. More specifically, the SSC mode 2 may be a mode that achieves the Session and Service Continuity without changing the UPF used by the established PDU session as long as the UE_A10 is within the serving area of the UPF. In addition, the SSC mode 2 may be a mode that achieves the Session and Service Continuity by changing the UPF used by the established PDU session when the mobility of the UE_A10, such as the UE_A10 leaving the serving area of the UPF, occurs.

Here, a TUPF serving area may be an area in which one UPF can provide a Session and Service Continuity function, or a subset of the access network, such as a RAT or a cell, used when the UE_A10 connects to a network. Further, the subset of the access network may be a network including one or more RATs and/or cells, or may be a TA.

Furthermore, the SSC mode 3 of the present embodiment is a mode of Session and Service Continuity in which another PDU session can be established between a new anchor point and the UE for the same DN without releasing the PDU session between the UE and the anchor point.

Moreover, the SSC mode 3 is a mode of Session and Service Continuity that allows a new PDU session and/or communication path to be established via a new UPF for the same DN before disconnecting the PDU session and/or the communication path established between the UE_A10 and the UPF. In addition, the SSC mode 3 may be a mode of Session and Service Continuity that allows the UE_A10 to be multi-homed.

Additionally/alternatively, the SSC mode 3 may be a mode of Session and Service Continuity in which the use of multiple PDU sessions and/or the UPFs associated with the PDU sessions may be permitted. In other words, in the case of the SSC mode 3, each apparatus may achieve the Session and Service Continuity by using a plurality of PDU sessions, or may achieve the Session and Service Continuity by using a plurality of TUPFs.

Here, when each apparatus establishes a new PDU session and/or communication path, a new UPF may be selected by the network, or a new UPF may be an optimal UPF for a place at which the UE_A10 connects to the network. Further, when the multiple PDU sessions and/or the UPFs used by the PDU sessions are valid, the UE_A10 may correlate application and/or flow communications to newly established PDU sessions immediately, or may implement it based on the completion of the communications.

[1.3. Description of Initial Procedure]

Next, before the detailed procedure of an initial procedure in the present embodiment is described, in order to avoid duplicate descriptions, terminology specific to the present embodiment and primary identification information used in each procedure will be described in advance.

In the present embodiment, a network refers to at least some of the access network_A20/80, the access network_B80/120, the core network_A90, the core network_B190, the DN_A5, and the PDN_A6. In addition, one or more apparatuses included in at least some of the access network_A20/80, the access network_B80/120, the core network_A90, the core network_B190, the DN_A5, and the PDN_A6 may also be referred to as a network or a network apparatus. In other words, the expression that a network performs transmission and/or reception of a message and/or performs a procedure means that an apparatus (network apparatus) within a network performs transmission and/or reception of a message and/or performs a procedure.

A session management (SM) message (also referred to as a Non-Access-Stratum (NAS) SM message or an SM message) of the present embodiment may be a NAS message used in a procedure for SM (also referred to as a session management procedure or an SM procedure), or may be a control message transmitted and/or received between the UE_A10 and the SMF_A230 via the AMF_A240. Further, the SM message may include a PDU session establishment request message, a PDU session establishment accept message, a PDU session complete message, a PDU session reject message, a PDU session modification request message, a PDU session modification accept message, a PDU session modification reject message, and the like. In addition, the procedure for SM may include a PDU session establishment procedure, a PDU session modification procedure, and the like.

In the present embodiment, a tracking area (also referred to as TA) is a range that can be represented by location information of the UE_A10 managed by the core network, and may include, for example, one or more cells. In addition, the TA may be a range in which a control message such as a paging message is broadcasted, or a range in which the UE_A10 can move without performing a handover procedure.

In the present embodiment, a TA list is a list including one or more TAs allocated to the UE_A10 by the network. In addition, while the UE_A10 is moving within the one or more TAs included in the TA list, the UE_A10 can move without performing a registration procedure. In other words, the TA list may be an information group indicating an area in which the UE_A10 can move without performing a registration procedure.

In the present embodiment, a network slice (NS) is a logical network that provides a specific network capability and a network characteristic. Hereinafter, the network slice will also be referred to as an NW slice.

A network slice instance (NSI) of the present embodiment is an entity of each of one or more network slices configured in the core network_B190. In addition, the NSI in the present embodiment may include a virtual NF (Network Function) generated by using an NST (Network Slice Template). Here, the NST is associated with a resource request for providing a required communication service or capability, and is a logical expression of one or more NFs (Network Functions). In other words, the NSI may be an aggregation including a plurality of NFs in the core network_B190. In addition, the NSI may be a logical network configured to classify user data delivered through a service or the like. The network slice may include at least one or more NFs. The NF included in the network slice may or may not be an apparatus shared by another network slice. The UE_A10 and/or an apparatus within a network can be allocated to one or more network slices based on NSSAI and/or S-NSSAI and/or UE usage type and/or one or more network slice type IDs, and/or one or more NS IDs of registration information, and/or the APN.

The S-NSSAI of the present embodiment is an abbreviation for Single Network Slice Selection Assistance information, and is information for identifying a network slice. The S-NSSAI may include an SST (Slice/Service type) and an SD (Slice Differentiator). The S-NSSAI may include only an SST or both an SST and an SD. Here, the SST is information indicating an operation of a network slices expected in terms of function and service. Also, the SD may be information complementing the SST at the time when one NSI is selected from a plurality of NSIs indicated by the SST. The S-NSSAI may be information unique for each PLMN (Public Land Mobile Network), or may be standard information common among PLMNs, or may be information unique for each telecommunication operator which differs for each PLMN.

More specifically, the SST and/or the SD may be standard information (Standard Value) that is common among PLMNs, or may be information (Non-Standard Value) that is unique for each telecommunication operator which is differs for each PLMN. In addition, the network may store one or more pieces of S-NSSAI in the registration information of the UE_A10 as default S-NSSAI.

NSSAI (Network Slice Selection Assistance Information) of the present embodiment is a group of S-NSSAI (Single Network Slice Selection Assistance Information). Each piece of S-NSSAI included in the NSSAI is information assisting the access network or the core network to select an NSI. The UE_A10 may store the NSSAI allowed from the network for each PLMN. Furthermore, the NSSAI may be information used to select the AMF_A240.

An operator A network of the present embodiment is a network operated by a network operator A (operator A). Here, for example, the operator A may deploy a common NW slice that is shared by an operator B which will be described below.

An operator B network of the present embodiment is a network operated by a network operator B (operator B). Here, for example, the operator B may deploy a common NW slice that is shared by the operator A.

A first NW slice of the present embodiment is an NW slice to which an established PDU session belongs at the time when the UE connects to a particular DN. It should be noted that, for example, the first NW slice may be an NW slice that is managed within the operator A network, or an NW slice that is commonly managed in the operator B network.

A second NW slice of the present embodiment is an NW slice which another PDU session belongs to and which is capable of connecting to the DN serving as a connection destination of the PDU session belonging to the first NW slice. It should be noted that the first NW slice and the second NW slice may be operated by the same operator or may be operated by different operators.

In the present embodiment, an equivalent PLMN refers to a PLMN treated to be the same PLMN as any PLMN in the network.

A DCN (Dedicated Core Network) of the present embodiment is one or more specific subscriber-type dedicated core networks configured in the core network_A90. More specifically, a DCN for UE registered as a user of an M2M (Machine to Machine) communication function may be configured, for example, in the core network_A90. In addition, a default DCN for UE without a proper DCN may be configured within the core network_A90. Further, at least one or more MMEs_40 or SGSNs_A42 may be deployed in a DCN, and further, at least one or more SGWs_A35, PGWs_A30, or PCRFs_A60 may be deployed in the DCN. It should be noted that the DCN may be identified with a DCN ID, and further the UE may be assigned to one DCN based on information such as a UE usage type and/or the DCN ID.

A first timer of the present embodiment is a timer to initiate a procedure for session management, such as a PDU session establishment procedure, and/or to manage transmission of an SM (Session Management) message, such as a PDU session establishment request message, and may be information indicating a value of a back-off timer for managing session management behaviors. Hereinafter, the first timer and/or the back-off timer may be referred to as a timer. While the first timer is running, each apparatus may be prohibited from initiating a procedure for session management and/or transmitting and receiving an SM message. It should be noted that the first timer may be configured to be associated with at least one of a unit of congestion management applied by an NW and/or a unit of congestion management identified by a UE. For example, the first timer may be configured for at least one of a unit of APN/DNN, and/or a unit of identification information indicating one or more NW slices, and/or a unit of reject cause value in a session management procedure, and/or a unit of session indicated to be rejected in a session management procedure, and/or a unit of PTI of a session management procedure.

It should be noted that an SM message may be an NAS message used in a procedure for session management and may be a control message transmitted and/or received between the UE_A10 and the SMF_A230 via the AMF_A240. Further, the SM message may include a PDU session establishment request message, a PDU session establishment accept message, a PDU session complete message, a PDU session reject message, a PDU session modification request message, a PDU session modification accept message, a PDU session modification reject message, and the like. Furthermore, the procedure for session management may include a PDU session establishment procedure, a PDU session modification procedure, and the like. In addition, in these procedures, a back-off timer value may be included for each message received by the UE_A10. The UE may set a back-off timer received from the NW as a first timer, may set the first timer to a timer value in another method, or may set the first timer to a random value. In addition, when a plurality of back-off timers received from the NW are included, the UE may manage a plurality of "first timers" according to the plurality of back-off timers, or may select one timer value from the plurality of back-off timer values received from the NW based on a policy held by the UE so as to set the first timer to the one time value and manage the first timer. For example, when two back-off timer values are received, the UE sets the "first timer #1" and the "first timer #2" respectively to the back-off timer values received from the NW and manage the "first timer #1" and the "first timer #2". Besides, one value may be selected from the plurality of back-off timer values received from the NW based on the policy held by the UE, and the first timer is set to the one value and managed.

When the UE_A10 receives a plurality of back-off timer values from the NW, the UE_A10 may manage a plurality of "first timers" according to the plurality of back-off timers. Here, in order to distinguish the plurality of "first timers" received by the UE_A10, they may be described, for example, as the "first timer #1" or the "first timer #2." It should be noted that the plurality of back-off timers may be acquired in a single session management procedure, or may be acquired in different session management procedures.

Here, the first timer may be a back-off timer for suppressing reconnection and configured for multiple related NW slices based on information for identifying one NW slice as previously described, or may be a back-off timer for preventing reconnection and configured for a unit of a combination of an APN/DNN and one NW slice, but is not limited thereto, and the first timer may be a back-off timer for suppressing reconnection and configured for a unit of a combination of an APN/DNN and multiple related NW slices based on information for identifying one NW slice.

Re-attempt information included in the 11th identification information in the present embodiment is information indicated by a network (NW) to the UE_A10 whether to allow reconnection using the same DNN information and/or S-NSAI information for a PDU session establishment request (S1100) that is rejected.

At this time, in the PDU session establishment request (1100), when the UE performs the PDU session establishment request (S1100) including no DNN, the information including no DNN is referred to as the same information. In addition, in the PDU session establishment request (1100), when the UE performs the PDU session establishment request (S1100) including no S-NSSAI, the information including no S-NSSAI is referred to as the same information.

It should be noted that the re-attempt information may be configured in a UTRAN access unit, and/or an E-UTRAN access unit, and/or an NR access unit, and/or a piece of slice information unit, and/or an equivalent PLMN unit, and/or an S1 mode unit, and/or an NW mode unit.

Further, the re-attempt information specified in an access unit (a UTRAN access, an E-UTRAN access, or an NR access) may be information indicating reconnection using the same information for the network on the premise of an access change. Further, the re-attempt information specified in a slice unit may be specified as slice information different from information for a rejected slice, and reconnection using the specified slice information may be allowed.

Further, the re-attempt information specified in an equivalent PLMN unit may be information indicating that when a PLMN is changed, reconnection using the same information is allowed if the changed PLMN is an equivalent PLMN. In addition, if the changed PLMN is not an equivalent PLMN, the re-attempt information may be information indicating that reconnection using the present procedure is not allowed.

Further, the re-attempt information specified in a mode unit (S1 mode or N1 mode) may be information indicating that when a mode is changed, reconnection using the same information is allowed if the changed mode is an S1 mode. In addition, as long as the changed mode is the S1 mode, the re-attempt information may also be information indicating that reconnection using the same information is not allowed.

A network slice association rule of the present embodiment is a rule for associating information that identifies a plurality of network slices. It should be noted that the network slice association rule may be received in a PDU session reject message or may be preconfigured in the UE_A10. In addition, for the network slice association rules, the latest one may be applied in the UE_A10. Conversely, the UE_A10 may behave based on the latest network slice association rule. For example, when the UE_A10 receives a new network slice association rule in the PDU session reject message with a network slice association rule preconfigured in the UE_A10, the UE_A10 may update the network slice association rule held in the UE_A10.

A priority management rule of the back-off timer of the present embodiment is a rule configured for the UE_A10 to collectively manage a plurality of back-off timers that have occurred in a plurality of PDU sessions on a single back-off timer. For example, when conflicting or overlapping congestion management is applied and the UE holds a plurality of back-off timers, the UE_A10 may collectively manage the plurality of back-off timers based on the priority management rules of the back-off timers. It should be noted that a pattern in which conflicting or overlapping congestion management occurs is a case that congestion management based only on a DNN and congestion management based both on the DNN and slice information are applied at the same time, and in this case, congestion management based only on the DNN is prioritized. It should be noted that the priority management rules of the back-off timers may not be limited to the above. It should be noted that the back-off timer may be a first timer included in the PDU session reject message.

A first state of the present embodiment is a state in which each apparatus has completed a registration procedure and a PDU session establishment procedure, and the UE_A10 and/or each apparatus is in a state in which one or more of the congestion managements from the first congestion management to the fourth congestion management have been applied. Here, the UE_A10 and/or each apparatus may be in a state in which the UE_A10 has been registered in the network (the RM-REGISTERED state) after the completion of the registration procedure, and the state in which the PDU session establishment procedure has been completed may be a state in which the UE_A10 has received a PDU session establishment reject message from the network.

The congestion management of the present embodiment includes one or more congestion managements from the first congestion management to the fourth congestion management. It should be noted that the control of the UE by the NW is achieved by congestion management recognized by the UE and the first timer, and the UE may store the association of these information.

The first congestion management of the present embodiment indicates control signal congestion management directed to a DNN parameter. For example, when congestion on a DNN #A is detected in an NW and the NW recognizes it as a UE-initiated session management request directed only to a DNN #A parameter, the NW can apply the first congestion management. It should be noted that even when the UE-initiated session management request does not include DNN information, the NW may select a default DNN initiated by the NW and configure it as a target subjected to congestion management. Alternatively, even when the NW recognizes it as a UE-initiated session management request including the DNN #A and S-NSSAI #A, the NW may apply the first congestion management. When the first congestion management is applied, the UE may suppress the UE-initiated session management request directed only to the DNN #A.

In other words, the first congestion management of the present embodiment is control signal congestion management directed to the DNN, and may be congestion management caused by connectivity to the DNN in a congestion state. For example, the first congestion management may be congestion management to restrict connection to the DNN #A in all types of connectivity. Here, the connection to the DNN #A in all types of connectivity may be a connection to the DNN #A in connectivity using all types of S-NSSAI available for the UE, and may be a connection to the DNN #A through a network slice to which the UE can connect. Furthermore, connectivity to the DNN #A without passing through a network slice may be included.

The second congestion management of the present embodiment indicates control signal congestion management directed to an S-NSSI parameter. For example, when control signal congestion with respect to S-NSSAI #A is detected in an NW and the NW recognizes it as a UE-initiated session management request directed only to an S-NSSAI #A parameter, the NW may apply the second congestion management. When the second congestion management is applied, the UE may suppress the UE-initiated session management request directed only to the S-NSSAI #A.

In other words, the second congestion management of the present embodiment is control signal congestion management directed to the S-NSSAI, and may be congestion management caused by a network slice selected based on the S-NSSAI in a congestion state. For example, the second congestion management may be congestion management to restrict all connections based on the S-NSSAI #A. In other words, the second congestion management may be congestion management to restrict all connections to the DNN via a network slice selected based on the S-NSSAI #A.

The third congestion management of the present embodiment indicates control signal congestion management directed to DNN and S-NSSAI parameters. For example, when control signal congestion with respect to DNN #A and control signal congestion with respect to S-NSSAI #A are detected at the same time in an NW and when the NW recognizes it as a UE-initiated session management request directed to DNN #A and S-NSSAI #A parameters, the NW may apply the third congestion management. It should be noted that even when the UE-initiated session management request does not include information indicating the DNN, the NW may select a default DNN initiated by the NW and configure it as a target subjected to congestion management. When the third congestion management is applied, the UE may suppress the UE-initiated session management request directed to the DNN #A and S-NSSAI #A parameters.

In other words, the third congestion management of the present embodiment is control signal congestion management directed to the DNN and S-NSSAI parameters, and may be congestion management caused by connectivity to the DNN via a network slice selected based on the S-NSSAI in a congestion state. For example, the third congestion management may be congestion management to restrict a connection to the DNN #A in connectivity based on the S-NSSAI #A.

The fourth congestion management of the present embodiment indicates control signal congestion management directed to at least one of DNN and/or S-NSSAI parameters. For example, when control signal congestion with respect to DNN #A and control signal congestion with respect to S-NSSAI #A are detected at the same time in an NW and when the NW recognizes it as a UE-initiated session management request directed to at least one of DNN #A and/or S-NSSAI #A parameters, the NW may apply the fourth congestion management. It should be noted that even when the UE-initiated session management request does not include information indicating the DNN, the NW may select a default DNN initiated by the NW and configure it as a target subjected to congestion management. When the fourth congestion management is applied, the UE suppresses the UE-initiated session management request directed to at least one of the DNN #A and/or S-NSSAI #A parameters.

In other words, the fourth congestion management of the present embodiment is control signal congestion management directed to the DNN and S-NSSAI parameters, and may be congestion management caused by a network slice selected based on the S-NSSAI and by connectivity to the DNN in a congestion state. For example, the fourth congestion management may be congestion management to restrict all connections based on the S-NSSAI #A and may be congestion management to restrict a connection to the DNN #A in all types of connectivity. In other words, the fourth congestion management may be congestion management to restrict all connections to the DNN via a network slice selected based on the S-NSSAI #A and may be congestion management to restrict a connection to the DNN #A in all types of connectivity. Here, the connection to the DNN #A in all types of connectivity may be a connection to the DNN #A in connectivity using all types of S-NSSAI available for the UE, and may be a connection to the DNN #A through a network slice to which the UE can connect. Furthermore, connectivity to the DNN #A without passing through a network slice may be included.

Therefore, the fourth congestion management having the DNN #A and the S-NSSAI #A as parameters may be congestion management in which the first congestion management having the DNN #A as a parameter and the second congestion management having the S-NSSAI #A as a parameter are simultaneously performed.

A first behavior of the present embodiment is a behavior the UE storing the slice information transmitted in a first PDU session establishment request message in association with transmitted PDU session identification information. In the first behavior, the UE may store the slice information transmitted in the first PDU session establishment request message or may store the slice information received at the time when the first PDU session establishment request is rejected.

A second behavior of the present embodiment is a behavior of the UE transmitting a PDU session establishment request for connecting to the same APN/DNN as the first PDU session establishment request by using another piece of slice information different from the slice information specified in the first PDU session establishment. Specifically, the second behavior may be a behavior in which when a back-off timer value received from a network is zero or invalid, the UE transmits a PDU session establishment request for connecting to an APN/DNN, which is the same as the APN/DNN for which the first PDU session establishment request is transmitted, by using another piece of slice information different from the slice information specified in the first PDU session establishment. Alternatively, the second behavior may be a behavior in which when the first PDU session is rejected because radio access of a specific PLMN to which a specified APN/DNN is connected is not supported, or when a first PDU session is rejected because of a temporary cause, the UE transmits a PDU session establishment request for connecting to an APN/DNN, which is the same as the APN/DNN included in the first PDU session establishment request, by using another piece of slice information different from the slice information specified in the first PDU session establishment.

A third behavior of the present embodiment is a behavior of the UE transmitting no new PDU session establishment request that uses the same identification information until the first timer expires when the PDU session establishment request is rejected. Specifically, the third behavior may also be a behavior of the UE transmitting no new PDU session establishment request that uses the same identification information until the first timer expires when a back-off timer value received from the network is neither zero nor invalid. Here, the same identification information may mean that the first identification information and/or the second identification information included in a new PDU session establishment request are the same, or may mean that the first identification information and/or the second identification information transmitted in a rejected PDU session establishment request are the same.

In addition, the third behavior may also be a behavior of the UE transmitting no new PDU session establishment request that uses the same identification information until the first timer expires in a case that another PLMN is selected or another NW slice is selected, a reject cause for a configuration failure for network operations is received, and a back-off timer received is activated when the first PDU session establishment request is rejected.

In more detail, a PDU session of which a new PDU session establishment request in the third behavior is not transmitted may be a PDU session to which congestion management associated with the first timer is applied. More specifically, the third behavior may be a behavior of transmitting no new PDU session establishment request for a PDU session that is with connectivity depending on a type of congestion management associated with the first timer and uses the DNN and/or the S-NSSAI associated with the congestion management. It should be noted that processing of the UE to be prohibited by the present behavior may be an initiation of a procedure for session management including a PDU session establishment request and/or transmission and/or reception of an SM message.

A fourth behavior of the present embodiment is a behavior of the UE transmitting no new PDU session establishment request that does not carry slice information and DNN/APN information until the first timer expires when a PDU session establishment request is rejected. Specifically, the fourth behavior may be a behavior of the UE transmitting no new PDU session establishment request that does not carry the slice information and the DNN/APN information until the first timer expires when a back-off timer received from the network is neither zero nor invalid.

The fifth behavior of the present embodiment is a behavior of the UE transmitting no new PDU session establishment request that uses the same identification information when the PDU session establishment request is rejected. Specifically, the fifth behavior may be a behavior of the UE transmitting no new PDU session establishment request that uses the same identification information in a case that the UE is located in an equivalent PLMN when PDP types supported by the UE and the network are different.

A sixth behavior of the present embodiment is a behavior of the UE transmitting a new PDU session establishment request as an initial procedure using the same identification information when the PDU session establishment request is rejected. Specifically, the sixth behavior may be a behavior of the UE transmitting a new PDU session establishment request as an initial procedure using the same identification information in a case that a first PDU session establishment request is rejected because no targeted PDN session context exists in a handover from a non-3GPP access.

A seventh behavior of the present embodiment is a behavior of the UE continuing a back-off timer received at the time when a previous PDU session establishment request was rejected in a case that another NW slice is selected in a procedure for selecting the PLMN. Specifically, the seventh behavior is a behavior of the UE continuing a back-off timer received at the time when the first PDU session establishment request was rejected in a case that a PLMN is selected at the time when the first PDU session establishment request is rejected and that a NW slice common to the NW slice specified in the first PDU session establishment request can be specified in the selected PLMN.

An eighth behavior of the present embodiment is a behavior of the UE configuring a value notified from a network or a value preconfigured in the UE as a first timer value. Specifically, the eighth behavior may be a behavior of the UE configuring a back-off timer value received in a rejection notification for the first PDU session establishment request as the first timer value, or may be a behavior of configuring a value preconfigured or held in the UE as the first timer value. In addition, the eighth behavior of configuring a timer preconfigured or held in the UE as the first timer value may be limited to a case that the UE is located in an HPLMN or an equivalent PLMN.

A ninth behavior of the present embodiment is a behavior of the UE transmitting no new PDU session establishment request until the terminal power is turned on/off or a USIM (Universal Subscriber Identity Module) is inserted/removed when the PDU session establishment request is rejected. Specifically, in the ninth behavior, the UE transmits no new PDU session establishment request until the terminal power is turned on/off or the USIM is inserted/removed in a case that a back-off timer received from a network is invalid or in a case that a first PDU session reject cause is that the PDP types between the UE and the network are different. Alternatively, the ninth behavior may be a behavior of transmitting no new PDU session establishment request until the terminal power is turned on/off or the USIM is inserted/removed in a connected PLMN in a case that the first PDU session is rejected because a specified APN/DNN is not supported wirelessly by a connected PLMN, and that there is no back-off timer information element from the network and there is no Re-attempt information, or in a case that PDU session reconnection to an equivalent PLMN is allowed. Alternatively, the ninth behavior may be a behavior of transmitting no new PDU session establishment request until the terminal power is turned on/off or the USIM is inserted/removed in a connected PLMN in a case that the first PDU session is rejected because a specified APN/DNN is not supported wirelessly by a connected PLMN, there is no back-off timer information element from the network, and there is no Re-attempt information, or in a case that PDU session reconnection to an equivalent PLMN is not allowed. Alternatively, the ninth behavior may be a behavior of transmitting no new PDU session establishment request until the terminal power is turned on/off or the USIM is inserted/removed in a case that the first PDU session is rejected because a specified APN/DNN is not supported wirelessly by a connected PLMN, and in a case that a back-off timer from the network is neither zero nor invalid. Alternatively, the ninth behavior may be a behavior of transmitting no new PDU session establishment request until the terminal power is turned on/off or the USIM is inserted/removed in a case that the first PDU session is rejected because a specified APN/DNN is not supported wirelessly by a connected PLMN, and in a case that a back-off timer from the network is invalid.

The tenth behavior of the present embodiment is a behavior of the UE transmitting a new PDU session establishment request when the PDU session establishment request is rejected. Specifically, the tenth behavior may be a behavior of the UE transmitting a new PDU session establishment request in a case that a back-off timer received from the network is zero or that the first PDU session establishment request is rejected due to a temporary cause, and that there is no back-off timer information element itself notified from the network. Alternatively, the tenth behavior may be a behavior of transmitting a new PDU session establishment request in a case that another PLMN is selected or another NW slice is selected, that the first PDU session establishment request is rejected due to a temporary cause, that the back-off timer has not activated for a targeted APN/DNN in the selected PLMN, or that the back-off timer received from the network is invalid. Alternatively, the tenth behavior may be a behavior of transmitting a new PDU session establishment request in a case that the first PDU session establishment request is rejected due to different PDP types of the UE and the network, and in a case that Re-attempt information is not received at the time when a different PLMN is selected, or that a PLMN that is not in an equivalent PLMN list is selected, or that a PDP type is changed, or that the terminal power is turned on/off or the USIM is inserted/removed. Alternatively, the tenth behavior may be a behavior of transmitting a new PDU session establishment request in a case that the first PDU session is rejected because a specified APN/DNN is not supported wirelessly by a connected PLMN, and in a case that a back-off timer notified and received from the network is zero.

An 11th behavior of the present embodiment is a behavior of the UE ignoring the first timer and the Re-attempt information. Specifically, the 11th behavior may be a behavior of the UE ignoring the first timer and the Re-attempt information in a case that the first PDU session establishment request is rejected because no targeted PDN session context exists in handover from a non-3GPP access, or in a case that the first PDU session establishment is rejected because the number of bearers established in a PDN connection reaches a maximum number.

A 12th behavior of the present embodiment is a behavior of the UE determining information for identifying multiple related NW slices based on information for identifying one NW slice received in a rejection notification for the first PDU session establishment request, and is the behavior of the UE suppressing reconnection to the multiple related NW slices based on information for identifying one NW slice. Specifically, the 12th behavior may be a behavior of the UE deriving information for identifying another NW slice relevant to information for identifying an NW slice notified in the rejection of the first PDU session establishment request based on a network slice related rule. It should be noted that the network slice related rule may be preconfigured in the UE or may be notified from the network in a rejection notification for the PDU session establishment.

A 13th behavior of the present embodiment may be a behavior of the UE managing a timer based on a priority management rule of the back-off timer in a case that a plurality of different congestion managements are activated by the same UE for one or more PDU session establishments and that a plurality of timers are provided from the network. For example, the first PDU session establishment request made by the UE for a combination of a DNN_1 and a slice_1 is subjected to congestion management based on both the DNN and slice information, and the UE receives a first timer #1. In addition, the UE makes a second PDU session establishment request for a combination of a DNN_1 and a slice_2, subjected to congestion management based only on the DNN, and receives a first timer #2. At this time, the UE may manage a behavior of the UE re-establishing a PDU session through the dominant first timer #2 based on a priority management rule of the back-off timer. Specifically, a timer value held by the UE may be overwritten with a timer value generated by a prioritized congestion control.

A 14th behavior of the present embodiment may be a behavior of managing a timer for each session management instance (on a per PDU session basis) in a case that a plurality of different congestion managements are applied by the same UE for one or more PDU session establishments and that a plurality of timers are provided from the network. For example, when the first PDU session establishment made by the UE for the combination of the DNN #1 and the slice #1 is subjected to congestion based on both the DNN and slice information, the UE manages a target back-off timer value as the first timer #1. Thereafter, when the UE further attempts to establish a PDU session for a combination of the DNN #1 and a slice #2 as a second PDU session, subjected to congestion based only on the DNN, the UE manages the target back-off timer value as the first timer #2. At this time, the UE simultaneously manages a plurality of timers (here, the first timer #1 and the first timer #2). Specifically, the UE manages the timer on a per session management instance/PDU session basis. In addition, when the UE receives a plurality of timers simultaneously in one session management procedure, the UE simultaneously manages the target back-off timer based on a congestion management unit identified by the UE.

A 15th behavior in the present embodiment may be a behavior of the UE performing a first identification process to identify which type of congestion management to apply among the congestion managements from the first congestion management to the fourth congestion management and performing a second identification process to identify the DNN and/or the S-NSSAI associated with the applied congestion management. It should be noted that the first identification process may be performed based on at least one piece of identification information from the first identification information to the fourth identification information and/or at least one piece of identification information from 11th identification information to 18th identification information. Similarly, the second identification process may be performed based on at least one piece of identification information from the first identification information to the fourth identification information and/or at least one piece of identification information from 11th identification information to 18th identification information.

An example of a first identification process will be described below. In the first identification process, the type of applied congestion management may be identified as first congestion management when any one of or two or more combinations of the following cases are met.

A case that at least 15th identification information is a value corresponding to the first congestion management.

A case that at least 16th identification information is a value corresponding to the first congestion management.

A case that at least 14th identification information includes information indicating the first congestion management.

A case that at least 17th identification information includes only the DNN and does not include the S-NSSAI.

A case that the 16th identification information is information for identifying the identification information in any of the first congestion management and the second congestion management and is information in which only a value corresponding to the second congestion management is configurable for the 16th identification information, and a case that at least the 16th identification information is not received.

A case that the 16th identification information is information for identifying the identification information in any of the first congestion management and the fourth congestion management and is information in which only a value corresponding to the fourth congestion management is configurable for the 16th identification information, and a case that at least the 16th identification information is not received.

A case that the 16th identification information is information for identifying the identification information in any of the first congestion management, the second congestion management and the fourth congestion management and is information in which only a value corresponding to the second congestion management and a value corresponding to the fourth congestion management are configurable for the 16th identification information, and a case that at least the 16th identification information is not received.

However, the present embodiment is not limited to the example described above, and the UE_A10 may perform the identification process based on at least one piece of identification information from the first identification information to the fourth identification information, and/or based on at least one piece of identification information or a combination of two or more pieces of identification information from the 11th identification information to the 18th identification information.

In the first identification process, the type of applied congestion management may be identified as second congestion management when any one of or two or more combinations of the following cases are met.

A case that at least 15th identification information is a value corresponding to the second congestion management.

A case that at least 16th identification information is a value corresponding to the second congestion management.

A case that at least 14th identification information includes information indicating the second congestion management.

A case that at least the 17th identification information includes only the S-NSSAI and does not include the DNN.

A case that the 16th identification information is information for identifying the identification information in any of the first congestion management and the second congestion management and is information in which only a value corresponding to the first congestion management is configurable for the 16th identification information, and a case that at least the 16th identification information is not received.

A case that the 16th identification information is information for identifying the identification information in any of the second congestion management and the third congestion management and is information in which only a value corresponding to the third congestion management is configurable for the 16th identification information, and a case that at least the 16th identification information is not received.

A case that the 16th identification information is information for identifying the identification information in any of the second congestion management, the third congestion management and the fourth congestion management and is information in which only a value corresponding to the third congestion management and a value corresponding to the fourth congestion management are configurable for the 16th identification information, and a case that at least the 16th identification information is not received.

However, the present embodiment is not limited to the example described above, and the UE_A10 may perform the identification process based on at least one piece of identification information from the first identification information to the fourth identification information, and/or based on at least one piece of identification information or a combination of two or more pieces of identification information from the 11th identification information to the 18th identification information.

In the first identification process, the type of applied congestion management may be identified as third congestion management when any one of or two or more combinations of the following cases are met.

A case that at least 15th identification information is a value corresponding to the third congestion management.

A case that at least 16th identification information is a value corresponding to the third congestion management.

A case that at least 14th identification information includes information indicating the third congestion management.

A case that at least the 15th identification information is a value corresponding to a plurality of congestion managements including the third congestion management and not including the fourth congestion management, and that the 17th identification information includes the S-NSSAI and DNN.

A case that the 16th identification information is information for identifying the identification information in any of the third congestion management and the fourth congestion management and is information in which only a value corresponding to the fourth congestion management is configurable for the 16th identification information, and a case that at least the 16th identification information is not received.

A case that the 16th identification information is information for identifying the identification information in any of the second congestion management and the third congestion management and is information in which only a value corresponding to the second congestion management is configurable for the 16th identification information, and a case that at least the 16th identification information is not received.

A case that the 16th identification information is information for identifying the identification information in any of the second congestion management, the third congestion management and the fourth congestion management and is information in which only a value corresponding to the second congestion management and a value corresponding to the fourth congestion management are configurable for the 16th identification information, and a case that at least the 16th identification information is not received.

However, the present embodiment is not limited to the example described above, and the UE_A10 may perform the identification process based on at least one piece of identification information from the first identification information to the fourth identification information, and/or based on at least one piece of identification information or a combination of two or more pieces of identification information from the 11th identification information to the 18th identification information.

In the first identification process, the type of applied congestion management may be identified as fourth congestion management when any one of or two or more combinations of the following cases are met.

A case that at least 15th identification information is a value corresponding to the fourth congestion management.

A case that at least 16th identification information is a value corresponding to the fourth congestion management.

A case that at least 14th identification information includes information indicating the fourth congestion management.

A case that at least the 15th identification information is a value corresponding to a plurality of congestion managements including the fourth congestion management and not including the third congestion management, and that the 17th identification information includes the S-NSSAI and DNN.

A case that the 16th identification information is information for identifying the identification information in any of the third congestion management and the fourth congestion management and is information in which only a value corresponding to the third congestion management is configurable for the 16th identification information, and a case that at least the 16th identification information is not received.

A case that the 16th identification information is information for identifying the identification information in any of the second congestion management and the fourth congestion management and is information in which only a value corresponding to the second congestion management is configurable for the 16th identification information, and a case that at least the 16th identification information is not received.

A case that the 16th identification information is information for identifying the identification information in any of the first congestion management and the fourth congestion management and is information in which only a value corresponding to the first congestion management is configurable for the 16th identification information, and a case that at least the 16th identification information is not received.

A case that the 16th identification information is information for identifying the identification information in any of the second congestion management, the third congestion management and the fourth congestion management and is information in which only a value corresponding to the second congestion management and a value corresponding to the third congestion management are configurable for the 16th identification information, and a case that at least the 16th identification information is not received.

A case that the 16th identification information is information for identifying the identification information in any of the first congestion management, the second congestion management and the fourth congestion management and is information in which only a value corresponding to the first congestion management and a value corresponding to the second congestion management are configurable for the 16th identification information, and a case that at least the 16th identification information is not received.

However, the present embodiment is not limited to the example described above, and the UE_A10 may perform the identification process based on at least one piece of identification information from the first identification information to the fourth identification information, and/or based on at least one piece of identification information or a combination of two or more pieces of identification information from the 11th identification information to the 18th identification information, or may perform the identification process by using other means.

As described above, a type of congestion management may be identified by the first identification process.

Next, an example of a second identification process will be described. Besides, the second identification process may be a process for identifying a corresponding DNN and/or S-NSSAI for the type of congestion management identified by the first identification process.

More specifically, the DNN corresponding to the first congestion management, the third congestion management, and the fourth congestion management may be determined based on 12th identification information. Additionally/alternatively, the DNN corresponding to the first congestion management, the third congestion management, and the fourth congestion management may be determined based on 17th identification information. Additionally/alternatively, the DNN corresponding to the first congestion management, the third congestion management, and the fourth congestion management may be determined based on 2nd identification information.

Therefore, the DNN corresponding to the first congestion management, the third congestion management, and the fourth congestion management may be a DNN indicated by the 12th identification information. Additionally/alternatively, the DNN corresponding to the first congestion management, the third congestion management, and the fourth congestion management may be a DNN included in the 17th identification information. Additionally/alternatively, the DNN corresponding to the first congestion management, the third congestion management, and the fourth congestion management may be a DNN indicated by the 2nd identification information.

In addition, the S-NSSAI corresponding to the second congestion management, the third congestion management, and the fourth congestion management may be determined based on 17th identification information. Additionally/alternatively, the DNN corresponding to the first congestion management, the third congestion management, and the fourth congestion management may be determined based on 1st identification information.

Therefore, the DNN corresponding to the first congestion management, the third congestion management, and the fourth congestion management may be S-NSSAI indicated by the 17th identification information. Additionally/alternatively, the DNN corresponding to the first congestion management, the third congestion management, and the fourth congestion management may be S-NSSAI included in the 1st identification information.

However, the present embodiment is not limited to the example described above, and the UE_A10 may also perform the identification process based on at least one piece of identification information from the first identification information to the fourth identification information, and/or based on at least one piece of identification information or a combination of two or more pieces of identification information from the 11th identification information to the 18th identification information, or may perform the identification process by using other means.

Based on the above 15th behavior, the UE_A10 may identify a congestion management that the core network_B190 applies to the UE_A10. In other words, the UE_A10 may identify the corresponding type of congestion management and the corresponding S-NSSAI and/or DNN as applied congestion management based on the 15th behavior. Besides, the UE_A10 may store and manage one or more pieces of identification information from the first identification information to the fourth identification information and from the 11th identification information to the 18th identification information in association with the applied congestion management. Here, the 3rd identification information, and/or the 4th identification information, and/or the 13th identification information may be stored and managed as information for identifying the applied congestion management.

A 16th behavior of the present embodiment is a behavior of the UE stopping the first timer in a case that a NW-initiated session management procedure is performed with the first timer activated.

Here, for example, the 16th behavior may be a behavior of determining a first timer to be stopped among a plurality of first timers activated based on 21st identification information and then stopping the determined timer in a case that the plurality of first timers are activated. Additionally/alternatively, the 16th behavior may be a behavior of stopping a first timer associated with a congestion management identified by a 17th behavior. It should be noted that when there are a plurality of congestion managements identified by the 17th behavior, a timer associated with each congestion management may be stopped.

The 17th behavior of the present embodiment may be a behavior of the UE identifying a congestion management whose application is to be stopped among one or more congestion managements applied by the UE based on the reception of a control message transmitted by the core network. For example, the UE may identify a congestion management whose application is to be stopped or changed based on the 21st identification information.

Specifically, as described above, the UE may store the third identification information and/or the fourth identification information and/or the 13th identification information as information for identifying a congestion management in the fourth process, and may identify the congestion management, in which the information for identifying these congestion management matches the 13th identification information included in the 21th identification information, as a congestion management whose application is to be stopped.

Additionally/alternatively, the UE may identify a congestion management whose application is to be stopped based on one piece or a combination of multiple pieces of identification information from the 11th identification information to the 18th identification information included in the 21st identification information. Here, the details of the identification method may be the same as the identification process in the 15th behavior described in the fourth process in the example of the PDU session establishment procedure described below. In other words, the UE may identify the congestion management to be stopped by using a method that is the same as the method for identifying the applied congestion management.

It should be noted that the UE may identify a plurality of congestion managements whose application is to be stopped. Hereinafter, the congestion management identified by the method described above is considered to be a first congestion management, and a method for identifying a second congestion management that is different from the first congestion management will be described.

For example, the UE may identify a congestion management associated with a DNN, which is the same as the DNN associated with the first congestion management, as the second congestion management. Additionally/alternatively, the UE may identify a congestion management associated with S-NSSAI, which is the same as the S-NSSAI associated with the first congestion management, as the second congestion management. It should be noted that identifying a plurality of congestion managements whose application is to be stopped may be configured to be performed only in a case that the first congestion management and/or the second congestion management is a specific type of congestion management.

Specifically, the UE may identify the second congestion management when the first congestion management is any of the first congestion management to the fourth congestion management. Additionally/alternatively, in specifying the second congestion management, the UE may identify the second congestion management when a congestion management to be searched is any of the first congestion management to the fourth congestion management. It should be noted that in which type the first congestion management and/or the second identification information can identify a plurality of congestion managements may be preconfigured in a core network and/or a UE. Besides, the number of specific types of congestion managements allowed for identification is not necessarily configured as one but may be configured as multiple.

The first identification information of the present embodiment is information for identifying a session belonging to a first NW slice. In other words, the first identification information may be information indicating that the UE expects to establish a PDU session belonging to the first NW slice. Specifically, for example, the first identification information can be information for identifying the first NW slice. It should be noted that the slice information may be identification information indicating a specific S-NSSAI. In addition, the first identification information may be information for identifying a specific NW slice in the operator A network, or may be information for commonly identifying the same NW slice in the operator B (an operator other than the operator A). Further, the first identification information may be information for identifying the first NW slice configured by an HPLMN, may be information for identifying the first NW slice obtained from the AMF in a registration procedure, or may be information for identifying the first NW slice granted by a network. In addition, the first identification information may be information for identifying the first NW slice stored for each PLMN.

The second identification information of the present embodiment may be a DNN (Data Network Name) and information used for identifying a DN (Data Network).

The third identification information of the present embodiment may be a PDU session ID and information used for identifying a PDU session.

The fourth identification information of the present embodiment may be a PTI (Procedure transaction identity), which is information for identifying transmission and/or reception of a series of messages of a specific session management procedure as one group, and may also be information used for identifying and/or distinguishing transmission and/or reception of another series of session management-related messages.

The 11th identification information of the present embodiment may be information indicating rejection of a PDU session establishment request or a PDU session modification request. It should be noted that the PDU session establishment request or the PDU session modification request is a request performed by the UE, and may include a DNN and/or S-NSSAI. In other words, the 11th identification information may be information indicating that the NW rejects the establishment request or the modification request for the PDU session corresponding to the DNN and/or S-NSSA.

In addition, the 11th identification information may be information indicating re-attempt information.

In addition, the NW may transmit at least one identification information of 12th identification information to 18th identification information along with the 11th identification information to the UE so as to indicate a congestion management to the UE. In other words, the NW may notify the UE of a congestion management corresponding to one piece or a combination of multiple pieces of identification information from the 12th identification information to the 18th identification information. On the other hand, the UE may identify a congestion management corresponding to one piece or a combination of multiple pieces of identification information from the 12th identification information to the 18th identification information, and may perform processing based on the identified congestion management. Specifically, the UE may start counting the first timer associated with the identified congestion management. Further, a timer value of the first timer may be determined by using 14th identification information, a timer value configured in another method such as using a value stored by the UE in advance may be configured, or a random value may be configured.

The 12th identification information of the present embodiment may be a DNN, which may be a DNN that is not allowed by the network, or may be information indicating that a DNN identified with the second identification information is not allowed. Further, the 12th identification information may be the same DNN as that of the second identification information.

The 13th identification information of the present embodiment may be a PDU session ID and/or PTI that is a PDU session ID and/or PTI not allowed by the network, or may be information indicating that a PDU session ID and/or PTI identified by the third identification information is not allowed. Furthermore, the PDU Session ID of the 13th identification information may be the same PDU session ID as that of the third identification information. In addition, the PTI of the 13th identification information may be the same PTI as that of the fourth identification information.

Here, the 13th identification information may be used as information for identifying congestion management of which the NW notifies the UE based on the rejection of the PDU session establishment. In other words, the UE may store and manage the 13th identification information in association with a congestion management performed based on the 15th behavior and use the 13th identification information as information for identifying the performed congestion management. Besides, the information for identifying the congestion management may be constituted by a combination of one or more pieces of identification information from the 14th to the 18th identification information in addition to the 13th identification information.

The 14th identification information of the present embodiment may be information indicating a value of a back-off timer. In other words, the back-off timer may be a value indicating a valid period of the congestion management of which the NW notifies the UE based on the rejection of the PDU session establishment. In other words, the UE may use the 14th identification information as a timer value in the 15th behavior performed with the reception of the 14th identification information. Further, the 14th identification information may include information for identifying a type of congestion management in addition to the timer value. Specifically, the 14th identification information may include information for identifying which of the congestion managements from the first congestion management to the fourth congestion management is applied. For example, the information for identifying the type of the congestion management may be a timer name that identifies each congestion management or may be a flag that identifies each congestion management. However, the present embodiment is not limited to the example described above, and the congestion management may be identified by using other means, such as by using a location stored in a control message and the like.

The 15th identification information of the present embodiment is information that indicates one or more cause values indicating a cause for which the present procedure is rejected. In other words, a cause value may be information indicating a congestion management applied by the NW to the present procedure, or may be information indicating a cause value for rejecting the present procedure applied by the NW other than a congestion management.

It should be noted that a cause value may be information for identifying, based on the rejection of the PDU session establishment, which of a congestion management among the congestion managements from the first congestion management to the fourth congestion management is indicated by the congestion management of which the NW notifies the UE. In this case, the NW may transmit a different value to the UE as a cause value according to each congestion management from the first congestion management to the fourth congestion management. The UE may interpret each value transmitted as a cause value in advance, and identify, in the 15th behavior based on at least the 15th identification information, a congestion management among the congestion managements from the first congestion management to the fourth congestion management.

Alternatively, the cause value may be information for identifying, based on the rejection of the PDU session establishment, whether the congestion management of which the NW notifies the UE is the first congestion management or any congestion management of the second congestion management, the third congestion management and the fourth congestion management. In this case, the NW may transmit a different value to the UE as a cause value depending on whether the congestion management is the first congestion management or any congestion management of the second congestion management, the third congestion management and the fourth congestion management. The UE may interpret each value transmitted as a cause value in advance, and identify, in the 15th behavior based on at least the 15th identification information, whether the congestion management is the first congestion management or any of the second congestion management, the third congestion management and the fourth congestion management.

Alternatively, the cause value may be information for identifying, based on the rejection of the PDU session establishment, whether the congestion management of which the NW notifies the UE is the first congestion management, the second congestion management, or any congestion management of the third congestion management and the fourth congestion management. In this case, the NW may transmit a different value to the UE as a cause value depending on whether the congestion management is the first congestion management, the second congestion management, or any congestion management of the third congestion management and the fourth congestion management. The UE may interpret each value transmitted as a cause value in advance, and identify, in the 15th behavior based on at least the 15th identification information, whether the congestion management is the first congestion management, the second congestion management, or any of the third congestion management and the fourth congestion management.

Alternatively, the cause value may be information for identifying, based on the rejection of the PDU session establishment, whether the congestion management of which the NW notifies the UE is the first congestion management or the second congestion management, or the third congestion management or the fourth congestion management. In this case, the NW may transmit a different value to the UE as a cause value depending on whether the congestion management is the first congestion management or the second congestion management, or the third congestion management or the fourth congestion management. Further, the UE interprets each value transmitted as a cause value in advance, and identifies, in the 15th behavior based on at least the 15th identification information, whether the congestion management is the first congestion management or the second congestion management, or the third congestion management or the fourth congestion management.

Alternatively, the cause value may be information for identifying, based on the rejection of the PDU session establishment, whether the congestion management of which the NW notifies the UE is the second congestion management or the third congestion management, or the first congestion management or the fourth congestion management. In this case, the NW may transmit a different value to the UE as a cause value depending on whether the congestion management is the second congestion management or the third congestion management, or the first congestion management or the fourth congestion management. Further, the UE interprets each value transmitted as a cause value in advance, and identifies, in the 15th behavior based on at least the 15th identification information, whether the congestion management is the second congestion management or the third congestion management, or the first congestion management or the fourth congestion management.

Alternatively, the cause value may be information for identifying, based on the rejection of the PDU session establishment, whether the congestion management of which the NW notifies the UE is the second congestion management or the fourth congestion management, or the first congestion management or the third congestion management. In this case, the NW may transmit a different value to the UE as a cause value depending on whether the congestion management is the second congestion management or the fourth congestion management, or the first congestion management or the third congestion management. Further, the UE interprets each value transmitted as a cause value in advance, and identifies, in the 15th behavior based on at least the 15th identification information, whether the congestion management is the second congestion management or the fourth congestion management, or the first congestion management or the third congestion management.

Alternatively, the cause value may be information indicating that the NW performs a congestion management for the UE based on the rejection of the PDU session establishment. In other words, the cause value may be information for causing the UE to perform any of the first congestion management to the fourth congestion management. In this case, the cause value does not have to be information that can identify a particular congestion management.

Further, a more detailed example of the cause value for rejecting the present procedure applied by the NW other than the congestion management described above may be a cause value (Missing or unknown DNN) that is notified to the UE by the NW and indicates that an external DN rejects the present procedure because the present procedure does not include DNN information or includes an unknown DNN. Furthermore, a more detailed example of the cause value may be a cause value (Unknown PDU session type) that is notified to the UE by the NW and indicates that an external DN rejects the present procedure because the present procedure cannot recognize or does not allow the PDU session type of the present procedure. In addition, a more detailed example of the cause value may be a cause value (User authentication or authorization failed) that is notified to the UE by the NW and indicates that an external DN rejects the present procedure because of the failure of the user authentication and authorization in the present procedure, or the revocation of the authentication and authorization based on the external DN, or the revocation of the authentication and authorization based on the NW. In addition, a more detailed example of the cause value may be a cause value (Request rejected, unspecified) for the NW to notify the UE that a requested service, operation, or resource reservation request is rejected based on an unspecified reason. In addition, a more detailed example of the cause value may be a cause value (Service option temporarily out of order) for the NW to notify the UE that the NW is temporarily unable to receive a service request from the UE. In addition, a more detailed example of the cause value may be a cause value (PTI already in use) for the NW to notify the UE that the PTI inserted by the UE is already in use. In addition, a more detailed example of the cause value may be a cause value (Out of LADN service area) for the NW to notify the UE that the UE is out of the LADN service area. In addition, a more detailed example of the cause value may be a cause value (PDU session type IPv4 allowed) for the NW to notify the UE that only PDU session type IPv4 is allowed. In addition, a more detailed example of the cause value may be a cause value (PDU session type IPv6 only allowed) for the NW to notify the UE that only PDU session type IPv6 is allowed. In addition, a more detailed example of the cause value may be a cause value (PDU session does not exist) for the NW to notify the UE that the NW does not hold a targeted PDU session when the UE transfers the PDU session from a non-3GPP access to a 3GPP access or transfers the PDU session from an EPS to a 5GS. In addition, a more detailed example of the cause value may be a cause value (Not supported SSC mode) for the NW to notify the UE that the NW does not support the SSC mode requested by the UE. In addition, a more detailed example of the cause value may be a cause value (Missing or unknown DNN in a slice) that is notified to the UE by the NW and indicates that an external DN rejects the present procedure because the present procedure via a specific slice does not include DNN information or includes an unknown DNN. In addition, a more detailed example of the cause value may be a cause value (Maximum data rate per UE for user-plane integrity protection is too low) that is notified to the UE by the NW and indicates that the UE does not meet the requirement of the maximum data transmission rate for user-plane integrity protection required in a service requested by the UE from the NW.

It should be noted that, in the present embodiment, when the third congestion management is not performed, the implication corresponding to the third congestion management is unnecessary in the cause value of the 15th identification information described above, and the cause value of the 15th identification information may be a value from which processing, description, and implication associated with the third congestion management may be omitted from the above description. In addition, in the present embodiment, when the fourth congestion management is not performed, the implication corresponding to the fourth congestion management is unnecessary in the cause value of the 15th identification information described above, and the cause value of the 15th identification information may be a value from which processing, description, and implication associated with the fourth congestion management may be omitted from the above description.

For a more detailed example, the 15th identification information identifying the first congestion management may be a cause value indicating insufficient resources. In addition, the 15th identification information identifying the second congestion management may be a cause value indicating insufficient resources for a specific slice. Further, the 15th identification information identifying the third congestion management may be a cause value indicating insufficient resources for a specific slice and a DNN.

In this way, the 15th identification information may also be information that can identify the type of congestion management, and may be information indicating which type of congestion management corresponds to the back-off timer and/or the back-off timer value indicated by the 14th identification information.

Therefore, the UE_A10 may also identify the type of congestion management based on the 15th identification information. Further, based on the 15th identification information, it may be determined which type of congestion management corresponds to the back-off timer and/or the back-off timer value indicated by the 14th identification information.

The 16th identification information of the present embodiment is one or more pieces of indication information indicating that the present procedure is rejected. In other words, the indication information may be information indicating a congestion management applied by the NW to the present procedure. The NW may indicate a congestion management applied by the NW based on the 16th identification information.

For example, the indication information may be information indicating which congestion management regulated by the NW to the UE in two or more congestion managements among the congestion managements from the first congestion management to the fourth congestion management. Therefore, the NW may transmit a value associated with a regulated management to be applied to the UE as indication information. Further, the UE may interpret each value transmitted as indication information in advance, and identify, in the 15th behavior based on at least the 16th identification information, a congestion management among the congestion managements from the first congestion management to the fourth congestion management. Here, the two or more congestion managements among the congestion managements from the first congestion management to the fourth congestion management are congestion managements that can be identified by using the indication information, and the congestion managements to be identified may be all four congestion managements, may be the first congestion management and the second congestion management, may be the third congestion management and the fourth congestion management, may be the second congestion management to the fourth congestion management, or may be any other combination thereof.

It should be noted that the indication information does not necessarily require values respectively corresponding to all of the congestion managements to be identified. For example, if the values of the indication information are respectively associated with and allocated to the congestion managements excluding a congestion management A, then a value of the indication information may not necessarily be configured for the congestion management A. In this case, the NW and the UE can identify a congestion management as the first congestion management by not transmitting and/or receiving the indication information. It should be noted that the congestion management A may be any congestion management among the first congestion management to the fourth congestion management.

In addition, when the UE is notified of a congestion management based on the transmission of a PDU session establishment reject message, there may be cases that Identification may or may not be included depending on the type of congestion management from the first congestion management to the fourth congestion management. In other words, the NW may use the Identification information as information indicating a congestion management depending on the type of congestion management, or may use other identification information as information indicating a congestion management depending on the type of congestion management without using the Identification information.

It should be noted that, in the present embodiment, when the third congestion management is not performed, the implication corresponding to the third congestion management is unnecessary in the indication information of the 16th identification information described above, and the indication information of the 16th identification information may be information from which processing, description, and implication associated with the third congestion management may be omitted from the above description. In addition, in the present embodiment, when the fourth congestion management is not performed, the implication corresponding to the fourth congestion management is unnecessary in the indication information of the 16th identification information described above, and the indication information of the 16th identification information may be information from which processing, description, and implication associated with the fourth congestion management may be omitted from the above description.

The 17th identification information of the present embodiment is one or more pieces of value information indicating that the present procedure is rejected. In other words, the value information may also be information indicating a congestion management applied by the NW to the present procedure. It should be noted that the 17th identification information may be information including at least one piece of identification information for identifying one or more NW slices included in the 18th identification information and/or the 12th identification information.

The NW may indicate a congestion management applied by the NW based on the 17th identification information. In other words, the NW may indicate which congestion management among the congestion managements from the first congestion management to the fourth congestion management is applied based on the 17th identification information. Further, the NW may indicate the DNN and/or the S-NSSAI that is subjected to congestion management to be applied to the UE based on transmission of a PDU session reject message based on the 17th identification information. For example, when the 17th identification information is just a DNN #1, it indicates that the first congestion management directed to the DNN #1 is applied. When the 17th identification information is just S-NSSAI #1, it indicates that the second congestion management directed to the S-NSSAI #1 is applied. When the 17th information is configured with the DNN #1 and S-NSSAI #1, it may indicate that the third congestion management or the fourth congestion management directed to at least one of the DNN #1 and/or the S-NSSAI #1 is applied.

It should be noted that the 17th identification information does not necessarily have to be information that can identify which congestion management among the congestion managements from the first congestion management to the fourth congestion management is applied, and the 17th identification information may be information indicating the DNN and/or the S-NSSAI that is subjected to congestion management identified by other means, such as being identified based on other identification information.

The 18th identification information of the present embodiment may be information indicating that a request for establishing a PDU session belonging to a first NW slice is rejected, or may be information indicating that a request for establishing a PDU session belonging to the first NW slice or a request for modifying a PDU session (PDU session modification) is not allowed. Here, the first NW slice may be an NW slice determined by the first identification information, or may be a different NW slice. Furthermore, the 18th identification information may be information indicating that the establishment of a PDU session belonging to a first NW slice is not allowed in a DN identified by the 12th identification information, or may be information indicating that the establishment of a PDU session belonging to a first NW slice is not allowed in the PDU session identified by the 13th identification information. Furthermore, the 11th identification information may be information indicating that the establishment of a PDU session belonging to a first slice is not allowed in a registration area and/or a tracking area to which the UE_A10 currently belongs, or may be information indicating that the establishment of a PDU session belonging to a first NW slice is not allowed in an access network to which the UE_A10 is connected. Further, the 11th identification information may be identification information for determining an NW slice to which the rejected PDU session request belongs or identifying one or more NW slices. Furthermore, the 18th identification information may be identification information indicating assistance information for a radio access system to select an appropriate MME in a case that the UE switches the connection destination to an EPS. It should be noted that the assistance information may be information indicating a DCN ID. Further, the 18th identification information may be a network slice association rule that is a rule associating a plurality of pieces of slice information.

The 21st identification information of the present embodiment may be information for stopping one or more first timers activated by the UE, or may be information indicating a first timer to be stopped among the first timers activated by the UE. Specifically, the 21st identification information may be information indicating the 13th identification information stored in the UE in association with the first timer. Furthermore, the 21st identification information may be information indicating at least one piece of the 12th identification information to the 18th identification information stored in the UE in association with the first timer.

Furthermore, the 21st identification information may be information that changes the association of the first timer stored by the UE with information indicating at least one piece of the 13th identification information to the 17th identification information. For example, when a first timer for suppressing a UE-initiated session management of a combination of a DNN #A and an S-NSSAI #A is activated, the UE may change the association target of the activated timer only to the S-NSSAI #A and recognize that a UE-initiated session management request to the DNN #A is allowed in a case that an NW-initiated session management request including the 21st identification information that allows a connection to the DNN #A is received. In other words, the 21st identification information may be information indicating that the congestion management applied at the time of reception of the 21st identification information is changed to another congestion management among the congestion managements from the first to the fourth congestion management.

Figure 9:
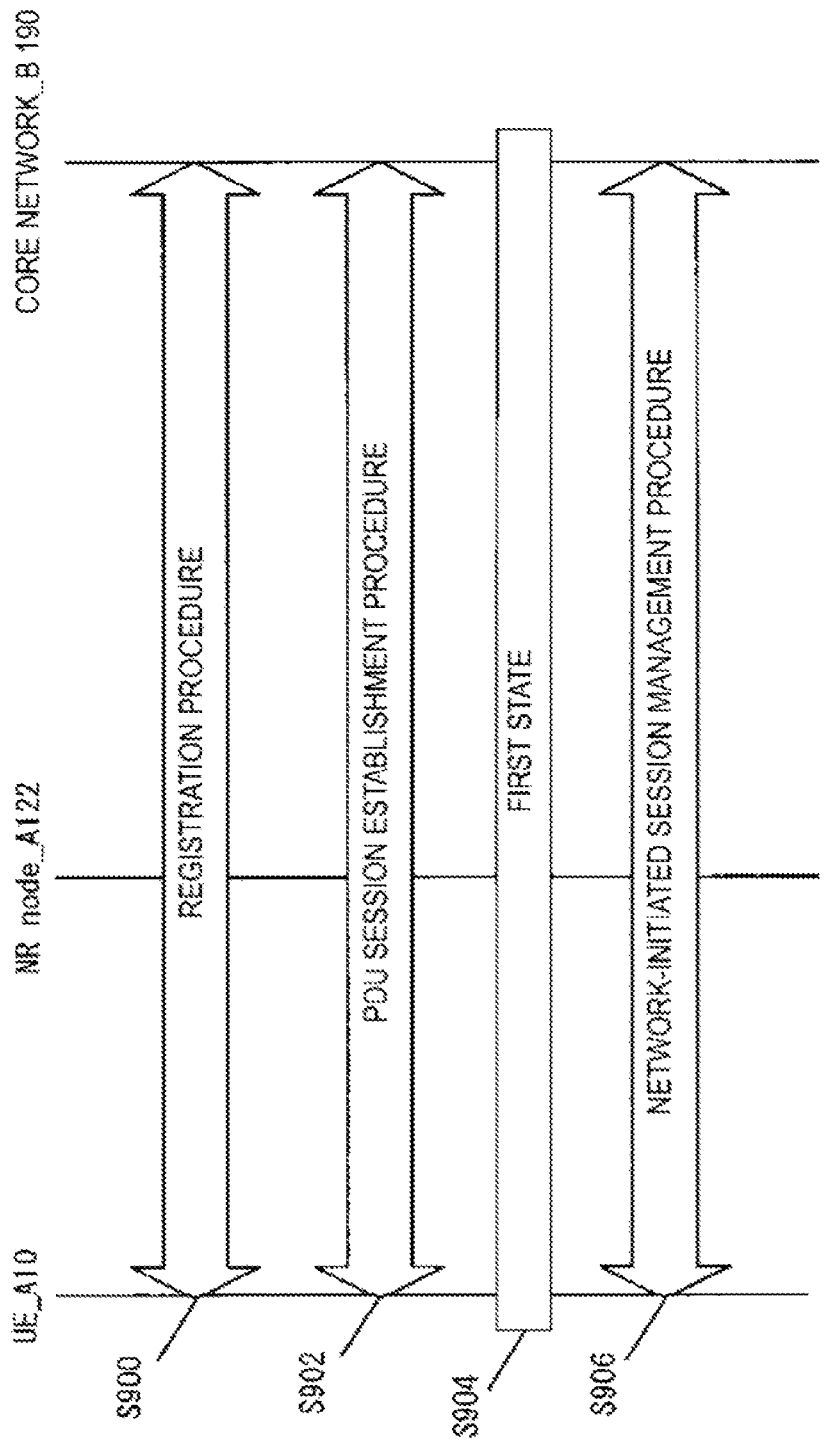
FIG. 9 is a diagram illustrating an initial procedure.

Next, an initial procedure according to the present embodiment will be described with reference to FIG. 9. Hereinafter, the initial procedure will also be referred to as the present procedure, and the present procedure includes a Registration procedure, a UE-initiated PDU session establishment procedure, and a network-initiated session management procedure. Details of the registration procedure, the UE-initiated PDU session establishment procedure, and the network-initiated session management procedure will be described below.

Specifically, each apparatus performs the registration procedure (S900), and the UE_A10 transitions to a state of being registered in the network (RM-REGISTERED state). Next, each apparatus performs the PDU session establishment procedure (S902), and the UE_A10 establishes a PDU session with the DN_A5 that provides a PDU connection service via the core network_B190, and each apparatus transitions to a first state (S904). It should be noted that although this PDU session is assumed to be established via the access network and the UPF_A235, the procedure is not limited thereto. That is, a UPF (UPF_C239) that is different from the UPF_A235 may be present between the UPF_A235 and the access network. At this time, the PDU session is established via the access network, the UPF_C239, and the UPF_A235. Next, each apparatus in the first state may perform the network-initiated session management procedure at any timing (S906).

It should be noted that each apparatus may exchange various kinds of capability information and/or various kinds of request information of each apparatus in the registration procedure and/or the PDU session establishment procedure and/or the network-initiated session management procedure. In addition, when each apparatus performs the exchange of various kinds of information and/or negotiation of various requests in the registration procedure, each apparatus may or may not perform the exchange of various kinds of information and/or the negotiation of various requests in the PDU session establishment procedure and/or the network-initiated session management procedure. In addition, when each apparatus does not perform the exchange of various kinds of information and/or the negotiation of various requests in the registration procedure, each apparatus may perform the exchange of various kinds of information and/or the negotiation of various requests in the PDU session establishment procedure and/or the network-initiated session management procedure. In addition, even when each apparatus performs the exchange of various kinds of information and/or the negotiation of various requests in the registration procedure, each apparatus may perform the exchange of various kinds of information and/or the negotiation of various requests in the PDU session establishment procedure and/or the network-initiated session management procedure.

In addition, each apparatus may perform the PDU session establishment procedure in the registration procedure or after the registration procedure is completed. Furthermore, when the PDU session establishment procedure is performed in the registration procedure, a PDU session establishment request message may be included in a registration request message and transmitted and/or received, and a PDU session establishment accept message may be included in a registration accept message and transmitted and/or received, a PDU session establishment complete message may be included in a registration complete message and transmitted and/or received, and a PDU session establishment reject message may be included in a registration reject message and transmitted and/or received. In addition, when the PDU session establishment procedure is performed in the registration procedure, each apparatus may establish a PDU session based on the completion of the registration procedure or may transition to a state in which a PDU session is established among the apparatuses.

In addition, each apparatus involved in the present procedure may transmit and/or receive each control message described in the present procedure so as to transmit and/or receive one or more pieces of identification information included in each control message, and store each piece of identification information transmitted and/or received as a context.

[1.3.1. Overview of Registration Procedure]

First, an overview of the registration procedure will be described. The registration procedure is a procedure initiated by the UE_A10 to perform registration in a network (the access network and/or the core network_B190 and/or the DN_A5). In a state in which the UE_A10 is not registered in the network, the UE_A10 can perform the present procedure at any timing, for example, when power is turned on. In other words, if the UE_A10 is in a deregistered state (RM-DEREGISTERED state), the UE can initiate the present procedure at any timing. In addition, each apparatus may transition to a registered state (RM-REGISTERED state) based on the completion of the registration procedure.

Furthermore, the present procedure may be a procedure for updating location registration information of the UE_A10 in the network, and/or for regularly notifying the network of a state of the UE_A10 from the UE_A10, and/or for updating specific parameters related to the UE_A10 in the network.

The UE_A10 may initiate the present procedure at the time when the UE_A10 performs mobility across TAs. In other words, the UE_A10 may initiate the present procedure at the time when the UE_A10 moves to a TA different from the TA indicated on a TA list held by the UE_A10. Further, the UE_A10 may initiate the present procedure at the time when a running timer expires. Furthermore, the UE_A10 may initiate the present procedure at the time when a context of each apparatus needs to be updated due to disconnection or invalidation (also referred to as deactivation) of a PDU session. Furthermore, the UE_A10 may initiate the present procedure at the time when a change occurs in capability information and/or preference pertaining to PDU session establishment of the UE_A10. Furthermore, the UE_A10 may initiate the present procedure regularly. It should be noted that the UE_A10 is not limited to the above and can perform the present procedure at any timing as long as a PDU session is established.

[1.3.1.1. Example of Registration Procedure]

An example procedure to perform the registration procedure will be described with reference to FIG. 10. In the present section, the present procedure refers to the registration procedure. Each step of the present procedure will be described below.

First, the UE_A10 transmits a Registration Request message to the AMF_A240 via a NR node_A122 (also referred to as a gNB) and/or ng-eNB (S1000) (S1002) (S1004) to initiate the registration procedure. In addition, the UE_A10 may transmit an SM (Session Management) message (e.g., a PDU session establishment request message) included in a registration request message or transmit the SM message (e.g., the PDU session establishment request message) along with the registration request message, so as to initiate a procedure for session management (SM), such as a PDU session establishment procedure, during the registration procedure.

Specifically, the UE_A10 transmits an RRC (Radio Resource Control) message including the registration request message to the NR node_A122 and/or ng-eNB (S1000). If the RRC message including the registration request message is received, the NR node_A122 and/or ng-eNB retrieves the registration request message from the RRC message and selects the AMF_A240 as a NF or a common CP function to which the registration request message is routed (S1002). Here, the NR node_A122 and/or ng-eNB selects the AMF_A240 based on information included in the RRC message. The NR node_A122 and/or ng-eNB transmits or transfers the registration request message to the selected AMF_A240 (S1004).

It should be noted that the registration request message is a NAS (Non-Access-Stratum) message transmitted and/or received on the N1 interface. In addition, the RRC message is a control message transmitted and/or received between the UE_A10 and the NR node_A122 and/or ng-eNB. Further, the NAS message is processed in an NAS layer, the RRC message is processed in an RRC layer, and the NAS layer is a layer higher than the RRC layer.

In addition, when there are a plurality of NSIs requesting registration, the UE_A10 may transmit a registration request message for each of the NSIs, or may transmit a plurality of registration request messages included in one or more RRC messages. In addition, the above-described plurality of registration request messages may be included in one or more RRC messages and transmitted as one registration request message.

When a registration request message and/or a control message different from the registration request message is received, the AMF_A240 performs first condition determination. The first condition determination is used for determining whether the AMF_A240 accepts a request of the UE_A10. In the first condition determination, the AMF_A240 determines whether the first condition determination is true or false. The AMF_A240 initiates a procedure (A) in the present procedure when the first condition determination is true (that is, the network accepts the request of the UE_A10), and initiates a procedure (B) in the present procedure when the first condition determination is false (that is, the network does not accept the request of the UE_A10).

Next, steps performed when the first condition determination is true, that is, each step of the procedure (A) in the present procedure, will be described. The AMF_A240 performs fourth condition determination, and initiates the procedure (A) in the present procedure. The fourth condition determination is to determine whether the AMF_A240 transmits and/or receives an SM message to/from the SMF_A230. In other words, the fourth condition determination may determine whether the AMF_A240 performs a PDU session establishment procedure in the present procedure. When the fourth condition determination is true (that is, the AMF_A240 transmits and/or receives an SM message to and/or from the SMF_A230), the AMF_A240 selects the SMF_A230 and transmits and/or receives the SM message to and/or from the selected SMF_A230, and when the fourth condition determination is false (that is, the AMF_A240 does not transmit and/or receive an SM message to and/or from the SMF_A230), the AMF_A240 skips the process (S1006). It should be noted that when the AMF_A240 receives an SM message indicating a rejection from the SMF_A230, the AMF_A240 may stop the procedure (A) in the present procedure and initiate a procedure (B) in the present procedure.

In addition, the AMF_A240 transmits a Registration Accept message to the UE_A10 via the NR node_A122 based on the reception of the registration request message from the UE_A10 and/or the completion of the transmission and/or reception of the SM message to and/or from the SMF_A230 (S1008). For example, when the fourth condition determination is true, the AMF_A240 may transmit the registration accept message based on the reception of the registration request message from the UE_A10. In addition, when the fourth condition determination is false, the AMF_A240 may transmit the registration accept message based on the completion of the transmission and/or reception of the SM message to and/or from the SMF_A230. Here, the registration accept message may be transmitted as a response message to the registration request message. In addition, the registration accept message is a NAS message transmitted and/or received on the N1 interface, and for example, the AMF_A240 may transmit it as a control message of the N2 interface to the NR node_A122, and the NR node_A122 that receives the message may include the message in an RRC message and transmit it to the UE_A10.

Further, when the fourth condition determination is true, the AMF_A240 may include an SM message (e.g., a PDU session establishment accept message) in the registration accept message and transmit it, or may transmit the SM message (e.g., a PDU session establishment accept message) along with the registration accept message. In addition, this transmission method may be performed when the registration request message includes an SM message (e.g., the PDU session establishment request message) and the fourth condition determination is true. In addition, the transmission method may be performed when an SM message (e.g., the PDU session establishment request message) is included along with the registration request message and the fourth condition determination is true. The AMF_A240 may indicate that the procedure for SM has been accepted by performing such a transmission method.

The UE_A10 receives the registration accept message via the NR node_A122 (S1008). The UE_A10 receives the registration accept message to recognize the content of various kinds of identification information included in the registration accept message.

Next, the UE_A10 transmits a Registration Complete message to the AMF_A240 based on the reception of the registration accept message (S1010). It should be noted that when the UE_A10 receives an SM message such as a PDU session establishment accept message, the UE_A10 may transmit an SM message such as a PDU session establishment complete message included in the registration complete message, or may include the SM message therein to indicate that the procedure for the SM is completed. Here, the registration complete message may be transmitted as a response message to the registration accept message. In addition, the registration complete message is a NAS message transmitted and/or received on the N1 interface, and for example, the UE_A10 may include it in an RRC message and transmit it to the NR node_A122, and the NR node_A122 that receives the message may transmit the message to the AMF_A240 as a control message of the N2 interface.

The AMF_A240 receives the registration complete message (S1010). In addition, each apparatus completes the procedure (A) in the present procedure based on the transmission and/or reception of the registration accept message and/or the registration complete message.

Next, steps performed when the first condition determination is false, that is, each step of the procedure (B) in the present procedure, will be described. The AMF_A240 transmits a Registration Reject message to the UE_A10 via the NR node_A122 (S1012) to initiate the procedure (B) in the present procedure. Here, the registration reject message may be transmitted as a response message to the registration request message. In addition, the registration reject message is a NAS message transmitted and/or received on the N1 interface, and for example, the AMF_A240 may transmit it as a control message of the N2 interface to the NR node_A122, and the NR node_A122 that receives the message may include the message in an RRC message and transmit it to the UE_A10. Further, the registration reject message transmitted by the AMF_A240 is not limited thereto as long as it is a message for rejecting the request of the UE_A10.

It should be noted that the procedure (B) of the present procedure may be sometimes initiated when the procedure (A) of the procedure is terminated. In the procedure (A), when the fourth condition determination is true, the AMF_A240 may include an SM message indicating rejection, such as a PDU session establishment reject message or the like, in the registration reject message and transmit the SM message, or indicate that a procedure for the SM is rejected by including the SM message indicating rejection. In that case, the UE_A10 may further receive the SM message indicating rejection such as the PDU session establishment reject message, or may recognize that the procedure for SM is rejected.

Furthermore, the UE_A10 may receive a registration reject message or may not receive a registration accept message to recognize that a request of the UE_A10 is rejected. Each apparatus completes the procedure (B) in the present procedure based on the transmission and/or reception of the registration reject message.

Each apparatus completes the present procedure (registration procedure) based on the completion of the procedure (A) or (B) of the present procedure. It should be noted that each apparatus may transition to a state in which the UE_A10 is registered in the network (RM_REGISTERED state) based on the completion of the procedure (A) of the present procedure, or may maintain a state in which the UE_A10 is not registered in the network (RM_DEREGISTERED state) based on the completion of the procedure (B) of the present procedure. In addition, a transition to each state of each apparatus may be performed based on completion of the present procedure, or may be performed based on establishment of a PDU session.

Further, each apparatus may, based on the completion of the present procedure, perform processing based on identification information transmitted and/or received in the present procedure.

In addition, the first condition determination may be performed based on identification information, and/or subscriber information and/or an operator policy included in the registration request message. For example, the first condition determination may be true when the network allows a request of the UE_A10. In addition, the first condition determination may be false when the network does not allow a request of the UE_A10. Furthermore, the first condition determination may be true when a network, to which the UE_A10 is to be registered, and/or an apparatus in the network supports a function requested by the UE_A10, and may be false when the network and/or the apparatus does not support the function. Further, the first condition determination may be true when it is determined that the network is congested, and may be false when it is determined that the network is not congested. It should be noted that conditions for determining whether the first condition determination is true or false may not be limited to the above conditions.

In addition, the fourth condition determination may also be performed based on whether the AMF_A240 receives an SM or may be performed based on whether an SM message is included in the registration request message. For example, the fourth condition determination may be true when the AMF_A240 receives the SM and/or the SM message is included in the registration request message, and may be false when the AMF_A240 does not receive the SM and/or the SM message is not included in the registration request message. It should be noted that conditions for determining whether the fourth condition determination is true or false may not be limited to the above conditions.

[1.3.2. Overview of PDU Session Establishment Procedure]

Next, an overview of the PDU session establishment procedure performed to establish a PDU session with the DN_A5 will be described. Hereinafter, the PDU session establishment procedure will also be referred to as the present procedure. The present procedure is a procedure for each apparatus to establish a PDU session. It should be noted that each apparatus may perform the present procedure in a state in which the registration procedure is completed or during the registration procedure. In addition, each apparatus may initiate the present procedure in a registered state, or may initiate the present procedure at any timing after the registration procedure. In addition, each apparatus may establish a PDU session based on the completion of a PDU session establishment procedure. Further, each apparatus may perform the present procedure multiple times to establish a plurality of PDU sessions.

[1.3.2.1. Example of PDU Session Establishment Procedure]

An example procedure to perform the PDU session establishment procedure will be described with reference to FIG. 11. Each step of the present procedure will be described below. First, the UE_A10 transmits a PDU Session Establishment Request message to a core network_B via an access network_B (S1100), and initiates the PDU session establishment procedure.

Specifically, the UE_A10 transmits the PDU session establishment request message to the AMF_A240 in the core network_B190 via the NR node_A122 by using the N1 interface (S1100). The AMF_A receives the PDU session establishment request message and performs third condition determination. The third condition determination is used for determining whether the AMF_A accepts the request of the UE_A10. In the third condition determination, the AMF_A determines whether the fifth condition determination is true or false. When the third condition determination is true, the core network_B initiates a process #1 (S1101) in the core network, and when the third condition determination is false, the core network_B initiates the procedure (B) in the present procedure. It should be noted that steps performed when the third condition determination is false will be described below. Here, the process #1 in the core network may be selection of an SMF by the AMF_A in the core network_B190 and/or transmission and/or reception of the PDU session establishment request message between the AMF_A and the SMF_A.

The core network_B190 initiates the process #1 in the core network. In the process #1 of the core network, the AMF_A240 may select the SMF_A230 as an NF as a routing destination of the PDU session establishment request message, and may transmit or transfer the PDU session establishment request message to the selected SMF_A230 by using an N11 interface. Here, the AMF_A240 may select the SMF_A230 as a routing destination based on information included in the PDU session establishment request message. More specifically, the AMF_A240 may select the SMF_A230 as a routing destination based on each piece of identification information acquired based on the reception of the PDU session establishment request message, and/or subscriber information, and/or network capability information, and/or an operator policy, and/or a network state, and/or a context already held by the AMF_A240.

It should be noted that the PDU session establishment request message may be a NAS message. In addition, the PDU session establishment request message may only need to be a message requesting establishment of a PDU session and is not limited to this.

Here, the UE_A10 may include one or more pieces of identification information from the first identification information to the fourth identification information in the PDU session establishment request message, or may indicate a request of the UE_A10 by including these pieces of identification information. It should be noted that two or more pieces of identification information of the identification information may be configured as one or more pieces of identification information.

Further, the UE_A10 may include the first identification information and/or the second identification information and/or the third identification information and/or the fourth identification information in the PDU session establishment request message and transmit them to request for the establishment of a PDU session belonging to a network slice, to indicate a network slice which the PDU session belongs to and is requested by the UE_A10, or to indicate a network slice to which the PDU session will belong.

More particularly, the UE_A10 may transmit the first identification information and the second identification information in association with each other to request for the establishment of a PDU session belonging to a network slice in a PDU session established for a DN identified with the second identification information, to indicate a network slice which the PDU session belongs to and is requested by the UE_A10, or to indicate a network slice to which the PDU session will belong.

Further, the UE_A10 may combine and transmit two or more pieces of identification information from the first identification information to the fourth identification information to make a request combining the above-described matters. It should be noted that matters indicated by the UE_A10 transmitting each piece of identification information may not be limited thereto.

It should be noted that the UE_A10 may determine which piece of identification information from the first identification information to the fourth identification information is to be included in the PDU session establishment request message based on capability information of the UE_A10, and/or a policy such as a UE policy, and/or a preference of the UE_A10, and/or an application (higher layer). It should be noted that the determination performed by the UE_A10 as to which piece of identification information is to be included in the PDU session establishment request message is not limited thereto.

The SMF_A230 in the core network_B190 receives the PDU session establishment request message and performs the third condition determination. The third condition determination is used for determining whether the SMF_A230 accepts the request of the UE_A10. In the third condition determination, the SMF_A230 determines whether the third condition determination is true or false. When the third condition determination is true, the SMF_A230 initiates the procedure (A) of the present procedure, and when the third condition determination is false, the SMF_A230 initiates the procedure (B) of the present procedure. It should be noted that steps performed when the third condition determination is false will be described below.

Next, steps performed when the third condition determination is true, that is, each step of the procedure (A) in the present procedure, will be described. The SMF_A230 selects the UPF_A235 with which the PDU session is to be established and performs 11th condition determination.

Here, the 11th condition determination is used for determining whether each apparatus performs a process #2 in the core network. Here, the process #2 in the core network may include initiation and/or execution of a PDU session establishment authentication procedure performed by each apparatus and/or transmission and/or reception of a Session Establishment request message between the SMF_A and UPF_A in the core network_B190, and/or transmission and/or reception of a Session Establishment response message, and the like (S1103). In the 11th condition determination, the SMF_A230 determines whether the 11th condition determination is true or false. The SMF_A230 initiates a PDU session establishment authentication and/or authorization procedure with the 11th condition determination is true, and omits the PDU session establishment authentication and/or authorization procedure when the 11th condition determination is false. It should be noted that the details of the PDU session establishment authentication and/or authorization procedure of the process #2 in the core network will be described below.

Next, the SMF_A230 transmits a session establishment request message to the selected UPF_A235 based on the 11th condition determination and/or completion of the PDU session establishment authentication and/or authorization procedure, and initiates the procedure (A) of the present procedure. It should be noted that the SMF_A230 may initiate the procedure (B) of the present procedure without initiating the procedure (A) of the present procedure based on the completion of the PDU session establishment authentication and/or authorization procedure.

Here, the SMF_A230 may select one or more UPFs_A235 based on each piece of identification information acquired based on the reception of the PDU session establishment request message, and/or network capability information, and/or subscriber information, and/or an operator policy, and/or a network state, and/or a context already held by the SMF_A230. It should be noted that when a plurality of UPFs_A235 are selected, the SMF_A230 may transmit the session establishment request message to each UPF_A235.

The UPF_A235 receives the session establishment request message and generates a context for the PDU session. In addition, the UPF_A235 transmits a session establishment response message to the SMF_A230 based on the reception of the session establishment request message and/or the creation of the context for the PDU session. Further, the SMF_A230 receives the session establishment response message. It should be noted that the session establishment request message and the session establishment response message may be control messages transmitted and/or received on the N4 interface. Further, the session establishment response message may be a response message to the session establishment request message.

Further, the SMF_A230 may perform address assignment to assign an address to the UE_A10 based on the reception of the PDU session establishment request message and/or the selection of the UPF_A235 and/or the reception of the session establishment response message. It should be noted that the SMF_A230 may perform the address assignment to assign the address to the UE_A10 during the PDU session establishment procedure, or may perform the address assignment to assign the address to the UE_A10 after the completion of the PDU session establishment procedure.

Specifically, when the SMF_A230 assigns an IPv4 address without using DHCPv4, the SMF_A230 may perform the address assignment during the PDU session establishment procedure or may transmit the assigned address to the UE_A10. In addition, when the SMF_A230 assigns the IPv4 address, and/or the IPv6 address, and/or the IPv6 prefix by using DHCPv4 or DHCPv6 or SLAAC (Stateless Address Autoconfiguration), the SMF_A230 may perform the address assignment after the PDU session establishment procedure or may transmit the assigned address to the UE_A10. It should be noted that the address assignment performed by SMF_A230 is not limited thereto.

Further, the SMF_A230 may include the assigned address in the PDU session establishment accept message and may transmit it to the UE_A10 based on the completion of the address assignment for the address to be assigned to the UE_A10, or may transmit the assigned address to the UE_A10 after the completion of the PDU session establishment procedure.

The SMF_A230 transmits the PDU session establishment accept message to the UE_A10 via the AMF_A240 based on the reception of the PDU session establishment request message, and/or the selection of the UPF_A235, and/or the reception of the session establishment response message, and/or the completion of the address assignment for the address to be assigned to the UE_A10 (S1110).

Specifically, the SMF_A230 transmits the PDU session establishment accept message to the AMF_A240 by using the N11 interface, and the AMF_A240 that receives the PDU session establishment accept message transmits the PDU session establishment accept message to the UE_A10 by using the N1 interface.

It should be noted that when the PDU session is a PDN connection, the PDU session establishment accept message may be a PDN connectivity accept message. Further, the PDU session establishment accept message may be a NAS message transmitted and/or received on the N11 interface and the N1 interface. In addition, the PDU session establishment accept message is not limited to the above and may be any message indicating that the establishment of a PDU session is accepted.

The UE_A10 receives the PDU session establishment accept message from the SMF_A230. The UE_A10 receives the PDU session establishment accept message to recognize the content of various kinds of identification information included in the PDU session establishment accept message.

Next, the UE_A10 transmits a PDU session establishment complete message to the SMF_A230 via the AMF_A240 based on the completion of the reception of the PDU session establishment accept message (S1114). Furthermore, the SMF_A230 receives the PDU session establishment complete message and performs the second condition determination.

Specifically, the UE_A10 transmits the PDU session establishment complete message to the AMF_A240 by using the N1 interface, and the AMF_A240 that has received the PDU session establishment complete message transmits the PDU session establishment complete message to the SMF_A230 by using the N11 interface.

It should be noted that when the PDU session is a PDN connection, the PDU session establishment complete message may be a PDN connectivity complete message or may be an activate default EPS bearer context accept message. Furthermore, the PDU session establishment complete message may be a NAS message transmitted and/or received on the N1 interface and the N11 interface. In addition, the PDU session establishment complete message only needs to be a response message to the PDU session establishment accept message, but the message is not limited to this, and may be a message indicating that the PDU session establishment procedure is completed.

The second condition determination is used for the SMF_A230 to determine a type of the message to be transmitted and/or received on the N4 interface. When the second condition determination is true, a process #3 in the core network may be initiated (S1115). Here, the process #3 in the core network may include transmission and/or reception of a session modification request message, and/or transmission and/or reception of a session modification response message, and the like. The SMF_A230 transmits a session modification request message to the UPF_A235, and further receives a session modification accept message transmitted from the UPF_A235 that receives the session modification request message. In addition, when the second condition determination is false, the SMF_A230 performs the process #2 in the core network. That is, the SMF_A transmits a session establishment request message to the UPF_A235, and further receives the session modification accept message transmitted from the UPF_A235 that receives the session establishment request message.

Each apparatus completes the procedure (A) in the present procedure based on the transmission and/or reception of the PDU session establishment complete message, and/or the transmission and/or reception of the session modification response message, and/or the transmission and/or reception of the session establishment response message, and/or the transmission and/or reception of an RA (Router Advertisement).

Next, steps performed when the third condition determination is false, that is, each step of the procedure (B) in the present procedure, will be described. The SMF_A230 transmits a PDU session establishment reject message to the UE_A10 via the AMF_A240 (S1122) and initiates the procedure (B) in the present procedure.

Specifically, the SMF_A230 transmits the PDU session establishment reject message to the AMF_A240 by using the N11 interface, and the AMF_A240 that receives the PDU session establishment request message transmits the PDU session establishment reject message to the UE_A10 by using the N1 interface.

It should be noted that when the PDU session is a PDN connection, the PDU session establishment reject message may be a PDN connectivity reject message. Further, the PDU session establishment reject message may be a NAS message transmitted and/or received on the N11 interface and the N1 interface. In addition, the PDU session establishment reject message is not limited to the above and may be any message indicating that the establishment of the PDU session is rejected.

Here, the SMF_A230 may include one or more pieces of identification information from the 11th identification information to the 18th identification information in the PDU session establishment reject message, or may indicate that a request of the UE_A10 is rejected by including these pieces of identification information. It should be noted that two or more pieces of identification information of the identification information may be configured as one or more pieces of identification information.

Furthermore, the SMF_A230 may include 11th identification information and/or 12th identification information and/or 13th identification information and/or 14th identification information and/or 15th identification information and/or 16th identification information and/or 17th identification information and/or 18th identification information in the PDU session establishment reject message and transmit them to indicate that a request for establishing a PDU session belonging to a network slice is rejected, or to indicate a network slice that is not allowed to belong to the PDU session.

More particularly, the SMF_A230 may transmit the 18th identification information and the 12th identification information in association with each other to indicate that, in a PDU session established for the DN identified with the 12th identification information, a request for establishing a PDU session belonging to a network slice is rejected, or to indicate a network slice that is not allowed to belong to the PDU session.

Furthermore, the SMF_A230 may include the 18th identification information in the PDU session establishment reject message and transmit it to indicate that, in a registration area and/or a tracking area to which the UE_A10 currently belongs, a request for establishing a PDU session belonging to a network slice is rejected, or to indicate a network slice that is not allowed to belong to the PDU session.

Furthermore, the SMF_A230 may include the 18th identification information in the PDU session establishment reject message and transmit it to indicate that, in an access network to which the UE_A10 is currently connected, a request for establishing a PDU session belonging to a network slice is rejected, or to indicate a network slice that is not allowed to belong to the PDU session.

Furthermore, the SMF_A230 may include the 11th identification information and/or the 14th identification information in the PDU session establishment reject message and transmit them to indicate a value of the first timer and to indicate whether a procedure that is the same as the present procedure needs to be performed again after the completion of the present procedure.

Furthermore, the SMF_A230 may combine and transmit two or more pieces of identification information from the 11th identification information to the 18th identification information to make a request combining the above-described matters. It should be noted that matters indicated by the SMF_A230 transmitting each piece of identification information may not be limited thereto.

It should be noted that the SMF_A230 may determine which piece of identification information from the 11th identification information to the 18th identification information is to be included in the PDU session establishment reject message based on the received identification information, and/or network capability information, and/or a policy such as an operator policy, and/or a network state.

In addition, the 12th identification information may be information indicating a DNN that is the same as the DNN indicated by the second identification information. Furthermore, the 13th identification information may be information indicating a PDU session ID that is the same as the PDU session ID indicated by the third identification information. Further, the 18th identification information may be information transmitted when the first identification information is received and/or when the network slice indicated by the first identification information is not allowed by the network. It should be noted that the determination performed by the SMF_A230 as to which piece of identification information is to be included in the PDU session establishment reject message is not limited thereto.

As described above, the core network_B190 notifies the UE_A10 of a congestion management to be applied by transmitting a PDU session reject message. As a result, the core network_B190 may notify the application of a congestion management to the UE_A10, and/or indication to the UE_A10 that the congestion management is to be performed, and/or information for identifying the type of congestion management to be applied, and/or information for identifying a congestion management target such as a DNN and/or S-NSSAI corresponding to the congestion management to be applied, and/or a value of the timer associated with the congestion management to be applied.

Here, each piece of the above-described information may be information identified by one or more pieces of identification information from the 11th identification information to the 18th identification information.

The UE_A10 may include one or more pieces of identification information from the 11th identification information to the 18th identification information in the PDU session establishment reject message received from the SMF_A230.

Next, the UE_A10 performs a fourth process based on the reception of the PDU session establishment reject message (S1124). In addition, the UE_A10 may perform the fourth process based on the completion of the present procedure.

Hereinafter, a first example of the fourth process will be described.

Here, the fourth process may be a process in which the UE_A10 recognizes the matter indicated by the SMF_A230. Furthermore, the fourth process may be a process in which the UE_A10 stores the received identification information as a context, or may be a process in which the UE transfers the received identification information to a higher layer and/or a lower layer. Furthermore, the fourth process may be a process in which the UE_A10 recognizes that a request for the present procedure is rejected.

Furthermore, when the UE_A10 receives the 14th identification information and the 11th identification information, the fourth process may be a process in which the UE_A10 sets the value indicated by the 14th identification information as the first timer value, or may be a process of starting the first timer with the set timer value. Furthermore, when the UE_A10 receives the 11th identification information, the fourth process may be a process of performing one or more behaviors among the first to the 11th behaviors.

Further, when the UE_A10 receives the 18th identification information and the 11th identification information, the fourth process may be a process in which the UE_A10 performs the 12th behavior based on information for identifying an NW slice included in the 18th identification information, and a network slice-associated rule included in the 18th identification information or a network slice-associated rule held and preconfigured in the UE_A10.

Furthermore, when the UE_A10 receives a plurality of pieces of the 14th identification information and 11th identification information, the fourth process may be a process in which the UE_A10 performs the 13th behavior based on a plurality of first timers included in each piece of the 14th identification information and a priority management rule of the back-off timer held by the UE_A10.

Furthermore, when the UE_A10 receives a plurality of pieces of the 14th identification information and the 11th identification information, the fourth process may be a process in which the UE_A10 performs the 14th behavior based on a plurality of first timers included in each piece of the 14th identification information.

Here, the 12th to the 15th behaviors may be congestion managements initiated and performed by the UE_A10 based on rules and/or policies within the UE_A10. Specifically, for example, the UE_A10 may be configured to include the following elements in a storage unit and/or a controller within the UE_A10: a policy (UE policy) and/or a rule, a management function of the policy and/or the rule, a policy enforcer that causes the UE_A10 to operate based on the policy and/or the rule, one or more applications, and a session management instances (session manager) for managing one or more PDU sessions to be established or attempted to be established based on a request from each application, and may implement congestion management initiated by the UE_A10 by performing any of the 12th to the 15th behaviors as the fourth process based on the above elements. Here, the policy and/or the rule may include one or more of a network slice-associated rule and/or a priority management rule of a back-off timer, and/or an NSSP (Network Slice Selection Policy), which may further be preconfigured in the UE_A10 or received from the network. In addition, here, the policy enforcer may be an NSSP enforcer. In addition, here, the application may be an application layer protocol, and a PDU session may be established or attempted to be established based on a request from the application layer protocol. In addition, here, the session management instance may be a software element dynamically generated on a per PDU session basis. In addition, here, the S-NSSAI may be grouped as internal processing of the UE_A10, or processing based on the grouping of the S-NSSAI may be performed. It should be noted that an internal configuration and processing of the UE_A10 are not limited thereto, and each element may be implemented by software or may be performed as software processing within the UE_A10.

Furthermore, the UE_A10 may switch to an EPS in the fourth process or based on the completion of the fourth process, and may initiate position registration at the EPS based on the DCN ID included in the 18th identification information. It should be noted that the switch of the UE_A10 to the EPS may be based on a handover procedure, or may be a RAT switch initiated by the UE_A10. In addition, when the UE_A10 receives the 18th identification information including the DCN ID, the UE_A10 may perform the switch to the EPS during the fourth process or after the completion of the fourth process.

Furthermore, the fourth process may be a process in which the UE_A10 initiates the present procedure again after a certain period of time, or may be a process of transitioning to a state in which the request of the UE_A10 is limited or restricted.

Besides, the UE_A10 may transition to a first state according to the completion of the fourth process.

Next, a second example of the fourth process will be described.

Here, the fourth process may be a process in which the UE_A10 recognizes the matter indicated by the SMF_A230. Furthermore, the fourth process may also be a process in which the UE_A10 stores the received identification information as a context, or may be a process in which the UE transfers the received identification information to a higher layer and/or a lower layer.

Furthermore, in the fourth process, processing may be performed to identify the application of a congestion management based on one or more pieces of identification information from the 11th identification information to the 18th identification information.

Furthermore, in the fourth process, processing may be performed to identify which type of congestion managements to be applied from the first congestion management to the fourth congestion management and to identify the DNN and/or the S-NSSAI associated with the congested management to be applied based on one or more pieces of identification information from the 11th identification information to the 18th identification information. More specifically, the present process may be the process described in the 15th behavior.

Furthermore, in the fourth process, based on one or more pieces of identification information from the 11th identification information to the 18th identification information, a value configured to the first timer indicated by the 14th identification information associated with a congestion management to be applied may be identified and configured, and the counting of a first timer may be started. More specifically, the present process may be the process described in the 8th behavior.

Furthermore, in the fourth process, one or more of behaviors from first behavior to the seventh behavior may be performed in accordance with the initiation or completion of any of the processes described above.

Furthermore, in the fourth process, one or more of behaviors from the ninth behavior to the 15th behavior may be performed in accordance with the initiation or completion of any of the processes described above.

Besides, the UE_A10 may transition to a first state according to the completion of the fourth process.

Although detailed processes for the fourth process have been described by using the first example and the second example, the fourth process may not be limited to these processes. For example, the fourth process may be a combined process of a part of the plurality of detailed processes described in the first example and a part of the plurality of detailed processes described in the second example.

Furthermore, the UE_A10 may receive the PDU session establishment reject message or may not receive the PDU session establishment accept message to recognize that a request of the UE_A10 is rejected. Each apparatus completes the procedure (B) in the present procedure based on the transmission and/or reception of the PDU session establishment reject message.

Each apparatus completes the present procedure based on the completion of the procedure (A) or (B) of the present procedure. It should be noted that each apparatus may transition to a state in which the PDU session is established based on the completion of the procedure (A) of the present procedure, or each apparatus may recognize that the present procedure is rejected, transition to a state in which the PDU session is not established, or transition to the first state based on the completion of the procedure (B) or the present procedure.

Furthermore, each apparatus may, based on the completion of the present procedure, perform processing based on identification information transmitted and/or received in the present procedure. In other words, the UE_A10 may perform the fourth process based on the completion of the present procedure, or may transition to the first state after the completion of the fourth process.

In addition, the third condition determination may be performed based on the identification information included in the PDU session establishment request message, and/or subscriber information, and/or an operator policy. For example, the third condition determination may be true when a network allows a request of the UE_A10. In addition, the third condition determination may be false when a network does not allow a request of the UE_A10. Furthermore, the third condition determination may be true when a network, to which the UE_A10 is to be connected, and/or an apparatus in the network supports a function requested by the UE_A10, and may be false when the network and/or the apparatus does not support the function. Further, the third condition determination may be true when it is determined that the network is congested, and may be false when it is determined that the network is not congested. It should be noted that conditions for determining whether the third condition determination is true or false may not be limited to the above conditions.

In addition, the second condition determination may be performed based on whether a session on the N4 interface for the PDU session is established. For example, the second condition determination may be true when the session on the N4 interface for the PDU session is established, and may be false when the session on the N4 interface for the PDU session is not established. It should be noted that conditions for determining whether the second condition determination is true or false may not be limited to the above conditions.

In addition, the 11th condition determination may be performed based on the identification information included in the PDU session establishment request message, and/or subscriber information, and/or an operator policy. For example, the 11th condition determination may be true when the network allows authentication and/or authorization by the DN_A5 to be performed during the present procedure. In addition, the 11th condition determination may be false when the network does not allow authentication and/or authorization by the DN_A5 to be performed during the present procedure. Furthermore, the 11th condition determination may be true when a network serving as a connection destination of the UE_A10 and/or an apparatus in the network support performing authentication and/or authorization by the DN_A5 during the present procedure, or may be false when the network and/or the apparatus do not support performing authentication and/or authorization by the DN_A5 during the present procedure. Furthermore, the 11th condition determination may be true when 61st identification information is received, and may be false when the 61st identification information is not received. In other words, the 11th condition determination may be true when a container including information such as SM PDU DN Request Container and/or a plurality of pieces of information is received, and may be false when the container is not received. It should be noted that conditions for determining whether the 11th condition determination is true or false may not be limited to the above conditions.

The transmission and/or reception of the PDU session reject message in the above-described procedure causes the core network_B190 to notify the UE_A10 of a congestion management to be applied, and the UE_A10 can apply the congestion management indicated by the core network_B190. Further, the core network_B190 and the UE_A10 may apply a plurality of congestion managements by performing the procedures and processes described in the present procedure multiple times. It should be noted that the applied congestion managements may be different types of congestion managements, and/or congestion managements corresponding to different DNNs, and/or congestion managements corresponding to different S-NNSAIs, and/or congestion managements with different combinations of DNNs and S-NSSAIs.

[1.3.3. Overview of Network-Initiated Session Management Procedure]

Next, an overview of a network-initiated session management procedure will be described. Hereinafter, the network-initiated session management procedure will also be referred to as the present procedure. The present procedure is a procedure for a session management initiated and performed by the network for an established PDU session. It should be noted that the present procedure may be performed at any timing after the registration procedure and/or the PDU session establishment procedure described above is completed and each apparatus transitions to the first state. In addition, each apparatus may transmit and/or receive a message including identification information for stopping or modifying a congestion management during the present procedure, or may initiate a behavior based on a new congestion management indicated by the network based on the completion of the present procedure.

Besides, the UE_A10 may stop the application of the congestion management identified based on control information transmitted and/or received through the present procedure. In other words, the core network_B190 may initiate the present procedure and transmit the control message and the control information of the present procedure to the UE_A10 to notify the UE_A10 to stop the application of an identifiable congestion management by using these control information.

It should be noted that the present procedure may be a network-initiated PDU session modification procedure, and/or a network-initiated PDU session release procedure, or the like, or may perform a network-initiated session management procedure that is not limited to the above. It should be noted that each apparatus may transmit and/or receive a PDU session modification message in the network-initiated PDU session modification procedure, or may transmit and/or receive a PDU session release message in the network-initiated PDU session release procedure.

[1.3.3.1. Example of First Network-Initiated Session Management Procedure]

Figure 12:
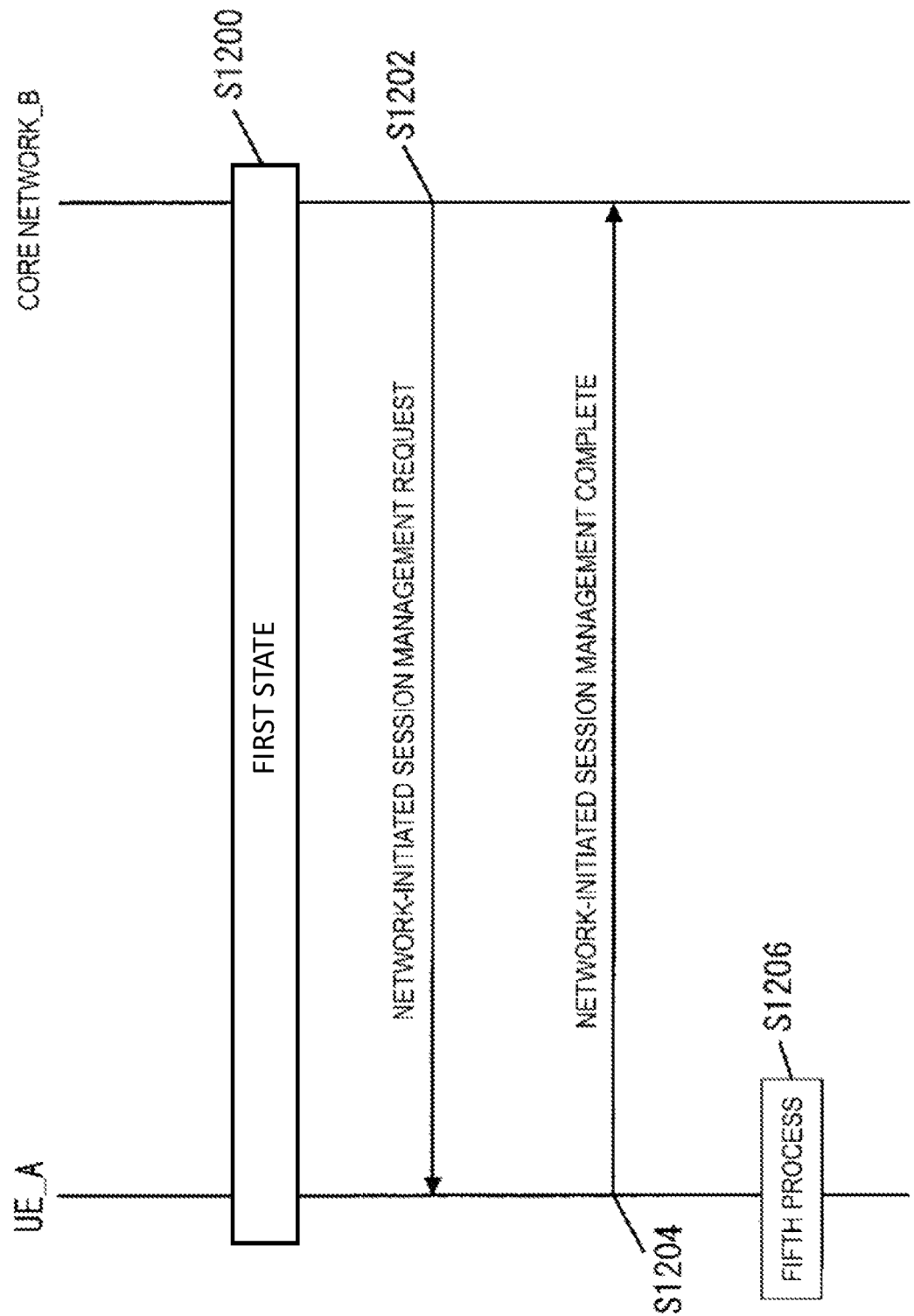
FIG. 12 is a diagram illustrating a network-initiated session management procedure.

An example of a network-initiated session management procedure will be described with reference to FIG. 12. In this section, the present procedure refers to the network-initiated session management procedure. Each step of the present procedure will be described below.

As described above, based on the completion of the registration procedure and/or the PDU session establishment procedure, each apparatus in the UE_A10 and core network_B190 that transitions to the first state (S1200) initiates the network-initiated session management procedure at any timing. Here, the apparatus in the core network_B190 that initiates the present procedure may be the SMF_A and/or the AMF_A, and the UE_A may transmit and/or receive a message in the present procedure via the AMF_A and/or the access network_B.

Specifically, the apparatus in the core network_B190 transmits a network-initiated session management request message to the UE_A (S1202). Here, the apparatus in the core network_B190 may include the 21st identification information in the network-initiated session management request message, or may indicate a request of the core network_B190 by including this identification information.

Next, the UE_A receiving the network-initiated session management request message transmits a network-initiated session management complete message (S1204). Furthermore, the UE_A may perform a fifth process based on the 21st identification information received from the core network_B190 (S1206), and complete the present procedure. In addition, the UE_A10 may perform the fifth process based on the completion of the present procedure.

An example of a fifth process will be described below.

Here, the fifth process may be a process in which the UE_A10 recognizes the matter indicated by the core network_B190, or may be a process in which the UE_A10 recognizes a request of the core network_B190. Furthermore, the fifth process may also be a process in which the UE_A10 stores the received identification information as a context, or may be a process in which the UE transfers the received identification information to a higher layer and/or a lower layer.

In addition, a message transmitted and/or received in the network-initiated session management request may be a PDU SESSION MODIFICATION COMMAND, may be a PDU SESSION RELEASE COMMAND, but is not limited thereto.

It should be noted that the UE_A10 may perform identification process of a congestion management applied by the UE_A10 based on the received 21st identification information in the fifth process. Here, the identification process of the congestion management may be the 17th behavior.

Further, when the UE_A10 receives the 21st identification information, the fifth process may be the 16th behavior. Specifically, it may be, for example, a process of stopping one or multiple timers running based on the fourth process described above.

In other words, the UE_A10 receiving the 21st identification information performs the 17th behavior to identify a congestion management that is indicated from the network to be stopped or modified, and subsequently performs the 16th behavior to stop or modify the identified congestion management.

Furthermore, each apparatus may, based on the completion of the present procedure, perform processing based on identification information transmitted and/or received in the present procedure. In other words, the UE_A10 may perform the fifth process based on the completion of the present procedure, or may complete the present procedure after the completion of the fifth process.

In the above procedure, the core network_B190 can made an indication to the UE_A10 to stop or modify the congestion management applied by the UE_A10 by the transmission and/or reception of the network-initiated session management request message. Furthermore, the UE_A10 can stop or modify the congestion management applied by the UE_A10 based on the network-initiated session management request message. Here, when the UE_A10 applies one or more congestion managements, the UE_A10 may identify the congestion management to be stopped or modified based on the reception of the identification information included in the network-initiated session management request message from the core network_B190. It should be noted that the applied congestion managements may also be different types of congestion managements, and/or congestion managements corresponding to different DNNs, and/or congestion managements corresponding to different S-NNSAIs, and/or congestion managements with different combinations of DNNs and S-NSSAIs.

[1.3.3.2. Example of Second Network-Initiated Session Management Procedure]

In the example of first network-initiated session management procedure described in Section 1.3.3.1, it is described that the congestion management is stopped in the procedure regardless of whether the congestion management applied to the UE_A10 is one of the congestion managements from the first congestion management to fourth congestion management.

Without being limited to the above, the procedure described in the example of first network-initiated session management procedure described in Section 1.3.3.1 may also be a procedure performed according to a congestion management. For example, the procedure may be performed for a congestion management classified into the first congestion management, the third congestion management, or the fourth congestion management among one or more congestion managements applied to UE_A10.

In other words, the UE_A10 may stop the congestion management corresponding to the first congestion management, the third congestion management, and/or the fourth congestion management through the fifth process.

While the timing of a back-off timer corresponding to the second congestion management is performed, the UE_A10 may respond with respect to the core network_B190 without stopping the back-off timer corresponding to the second congestion management if the UE_A10 receives the network-initiated session management request message with respect to the second congestion management.

In other words, while the timing of the back-off timer corresponding to S-NSSAI #A is performed, the UE_A10 may respond with respect to the core network_B190 without stopping the back-off timer corresponding to the S-NSSAI #A when the UE_A10 receives a network-initiated session management request message for S-NSSAI #A and any DNN that is being congested.

In this way, regarding the second congestion management, in the reception of the network-initiated session management request message, the UE_A10 may transmit a message to the core network_B190 in response to the network-initiated session management request message, but may continue the congestion management. Therefore, the transmission of the UE-initiated session management request message regulated by the second congestion management may continue to be suppressed.

Here, as described above, the network-initiated session management request message of the present embodiment may be a PDU SESSION MODIFICATION COMMAND message in a network-initiated PDU session modification procedure, or may be a PDU SESSION RELEASE COMMAND message in a network-initiated PDU session release procedure.

Further, as described above, the network-initiated session management complete message for responding with respect to the PDU SESSION MODIFICATION COMMAND message of the present embodiment may be a PDU SESSION MODIFICATION COMPLETE message, and the network-initiated session management complete message for responding with respect to the PDU SESSION RELEASE COMMAND message of the present embodiment may be a PDU SESSION RELEASE COMPLETE message. In addition, when the network-initiated session management request message is a PDU session modification command and/or a PDU session release message, the UE_A10 and the core network_B190 may further perform detailed processes described below in addition to the processes described above.

For example, when the core network_B190 transmit a network-initiated session management request message including information indicating Reactivation Required, the processing may be performed as follows. Further, the information indicating Reactivation Required is information indicating a request for activation, and a specific example thereof may be a 5G session management cause value #39 (5GSM Cause #39).

Hereinafter, a first process and procedure example at the time when the information indicating a reactivation request is received will be described.

When the UE_A10 receives a network-initiated session management request message including information indicating Reactivation Required, the UE_A10 does not initiate a UE-initiated PDU session establishment procedure again immediately after the completion of the network-initiated session management procedure, but waits for the release of the congestion management and then initiates a UE-initiated PDU session establishment procedure again. Here, the UE-initiated PDU session establishment procedure may be a UE-initiated PDU session establishment procedure for PDU session type, SSC mode, DNN, and S-NSSAI provided in the UE-initiated PDU establishment procedure when the PDU session to be changed or released is established.

Further, the waiting for the release of the congestion management may be performed after the expiration of a timer corresponding to the second congestion management. In other words, it may be performed after the counting of the timer corresponding to the second congestion management is completed and/or after the timer value corresponding to the second congestion management becomes zero.

Also, the UE_A10 may include the following supplementary message in the network-initiated session management compete message.

The supplementary information may be information indicating the waiting for the expiration of a timer and/or information of a remaining timer value. Here, the timer may be a timer corresponding to the second congestion management. In addition, the waiting for expiration of the timer may be performed after the timer is expired. In other words, it may be performed after the counting of the timer corresponding to the second congestion management is completed and/or after the timer value corresponding to the second congestion management becomes zero.

In addition, the core network_B190 may receive a network-initiated session management complete message including the supplementary message and identify the remaining timer value. Further, the UE-initiated PDU session establishment procedure may be identified after the time indicated by the remaining timer value has elapsed.

Here, the remaining timer identified by the core network_B190 may be a value indicated by the received supplementary information, or may be a value that takes into account an offset, as compared with the value indicated by the received supplementary information, between a time at which the UE_A10 transmits the network-initiated session management completion message and a time at which the core network_B190 receives the message.

In addition, the present invention is not limited to the first process and procedure example at the time when the information indicating the reactivation request is received, and a second process and procedure example at the time when the information indicating a reactivation request is received may be performed as follows.

As described above, with respect to the second congestion management, in the reception of the network-initiated session management request message, the UE_A10 may transmit a message to the core network_B190 in response to the network-initiated session management request message, but may continue the congestion management. Therefore, the transmission of the UE-initiated session management request message regulated by the second congestion management continues to be suppressed, but the UE_A10 and/or the core network_B190 may be configured to be allowed for the transmission as long as a UE-initiated PDU session establishment procedure is initiated again.

In other words, when the UE_A10 receives a network-initiated session management request message including information indicating Reactivation Required, the UE_A10 initiates a UE-initiated PDU session establishment procedure again after the completion of the network-initiated session management procedure. Here, the UE-initiated PDU session establishment procedure may be a UE-initiated PDU session establishment procedure for PDU session type, SSC mode, DNN, and S-NSSAI provided in the UE-initiated PDU establishment procedure when the PDU session to be changed or released is established.

Further, the UE_A10 and the core network_B190 may perform and complete a procedure allowed as an exception while the UE_A10 continues to apply the congestion management, but the UE_A10 may suppress the initiation of other UE-initiated session management procedure suppressed by the second congestion management.

In addition, the present invention is not limited to the first and second process and procedure examples at the time when the information indicating the reactivation request is received, and a third process and procedure example at the time when the information indicating a reactivation request is received may be performed as follows.

As described above, with respect to the second congestion management, in the reception of the network-initiated session management request message, the UE_A10 may transmit a message to the core network_B190 in response to the network-initiated session management request message. Further, when the UE_A10 receives a network-initiated session management request message including information indicating Reactivation Required, the UE_A10 stops the application of the second congestion management.

In other words, the UE_A10 may continue the congestion management when the network-initiated session management request message does not include information indicating Reactivation Required. In this case, the transmission of the UE-initiated session management request message regulated by the second congestion management is suppressed.

Therefore, when the UE_A10 receives a network-initiated session management request message including information indicating Reactivation Required, the UE_A10 initiates a UE-initiated PDU session establishment procedure again after the completion of the network-initiated network-initiated session management procedure. Here, the UE-initiated PDU session establishment procedure may be a UE-initiated PDU session establishment procedure for PDU session type, SSC mode, DNN, and S-NSSAI provided in the UE-initiated PDU establishment procedure when the modified or released PDU session is established.

In addition, the present invention is not limited to the first, second, and third process and procedure examples at the time when the information indicating the reactivation request is received, and the information indicating the reactivation request may be configured not to be transmitted by the core network_B190 as follows.

More specifically, the core network_B190 may be configured to suppress the inclusion of information indicating Reactivation Required when transmitting a network-initiated session management request message to the UE_A10 to which a congestion management is applied.

Alternatively, the core network_B190 may be configured to suppress the inclusion of information indicating Reactivation Required when the core network_B190 transmits a network-initiated session management request message to the UE_A10 to which a second congestion management is applied.

The processes and procedures of the UE_A10 and the core network_B190 have been described above, but the processes of the core network_B190 described in this section may be more specifically a process performed by a control apparatus such as the SMF_A230 and/or the AMF_A240 in the core network_B190. Therefore, the expression that the core network_B190 transmits and receives a control message may mean that a control apparatus, such as the SMF_A230 and/or the AMF_A240 in the core network_B190, transmits and receives a control message.

In addition, the present invention is not limited to this section. In the expressions used in the description of the present embodiment, the process of releasing the application of the congestion management or the process of stopping the congestion management may include a process of stopping a back-off timer corresponding to the congestion management, and the process of continuing the application of the congestion management or the process of continuing the congestion management may include continuing the counting of a back-off timer corresponding to the congestion management.

Further, in the first, second, and third process and procedure examples described in this section at the time when the information indicating a reactivation request is received, the network-initiated session management request message and/or the network-initiated session management procedure has been described for the UE with respect to S-NSSAI #A and any DNN in congestion.

In other words, the S-NSSAI #A and any DNN in congestion may be S-NSSAI #A and any DNN associated with a PDU session subjected to the network-initiated session management request message and/or the network-initiated session management procedure of this section.

Besides, the UE_A10 and the core network_B190 may perform an anchor relocation procedure of SSC Mode 2 including the procedure of this section, and switch to the anchor of a PDU session or a PDU session with a different anchor to continue the communication. Here, the anchor relocation procedure of SSC mode 2 is a procedure initiated and started by the core network_B190, and the procedure associated with the transmission of a PDU session release command performed within this procedure is one of the procedures described in this section.

In addition, the UE_A10 and the core network_B190 may perform an anchor relocation procedure of SSC mode 3 including the procedure of this section, and switch to the anchor of a PDU session or a PDU session with a different anchor to continue the communication. Here, the anchor relocation procedure of SSC mode 3 is a procedure initiated and started by the core network_B190, and the procedure associated with the transmission of a PDU session modification command performed within this procedure is one of the procedures described in this section.

Next, in the state where congestion management is applied, the process at the time when the UE moves with a PLMN changed will be described.

Here, the process at the time when the UE_A10 changes the PLMN in the state where the first congestion management is applied will be especially described. Here, the first congestion management and the process regulated at the time when the first congestion management is applied may be as described above.

If the description is repeated, the first congestion management may be a DNN-based congestion management. For example, the first congestion management may be a congestion management applied by the NW to the UE_A10 based on a message rejecting a UE-initiated session management request in a case that the NW receives a UE-initiated session management request using DNN #A from the UE_A10 and the NW detects congestion with respect to a specific DNN, such as DNN #A. In this case, in the application of the first congestion management, the UE_A10 may start the counting of the back-off timer corresponding to the first congestion management received from the NW, and may not transmit the UE-initiated session management request using the DNN #A until the back-off timer expires. In addition, using DNN may mean including DNN information in a UE-initiated session management request such as a PDU session establishment request message.

Here, the first congestion management for explanation purpose is expressed as "a first congestion management for a specific DNN".

In addition, in the first congestion management, even when the UE-initiated session management request does not include DNN information, the NW may select a default DNN initiated by the NW and configure it as a target subjected to congestion management. In other words, the first congestion management may be a congestion management applied by the NW to the UE_A10 based on a message rejecting a UE-initiated session management request in a case that the NW receives from the UE_A10 a UE-initiated session management request that does not use a DNN and the NW detects congestion with respect to a default DNN. In this case, in the application of the first congestion management, the UE_A10 may start the counting of the back-off timer corresponding to the first congestion management received from the NW, and may not transmit the UE-initiated session management request that does not use a DNN until the back-off timer expires. In addition, using no DNN may mean that including no DNN information in a UE-initiated session management request such as a PDU session establishment request message.

Here, for explanation purpose, the first congestion management for the default DNN is applied based on a UE-initiated session management request that does not use DNN information and thus is expressed as "congestion management for No DNN" in order to be distinguished from the congestion management for a specific DNN. Furthermore, the UE-initiated session management request such as the PDU session establishment request message that does not use a DNN is expressed as the UE-initiated session management request using No DNN. For example, the PDU session establishment request message using No DNN is the PDU session establishment request message that does not use a DNN.

Further, the UE_A10 may be configured to be able to transmit a PDU session establishment request message using a specific DNN in a new PLMN when the UE_A10 performs the counting of a back-off timer corresponding to the first congestion management for the specific DNN in a PLMN change, or when the back-off timer corresponding to the first congestion management for the specific DNN is deactivated. Therefore, the UE_A10 may transmit the PDU session establishment request message using the specific DNN based on the configuration.

Here, the UE_A10 may continue counting until the timer expires without stopping the back-off timer that is counting. Alternatively, the UE_A10 may continue to keep the deactivated back-off timer in a deactivated state.

Thus, the first congestion management for a specific DNN may also correspond to a PLMN.

For example, when the first congestion management for a specific DNN is applied, the UE associates the back-off timer with a PLMN and a specific DNN to start counting, and when the back-off timer is zero or deactivated, a PDU session using the specific DNN associated with the back-off timer may not be established in the PLMN associated with the back-off timer. In addition, when the back-off timer is deactivated, a PDU session using the specific DNN associated with the back-off timer may not be established in the PLMN associated with the back-off timer until the terminal power is OFF or the USIM is removed. In addition, when the back-off timer is zero, a PDU session using the specific DNN associated with the back-off timer may be established in the PLMN associated with the back-off timer.

In other words, the UE_A10 may be configured to be able to transmit a PDU session establishment request message using a specific DNN in a new PLMN when the UE_A10 performs the counting of a back-off timer corresponding to the first congestion management for the specific DNN and a PLMN before changed in a PLMN change, or when the back-off timer corresponding to the first congestion management for the specific DNN and the PLMN before changed is deactivated, and when the counting of the back-off timer corresponding to the first congestion management for the specific DNN and a PLMN after changed is not performed, and when the back-off timer corresponding to the first congestion management for the specific DNN and the PLMN after changed is not deactivated. Further, the UE 10 may transmit a PDU session establishment request message using a specific DNN based on the configuration.

Further, the UE_A10 may be configured to be able to transmit a PDU session establishment request message that does not use a DNN in a new PLMN when the UE_A10 performs the counting of a back-off timer corresponding to the first congestion management for No DNN in a PLMN change, or when the back-off timer corresponding to the first congestion management for No DNN is deactivated. Therefore, the UE_A10 may transmit the PDU session establishment request message using the specific DNN based on the configuration.

Here, the UE_A10 may continue counting until the timer expires without stopping the back-off timer that is counting. Alternatively, the UE_A10 may continue to keep the deactivated back-off timer in a deactivated state.

Thus, the first congestion management for No DNN may also correspond to a PLMN. In other words, the UE_A10 may be configured to be able to transmit a PDU session establishment request message without using a DNN in a new PLMN when the UE_A10 performs the counting of a back-off timer of the first congestion management for No DNN corresponding to a PLMN before changed in a PLMN change, or when the back-off timer of the first congestion management for No DNN corresponding to the PLMN before changed is deactivated, and when the counting of the back-off timer of the first congestion management for No DNN corresponding to a PLMN after changed is not performed, and the back-off timer of the first congestion management for No DNN corresponding to the PLMN is not deactivated. Further, the UE 10 may transmit a PDU session establishment request message that does not use a DNN based on the configuration.

As described above, the UE_A10 may perform the same process regardless of whether the first congestion management is for a specific DNN or for No DNN.

In other words, the UE_A10 may be configured to be able to transmit a PDU session establishment request message using a specific DNN and/or a PDU session establishment request message that does not use a DNN, which are/is regulated by the congestion management corresponding to a PLMN before changed, in a new PLMN when the UE_A10 performs the counting of a back-off timer of the first congestion management corresponding to the PLMN before changed in a PLMN change, or when the back-off timer of the first congestion management corresponding to the PLMN before changed is deactivated, and when the counting of the back-off timer of the first congestion management corresponding to a PLMN after changed is not performed, and the back-off timer of the first congestion management corresponding to the PLMN is not deactivated.

Alternatively, the UE_A10 may perform a different process depending on whether the first congestion management is for a specific DNN or for No DNN.

Further, the UE_A10 may be configured not to transmit a PDU session establishment request message using a specific DNN in a new PLMN when the UE_A10 performs the counting of a back-off timer corresponding to the first congestion management for the specific DNN in a PLMN change, or when the back-off timer corresponding to the first congestion management for the specific DNN is deactivated. Therefore, the UE_A10 may regulate the transmission of the PDU session establishment request message using the specific DNN based on the configuration.

Here, the UE_A10 may continue counting until the timer expires without stopping the back-off timer that is counting. Alternatively, the UE_A10 may continue to keep the deactivated back-off timer in a deactivated state.

Thus, the first congestion management for a specific DNN may be applied to different PLMNs.

On the other hand, the UE_A10 may be configured to be able to transmit a PDU session establishment request message that does not use a DNN in a new PLMN when the UE_A10 performs the counting of a back-off timer corresponding to the first congestion management for No DNN in a PLMN change, or when the back-off timer corresponding to the first congestion management for No DNN is deactivated. Therefore, the UE_A10 may transmit the PDU session establishment request message using the specific DNN based on the configuration.

Here, the UE_A10 may continue counting until the timer expires without stopping the back-off timer that is counting. Alternatively, the UE_A10 may continue to keep the deactivated back-off timer in a deactivated state.

Thus, the first congestion management for No DNN may also correspond to a PLMN.

For example, when the first congestion management for No DNN is applied, the UE associates the back-off timer with a PLMN and No DNN to start counting, and when the back-off timer is zero or deactivated, a PDU session using No DNN associated with the back-off timer may not be established in the PLMN associated with the back-off timer. In addition, when the back-off timer is deactivated, a PDU session using No DNN associated with the back-off timer may not be established in the PLMN associated with the back-off timer until the terminal power is OFF or the USIM is removed. In addition, when the back-off timer is zero, a PDU session using No DNN associated with the back-off timer may be established in the PLMN associated with the back-off timer.

In other words, the UE_A10 may be configured to be able to transmit a PDU session establishment request message without using a DNN in a new PLMN when the UE_A10 performs the counting of a back-off timer of the first congestion management for No DNN corresponding to a PLMN before changed in a PLMN change, or when the back-off timer of the first congestion management for No DNN corresponding to the PLMN before changed is deactivated, and when the counting of the back-off timer of the first congestion management for No DNN corresponding to a PLMN after changed is not performed, and the back-off timer of the first congestion management for No DNN corresponding to the PLMN is not deactivated. Further, the UE 10 may transmit a PDU session establishment request message that does not use a DNN based on the configuration.

Here, whether the first congestion management performs the same process for a specific DNN or No DNN or performs a different process as the process associated with a PLMN change may be configured based on information configured in advance in the UE_A10, but may be determined based on whether the second PLMN after being changed is an equivalent PLMN to the first PLMN before being changed. For example, when the second PLMN after being changed is not an equivalent PLMN to the first PLMN before being changed, the same process may also be applied. When the second PLMN after being changed is an equivalent PLMN to the first PLMN before being changed, a different process may also be performed.

Besides, in the present embodiment, the deactivation of the back-off timer may mean that the congestion management associated with the back-off timer and/or the back-off timer has transitioned to a deactivated state. When the UE_A10 receives a timer value indicating the deactivation, the UE_A10 may deactivate the back-off timer and/or the congestion management corresponding to the back-off timer.

Here, the deactivated back-off timer and/or the deactivated congestion management corresponding to the back-off timer may correspond to one or more of the first to fourth types of congestion managements. Which type of congestion management corresponding to the deactivated back-off timer and/or the deactivated congestion management corresponding to the back-off timer may be similarly determined and identified when the back-off timer value is received.

More specifically, the UE_A10 may receive from the NW the 14th identification information and the 15th identification information indicating the deactivation of the back-off timer and/or the congestion management corresponding to the back-off timer, and deactivate the back-off timer for the type of congestion management indicated by the 15th identification information.

In addition, in the state where the back-off timer and/or the congestion management is deactivated, the application of the congestion management may be continued until the terminal power is turned off or the USIM is removed. Further, the process to be regulated at this time may be the same as a process to be regulated when the back-off timer is counted according to the type of congestion management.

The processes of the UE_A10 and the NW associated with the PLMN change described above have been described for the first congestion management and/or the back-off timer for the first congestion management, but the same process may also be performed for the second congestion management, the third congestion management, and the fourth congestion management. However, the PDU session establishment request message of which the transmission is regulated or allowed may be a message corresponding to each type. In other words, the congestion management and/or the back-off timer corresponding to the congestion management may also correspond to a PLMN regardless of the type of congestion management. Alternatively, the congestion management and/or the back-off timer corresponding to the congestion management may also correspond to a PLMN regardless of the type of congestion management. Therefore, for the first congestion management, the second congestion management, and the third congestion management, the congestion management and/or the back-off timer corresponding to the congestion management may be configured to correspond to a PLMN. Therefore, for the first congestion management for No DNN, the second congestion management for No DNN, and the third congestion management for No DNN, the congestion management and/or the back-off timer corresponding to the congestion management may be configured to correspond to a PLMN, and the first congestion management for a particular DNN may not correspond to the PLMN. In addition, the process at the time when each congestion management corresponds to the PLMN and/or the process related to the back-off timer corresponding to each congestion management may be the process for the first congestion management associated with the PLMN as described above, and/or the first congestion management in the description of the process related to the back-off timer corresponding to the first congestion management corresponding to the PLMN described above may be replaced by each type of the congestion management from the second to fourth congestion managements. In addition, the process at the time when each congestion management does not correspond to the PLMN and/or the process related to the back-off timer corresponding to each congestion management may be the process for the first congestion management that does not correspond to the PLMN as described above, and/or the first congestion management in the description of the process related to the back-off timer corresponding to the first congestion management that does not correspond to PLMN as described above may be replaced by each type of the congestion management from the second to fourth congestion managements. However, as described above, the PDU session establishment request message of which the transmission is regulated or allowed may be a message corresponding to each type.

In addition, in the description of the present embodiment, when it is expressed that an NW performs transmission to a UE_A10, it may mean that an AMF or an SMF performs transmission to a UE_A10, and when it is expressed that a UE_A10 performs transmission to an NW, it may mean that a UE_A10 performs transmission to an AMF or an SMF. Further, when it is expressed that an NW performs reception from a UE_A10, it may mean that an AMF or an SMF performs reception from a UE_A10, and when it is expressed that a UE_A10 performs reception from an NW, it may mean that a UE_A10 performs reception from an AMF or an SMF.

[1.4 Modified Example of Fourth Process]

In the present embodiment, although the fourth process example has been described, it is not limited to the previous description, and the following process may be performed in the fourth process.

Figure 10:
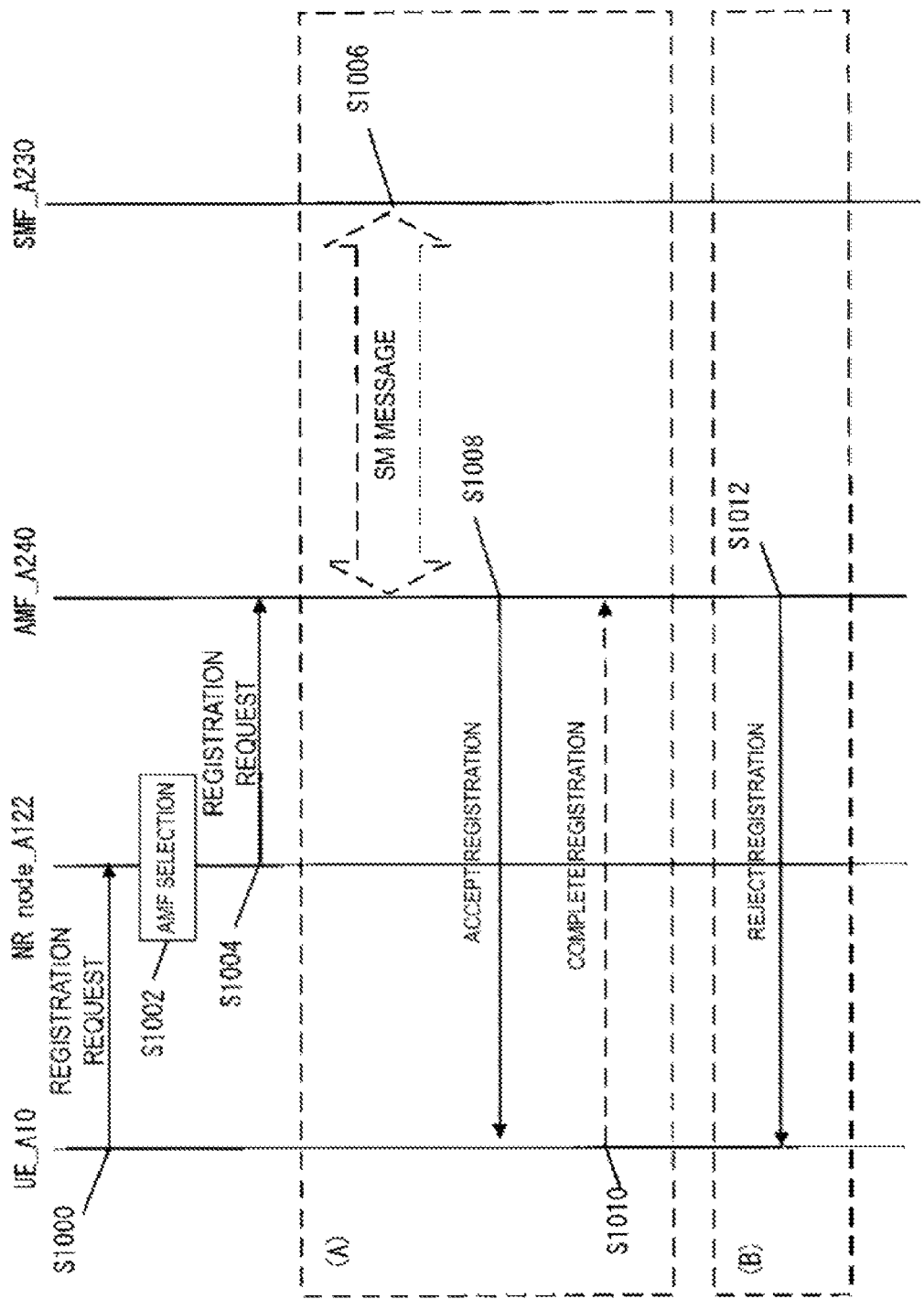
FIG. 10 is a diagram illustrating a registration procedure.
Figure 11:
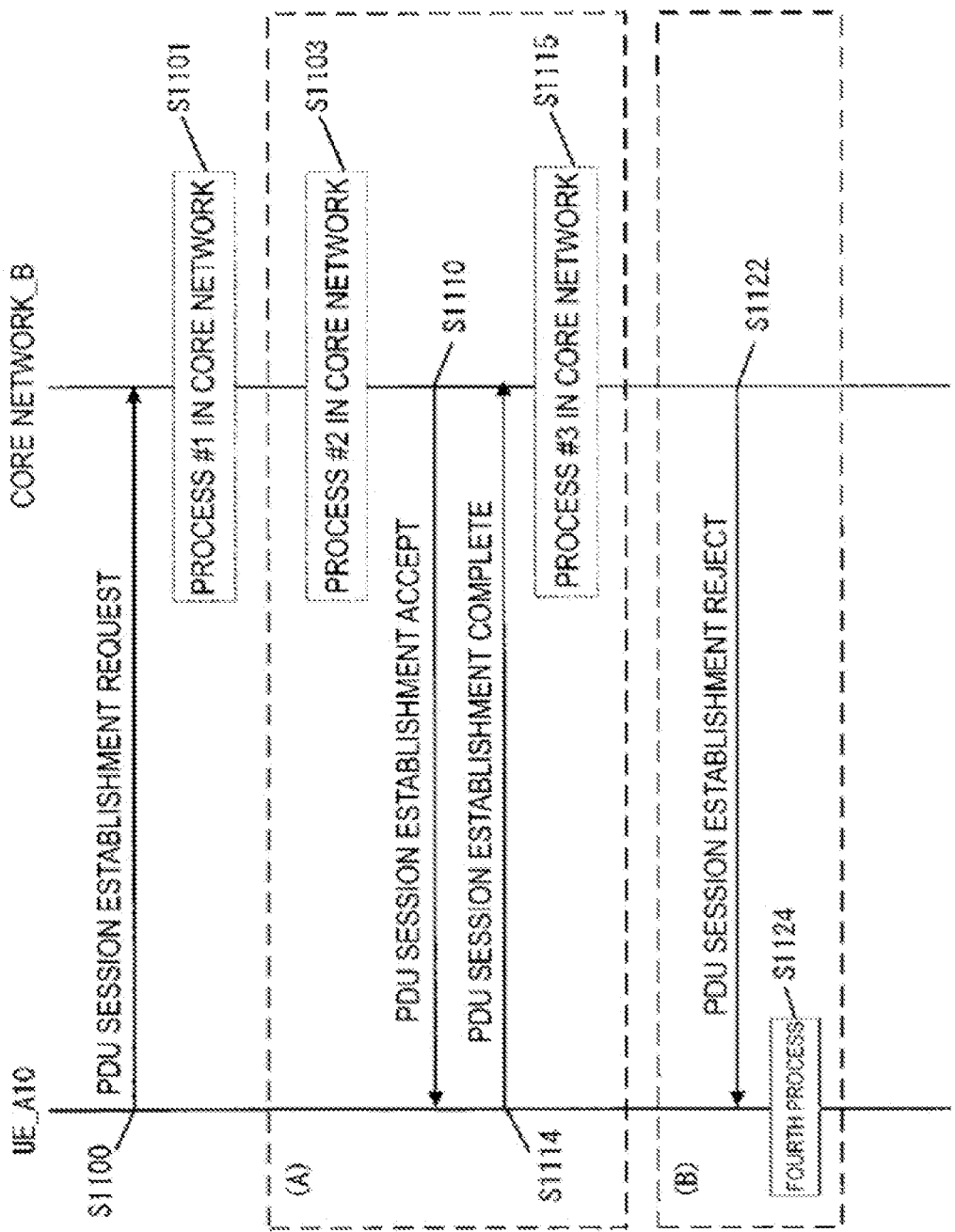
FIG. 11 is a diagram illustrating a PDU session establishment procedure.

This modified example is mainly related to the behavior of the registration procedure illustrated in FIG. 10 and/or the PDU session establishment registration procedure illustrated in FIG. 11. Further, the present embodiment relates to a case that the PDU session establishment reject message (S1122) received by the UE_A includes the 15th identification information and/or 14th identification information and/or 11th identification information in the PDU session establishment procedure shown in the FIG. 11.

It should be noted that, in the present modified example, the 15th identification information is information indicating one or more cause values notified by the NW to the UE for the rejection of the present procedure for a cause other than the application of a congestion management. The 14th identification information is information indicating a value of the back-off timer. The 11th identification information is information indicating re-attempt information. The back-off timer may be the first timer used in the third congestion management described above in the present embodiment and is not limited thereto as long as it is a timer of the communication system that can be recognized by the UE. It should be noted that, in order to distinguish the back-off timer from the first timer described above, an SM back-off timer is expressed. In addition, when the PDU session establishment procedure does not include DNN information, "no DNN" is expressed in order to be distinguished from a control signal management with DNN information included. In addition, similarly, when the PDU session establishment procedure does not include S-NSSAI information, "no S-NSSAI" is expressed in order to be distinguished from a control signal management with S-NSSAI information included.

The fourth process (S1124) may be performed according to contents of the 11th identification information and/or the 14th identification information and/or the 15th identification information included in the PDU session establishment reject message received by the UE_A.

The SMF_A230 or the AMF_A240 may load an SM back-off timer indicated by the 14th identification information and transmit the PDU session establishment reject message (S1122) to the UE_A10 when a reject cause value indicated by the 15th identification information is other than insufficient resources and/or insufficient resources for specific slice and DNN and/or insufficient resources for specific slice.

In this case, the UE_A10 may perform the fourth process based on the received SM back-off timer value when the reject cause value indicated by the 15th identification information is other than insufficient resources and/or insufficient resources for specific slices and DNN and/or insufficient resources for specific slices and/or user authentication or authorization failed and/or out of LADN service area and/or PDU session type IPv4 only allowed and/or PDU session type IPv6 only allowed and/or PDU session does not exist.

Specifically, the UE_A10 may perform a first process example described below as the fourth process example of the present modified example when the SM back-off timer value is not zero or invalid.

UE_A10 may start the SM back-off timer for the PLMN and/or the DNN and/or the S-NSSAI, may also start the SM back-off timer for the PLMN and/or the no DNN and/or the S-NSSAI, may also start the SM back-off timer for the PLMN and/or the DNN and/or the no S-NSSAI, and may also start the SM back-off timer for the PLMN and/or the no DNN and/or the no S-NSSAI.

In addition, the UE_A10 may suppress the transmission of the PDU session establishment request message (1011) based on the SM back-off timer value.

Specifically, the UE_A10 may suppress the reconnection using another PDU session establishment request message directed to DNN and S-NSSAI parameters transmitted in the PDU session establishment request message (1011) until the SM back-off timer for PLMN and/or DNN and/or S-NSSAI expires, and/or until the terminal power is turned on/off, or until the USIM (Universal Subscriber Identity Module) is inserted/removed.

In addition, the UE_A10 may suppress the reconnection using another PDU session establishment request message directed to no DNN and S-NSSAI parameters transmitted in the PDU session establishment request message (1011) until the SM back-off timer for PLMN and/or no DNN and/or S-NSSAI expires, and/or until the terminal power is turned on/off, or until the USIM (Universal Subscriber Identity Module) is inserted/removed.

In addition, the UE_A10 may suppress the reconnection using another PDU session establishment request message directed to DNN and no S-NSSAI parameters transmitted in the PDU session establishment request message (1011) until the SM back-off timer for PLMN and/or DNN and/or no S-NSSAI expires, and/or until the terminal power is turned on/off, or until the USIM (Universal Subscriber Identity Module) is inserted/removed.

In addition, the UE_A10 may suppress the reconnection using another PDU session establishment request message directed to no DNN and no S-NSSAI parameters transmitted in the PDU session establishment request message (1011) until the SM back-off timer for PLMN and/or no DNN and/or no S-NSSAI expires, and/or until the terminal power is turned on/off, or until the USIM (Universal Subscriber Identity Module) is inserted/removed.

Further, the UE_A10 may perform a second process example different from the first process example as the fourth process example of the present modified example when the SM back-off timer value indicates invalidity.

The UE_A10 may suppress the reconnection using another PDU session establishment request message directed to DNN and S-NSSAI parameters transmitted in the PDU session establishment request message (1011) until the terminal power is turned on/off, or until the USIM (Universal Subscriber Identity Module) is inserted/removed.

In addition, the UE_A10 may suppress the reconnection using another PDU session establishment request message directed to no DNN and S-NSSAI parameters transmitted in the PDU session establishment request message (1011) until the terminal power is turned on/off, or until the USIM (Universal Subscriber Identity Module) is inserted/removed.

In addition, the UE_A10 may suppress the reconnection using another PDU session establishment request message directed to DNN and no S-NSSAI parameters transmitted in the PDU session establishment request message (1011) until the terminal power is turned on/off, or until the USIM (Universal Subscriber Identity Module) is inserted/removed.

In addition, the UE_A10 may suppress the reconnection using another PDU session establishment request message directed of no DNN and no S-NSSAI parameters transmitted in the PDU session establishment request message (1011) until the terminal power is turned on/off, or until the USIM (Universal Subscriber Identity Module) is inserted/removed.

Further, the UE_A10 may perform a third process example different from the first and second process examples as the fourth process example of the present modified example when the SM back-off timer value indicates zero.

The UE_A10 may stop if the SM back-off timer corresponding to DNN and S-NSSAI transmitted in the PDU session establishment request message (1011) is activated, and transmit another PDU session establishment request message using DNN and S-NSSAI transmitted in the PDU session establishment request message (1011).

In addition, the UE_A10 may stop if the SM back-off timer corresponding to no DNN and S-NSSAI transmitted in the PDU session establishment request message (1011) is started, and transmit another PDU session establishment request message using no DNN and S-NSSAI transmitted in the PDU session establishment request message (1011).

In addition, the UE_A10 may stop if the SM back-off timer corresponding to DNN and no S-NSSAI transmitted in the PDU session establishment request message (1011) is started, and transmit another PDU session establishment request message using DNN and no S-NSSAI transmitted in the PDU session establishment request message (1011).

In addition, the UE_A10 may stop if the SM back-off timer corresponding to no DNN and no S-NSSAI transmitted in the PDU session establishment request message (1011) is activated, and transmit another PDU session establishment request message using no DNN and no S-NSSAI transmitted in the PDU session establishment request message (1011).

It should be noted that UE_A10 does not stop the activated SM back-off timer when the PLMN is changed or when a change from an N1 mode to an S1 mode occurs. This is because, for example, when the PLMN change returns to the original PLMN again from the PLMN change destination, the back-off timer activated by the original PLMN continues to be activated, and the control signal management applied to the original PLMN continues to be applied.

Further, the UE_A10 may perform the fourth procedure example as the fourth process example of the present modified example when a PLMN change is performed while the SM back-off timer started before the PLMN change is started. Here, the PLMN before changed is referred to as the original PLMN.

The UE_A10 may transmit a PDU session establishment request message using the same S-NSSAI and DNN as the S-NSSAI and DNN corresponding to the SM back-off timer activated by the original PLMN when the SM back-off timer activated by the original PLMN for the S-NSSAI and DNN is not activated at the PLMN change destination.

In addition, the UE_A10 may transmit a PDU session establishment request message using the same S-NSSAI and no DNN as the S-NSSAI and no DNN corresponding to the SM back-off timer activated by the original PLMN when the SM back-off timer activated by the original PLMN for the S-NSSAI and no DNN is not activated at the PLMN change destination.

In addition, the UE_A10 may transmit a PDU session establishment request message using the same no S-NSSAI and DNN as the no S-NSSAI and DNN corresponding to the SM back-off timer activated by the original PLMN when the SM back-off timer activated by the original PLMN for the no S-NSSAI and DNN is not activated at the PLMN change destination.

In addition, the UE_A10 may transmit a PDU session establishment request message using the same no S-NSSAI and no DNN as the no S-NSSAI and no DNN corresponding to the SM back-off timer activated by the original PLMN when the SM back-off timer activated by the original PLMN for the no S-NSSAI and no DNN is not activated at the PLMN change destination.

Further, the UE_A10 may perform a fifth procedure example different from the first, second, and third procedure examples as the fourth process example of the present modified example when the cause value indicated by the 15th identification information is "user authentication or authentication failed", or "PDU session type IPv4 only allowed", or "PDU session type IPv6 only allowed".

Specifically, the fifth procedure example may be a procedure that the UE_A10 may not automatically transmit the reconnection using another PDU session establishment request message directed to DNN and S-NSSAI parameters transmitted in the PDU session establishment request message (1011) until the PDU session type used in the PDU session establishment request message (1011) is changed, or until the terminal power is on/off, or until the USIM (Universal Subscriber Identity Module) is inserted/removed.

In addition, it may be a procedure that the UE_A10 may not automatically transmit the reconnection using another PDU session establishment request message directed to no DNN and S-NSSAI parameters transmitted in the PDU session establishment request message (1011) until the PDU session type used in the PDU session establishment request message (1011) is changed, or until the terminal power is on/off, or until the USIM (Universal Subscriber Identity Module) is inserted/removed.

In addition, it may be a procedure that the UE_A10 may not automatically transmit the reconnection using another PDU session establishment request message directed to DNN and no S-NSSAI parameters transmitted in the PDU session establishment request message (1011) until the PDU session type used in the PDU session establishment request message (1011) is changed, or until the terminal power is on/off, or until the USIM (Universal Subscriber Identity Module) is inserted/removed.

In addition, it may be a procedure that the UE_A10 may not automatically transmit the reconnection using another PDU session establishment request message directed to no DNN and no S-NSSAI parameters transmitted in the PDU session establishment request message (1011) until the PDU session type used in the PDU session establishment request message (1011) is changed, or until the terminal power is on/off, or until the USIM (Universal Subscriber Identity Module) is inserted/removed.

Further, the UE_A10 may perform a sixth procedure example different from the first, second, third, and fifth procedure examples as the fourth process example of the present modified example when the cause value indicated by the 15th identification information is "PDU session does not exist".

Specifically, the UE_A10 may transmit an initial PDU session establishment request (initial request) message directed to DNN and S-NSSAI parameters transmitted in the PDU session establishment request message (1011).

In addition, the UE_A10 may transmit an initial PDU session establishment request (initial request) message directed to no DNN and S-NSSAI parameters transmitted in the PDU session establishment request message (1011).

In addition, the UE_A10 may transmit an initial PDU session establishment request (initial request) message directed to DNN and no S-NSSAI parameters transmitted in the PDU session establishment request message (1011).

In addition, the UE_A10 may transmit an initial PDU session establishment request (initial request) message directed to no DNN and no S-NSSAI parameters transmitted in the PDU session establishment request message (1011).

Further, the UE_A10 may perform a seventh procedure example different from the first, second, third, fifth, and sixth procedure examples as the fourth process example of the present modified example when the cause value indicated by the 15th identification information is "user authentication or authentication failed", and/or "PDU session type IPv4 only allowed", and/or "PDU session type IPv6 only allowed", and/or "PDU session does not exit".

Specifically, the UE_A10 may also ignore the received SM back-off timer.

Further, the UE_A10 may transmit another PDU session establishment request message based on the re-attempt information indicated in the 11th identification information. Specifically, when the connection in an equivalent PLMN is allowed in the re-attempt information, the UE_A10 may transmit another PDU session establishment request message directed to DNN and S-NSSAI parameters transmitted in the PDU session establishment request message (1011) in the equivalent PLMN.

In addition, when the connection in an equivalent PLMN is allowed in the re-attempt information, the UE_A10 may transmit another PDU session establishment request message directed to no DNN and S-NSSAI parameters transmitted in the PDU session establishment request message (1011) in the equivalent PLMN.

In addition, when the connection in an equivalent PLMN is allowed in the re-attempt information, the UE_A10 may transmit another PDU session establishment request message directed to DNN and no S-NSSAI parameters transmitted in the PDU session establishment request message (1011) in the equivalent PLMN.

In addition, when the connection in an equivalent PLMN is allowed in the re-attempt information, the UE_A10 may transmit another PDU session establishment request message directed to no DNN and no S-NSSAI parameters transmitted in the PDU session establishment request message (1011) in the equivalent PLMN. As described above, the UE_A10 may also perform a process based on the reception of a PDU session establishment reject message.

In other words, the process based on the reception of a PDU session establishment reject message may be a process example described below. In addition, the process example may be a process performed when the PDU session establishment rejection message includes a timer value.

When a 5GSM cause value included in the PDU session establishment reject message indicates a cause value other than another cause value related to congestion management, the UE_A10 may start a back-off timer for a combination of PLMN, DNN, and S-NSSAI by using a received timer value based on a received 5GSM cause value.

Here, the DNN and the S-NSSAI may be indicated by UE_A10. Specifically, as described above so far, the UE_A10 may also include the DNN and the S-NSSAI in a PDU session establishment request message. In addition, the PDU session establishment reject message in the present process may be a response message to the PDU session establishment request message.

Further, the cause value related to the congestion management may be a cause value indicating insufficient resources and/or insufficient resources for a specific slice and/or insufficient resources for a specific slice and a DNN.

In other words for the above process example, when the 5GSM cause value included in the PDU session establishment reject message is different from the cause value included in the following cause value group, the UE_A10 may start a back-off timer with respect to a combination of PLMN, DNN, and S-NSSAI by using a received timer value.

Here, the cause value group may be the aforementioned cause value related to congestion management, and/or user authentication or authorization failed and/or out of LADN service area, and/or PDU session type IPv4 only allowed and/or PDU session type IPv6 only allowed and/or PDU session does not exist.

Specifically, when a 5GSM cause value included in the PDU session establishment reject message indicates request rejected unspecified, the UE_A10 may start a back-off timer with respect to a combination of PLMN, DNN, and S-NSSAI by using a received timer value.

Further, the process performed by the UE_A10 during the counting of the back-off timer described above may be the process already described in this section.

[2. Modified Example]

The program running in the apparatuses according to the present invention may be a program that controls a central processing unit (CPU) to operate a computer so as to implement the functions of the embodiment according to the present invention. Programs or information processed by the programs are temporarily stored in a volatile memory such as a random access memory (RAM), a non-volatile memory such as a flash memory, a hard disk drive (HDD), or other storage device system.

Besides, a program for implementing such functions of the embodiment according to the present invention may be recorded on a computer-readable recording medium. It may be implemented by loading the program recorded on the recording medium into a computer system and executing the program. The "computer system" described herein refers to a computer system built into the apparatuses, and includes an operating system and hardware components such as peripheral devices. In addition, the "computer-readable recording medium" may be any of a semiconductor recording medium, an optical recording medium, a magnetic recording medium, a medium dynamically retaining the program for a short time, or any other computer readable recording medium.

In addition, the various functional blocks or various features of the apparatuses used in the above-mentioned embodiments may be installed or performed by a circuit, such as an integrated circuit or multiple integrated circuits. Circuits designed to execute the functions described in the present description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be a conventional processor, controller, microcontroller, or state machine. The above-mentioned circuit may include a digital circuit, or may include an analog circuit. In addition, in a case that with advances in semiconductor technology, a new circuit integration technology may appear to replace the present technology for integrated circuits, one or more aspects of the present invention may also use a new integrated circuit based on the new circuit integration technology.

The present invention is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail with reference to the accompanying drawings, but the specific configuration is not limited to the present embodiments and includes design modification and the like without departing from the scope of the present invention. In addition, various modifications within the scope presented by the claims may be made to the present invention, and embodiments obtained by suitably combining technical means disclosed by the different embodiments may also be included in the technical scope of the present invention. In addition, a configuration in which constituent elements, described in the respective embodiments and having mutually the same effects, are substituted for one another may also be included in the technical scope of the present invention.

What is claimed is:

1. A method performed by a user equipment (UE) for control signal management, the method comprising:
transmitting a first Protocol Data Unit (PDU) session establishment request message containing a first request type field to a network node to establish a first PDU session associated with a Data Network Name (DNN) and a Single Network Slice Selection Assistance Information (S-NSSAI);
receiving a PDU session establishment reject message;
setting a second request type field within a second PDU session establishment request message to establish a second PDU session based on a cause value included in the PDU session establishment reject message indicating that the first PDU session has not been established; and
transmitting the second PDU session establishment request message to the network node to establish the second PDU session.

2. The method of claim 1, wherein the second PDU session is associated with the DNN and the S-NSSAI when the DNN and the S-NSSAI are indicated in the second PDU session establishment request message.

3. The method of claim 1, wherein the second PDU session is associated with the S-NSSAI but not with the DNN when no DNN is indicated in the second PDU session establishment request message.

4. The method of claim 1, wherein the second PDU session is associated with the DNN but not with the S-NSSAI when no S-NSSAI is indicated in the second PDU session establishment request message.

5. The method of claim 1, wherein the second PDU session is not associated with the DNN and not associated with the S-NSSAI when no DNN and no S-NSSAI are indicated in the second PDU session establishment request message.

6. The method of claim 1, wherein the cause value is-comprises a 5G Session Management (5GSM) cause value.

7. A user equipment (UE) for performing control signal management, the UE comprising:
at least one processor; and
at least one non-transitory computer-readable medium coupled to the at least one processor, and storing one or more computer-executable instructions that, when executed by the at least one processor, cause the UE to:

transmit a first Protocol Data Unit (PDU) session establishment request message containing a first request type field to a network node to establish a first PDU session associated with a Data Network Name (DNN) and a Single Network Slice Selection Assistance Information (S-NSSAI);

receive a PDU session establishment reject message;

set a second request type field within a second initial PDU session establishment request message to establish a second PDU session based on a cause value included in the PDU session establishment reject message indicating that the first PDU session has not been established; and transmit the second PDU session establishment request message to the network node to establish the second PDU session.

8. The UE of claim 7, wherein the second PDU session is associated with the DNN and the S-NSSAI when the DNN and the S-NSSAI are indicated in the second PDU session establishment request message.

9. The UE of claim 7, wherein the second PDU session is associated with the S-NSSAI but not with the DNN when no DNN is indicated in the second PDU session establishment request message.

10. The UE of claim 7, wherein the second PDU session is associated with the DNN but not with the S-NSSAI when no S-NSSAI is indicated in the second PDU session establishment request message.

11. The UE of claim 7, wherein the second PDU session is not associated with the DNN and not associated with the S-NSSAI when no DNN and no S-NSSAI are indicated in the second PDU session establishment request message.

12. The UE of claim 7, wherein the cause value comprises a 5G Session Management (5GSM) cause value.

13. A method performed by a network node for control signal management, the method comprising:

receiving, from a user equipment (UE), a first Protocol Data Unit (PDU) session establishment request message containing a first request type field to establish a first PDU session associated with a Data Network Name (DNN) and a Single Network Slice Selection Assistance Information (S-NSSAI);

determining whether the first PDU session has not been established based on at least one of the DNN and the S-NSSAI;

transmitting, to the UE, a PDU session establishment reject message including a cause value indicating that the first PDU session has not been established in response to determining that the first PDU session has not to be established; and receiving, from the UE, a second PDU session establishment request message to establish a second PDU session, wherein a request type field is set within the second PDU session establishment request message to establish the second PDU session.

14. The method of claim 13, wherein the second PDU session is associated with the DNN and the S-NSSAI when the DNN and the S-NSSAI are indicated in the second PDU session establishment request message.

15. The method of claim 13, wherein the second PDU session is associated with the S-NSSAI but not with the DNN when no DNN is indicated in the second PDU session establishment request message.

16. The method of claim 13, wherein the second PDU session is associated with the DNN but not with the S-NSSAI when no S-NSSAI is indicated in the second PDU session establishment request message.

17. The method of claim 13, wherein the second PDU session is not associated with the DNN and not associated with the S-NSSAI when no DNN and no S-NSSAI are indicated in the second PDU session establishment request message.

18. The method of claim 13, wherein the cause value comprises a 5G Session Management (5GSM) cause value.

* * * * *